US011628899B2

(12) United States Patent
Akimoto et al.

(10) Patent No.: US 11,628,899 B2
(45) Date of Patent: Apr. 18, 2023

(54) STRADDLED VEHICLE

(71) Applicant: YAMAHA HATSUDOKI KABUSHIKI KAISHA, Iwata (JP)

(72) Inventors: Satoru Akimoto, Shizuoka (JP); Shidehiko Miyashiro, Shizuoka (JP); Toshiyuki Shirai, Shizuoka (JP); Yuya Ozaki, Shizuoka (JP); Kaori Kubo, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 333 days.

(21) Appl. No.: 17/165,314

(22) Filed: Feb. 2, 2021

(65) Prior Publication Data
US 2021/0245826 A1 Aug. 12, 2021

(30) Foreign Application Priority Data

Feb. 12, 2020 (JP) .............................. JP2020-021321

(51) Int. Cl.
B62J 1/08 (2006.01)
B62J 23/00 (2006.01)
B62J 1/28 (2006.01)

(52) U.S. Cl.
CPC . B62J 1/08 (2013.01); B62J 1/28 (2013.01); B62J 23/00 (2013.01)

(58) Field of Classification Search
CPC .................. B62J 1/08; B62J 1/28; B62J 23/00
See application file for complete search history.

(56) References Cited

U.S. PATENT DOCUMENTS

| 10,717,486 | B2* | 7/2020 | Suzuki | B62K 19/12 |
| 10,946,917 | B2* | 3/2021 | Enami | B62J 1/08 |
| 2002/0040699 | A1 | 4/2002 | Yokoyama et al. | |
| 2006/0065457 | A1* | 3/2006 | Miyabe | B62K 11/04 180/219 |
| 2006/0124379 | A1* | 6/2006 | Ohira | F02M 35/0203 180/292 |
| 2017/0152821 | A1* | 6/2017 | Yamamoto | B62J 15/00 |
| 2021/0147025 | A1* | 5/2021 | Hatano | B62J 1/08 |
| 2021/0245825 | A1* | 8/2021 | Fujimori | B62J 1/02 |
| 2022/0119060 | A1* | 4/2022 | Hatano | B32B 1/00 |

FOREIGN PATENT DOCUMENTS

JP  2002115612 A  4/2002

* cited by examiner

Primary Examiner — Tony H Winner
(74) Attorney, Agent, or Firm — Rabin & Berdo, P.C.

(57) ABSTRACT

A straddled vehicle, including a cross member connecting right and left seat frames, a seat above the cross member and right and left seat frames, left and right side covers, a rear fender, an intake passage formed below the seat, between the left and right side covers and above the rear fender, an air cleaner located in a front part of the intake passage, left and right inlet ports located in a rear part of the intake passage, first and second fastening portions respectively fastening the right and left side cover to the right and left seat frames or to the rear fender. In a rear view of the vehicle, the cross member is convex upward and does not overlap the right or left inlet port, and the first and second fastening portions are located outside the intake passage, or are located inside the intake passage but does not overlap the right or left inlet port.

15 Claims, 29 Drawing Sheets

STRADDLED VEHICLE

CROSS-REFERENCE TO RELATED APPLICATIONS

This application claims priority to Japanese Patent Application No. 2020-021321 filed Feb. 12, 2020, the disclosure of which is hereby incorporated herein by reference in its entirety for all purposes.

TECHNICAL FIELD

This invention relates to a straddled vehicle provided with an air cleaner.

BACKGROUND ART

Japanese Unexamined Patent Publication No. 2002-115612A discloses a two-wheeled vehicle. Hereinunder, numerals in Japanese Unexamined Patent Publication No. 2002-115612A are expressed in parentheses. The two-wheeled vehicle (1) includes an air cleaner (35) and an intake passage (50). The air cleaner (35) is located in a front part of the intake passage (50). The intake passage (50) extends rearward from the air cleaner (35).

The two-wheeled vehicle (1) includes a seat (19), a right side cover (40), a left side cover (40), and a rear fender (22). The intake passage (50) is formed with the seat (19), the right side cover (40), the left side cover (40), and the rear fender (22). The seat (19) constitutes a top wall of the intake passage (50). The right side cover (40) constitutes a right wall of the intake passage (50). The left side cover (40) constitutes a left wall of the intake passage (50). The rear fender (22) constitutes a bottom wall of the intake passage (50).

The two-wheeled vehicle (1) includes a right inlet port (40b) and a left inlet port (40b). The right inlet port (40b) and the left inlet port (40b) are located in a rear part of the intake passage (50). The right inlet port (40b) and the left inlet port (40b) are opened rearward. The right inlet port (40b) is formed in the right side cover (40). The left inlet port (40b) is formed in the left side cover (40).

The intake passage (50) takes in air from the outside of the two-wheeled vehicle (1) through the right inlet port (40b) and the left inlet port (40b). The air cleaner (35) intakes air within the intake passage (50).

More specifically, in the intake passage (50), air flows from the right inlet port (40b) or the left inlet port (40b) to the air cleaner (35). In other words, in the intake passage (50), air flows from the rear part of the intake passage (50) to the front part of the intake passage (50). Airflow in the intake passage (50) is directed forward.

The two-wheeled vehicle (1) includes a right seat frame (12), a left seat frame (12), a right bolt (45), and a left bolt (45). The right bolt (45) joins the right seat frame (12) with the right side cover (44). The left bolt (45) joins the left seat frame (12) with the left side cover (44).

The right seat frame (12) and the left seat frame (12) are each partially located inside of the intake passage (50). The right bolt (45) and the left bolt (45) are located inside of the intake passage (50). The right bolt (45) overlaps the right inlet port (40b) in the rear view of the vehicle. The left bolt (45) overlaps the left inlet port (40b) in the rear view of the vehicle.

The two-wheeled vehicle (1) includes a cross member (8). The cross member (8) connects the right seat frame (12) with the left seat frame (12). Specifically, the cross member (8) couples a front end of the right seat frame (12) with a front end of the left seat frame (12). The cross member (8) is located more forward than the air cleaner (35). Accordingly, the cross member (8) is located outside of the intake passage (50). The cross member (8) is located more forward than the intake passage (50).

The two-wheeled vehicle (1) includes no frame member that is located inside of the intake passage (50) and connects the right seat frame (12) with the left seat frame (12). In other words, the two-wheeled vehicle (1) includes no frame member that is located more rearward than the air cleaner (35) and couples the right seat frame (12) with the left seat frame (12).

The right bolt (45) is located inside of the intake passage (50), and overlaps the right inlet port (40b) in the rear view of the vehicle. Accordingly, the right bolt (45) causes obstruction to the airflow in the intake passage (50). Likewise, the left bolt (45) is located inside of the intake passage (50), and overlaps the left inlet port (40b) in the rear view of the vehicle. Accordingly, the left bolt (45) causes obstruction to the airflow in the intake passage (50). As a result, air is hard to flow smoothly in the intake passage (50). The difficulty of smooth airflow in the intake passage makes it hard to ensure an intake air amount of the air cleaner (35).

The right seat frame (12) and the left seat frame (12) are not connected by the frame member located more rearward than the air cleaner (35). This causes relatively low rigidity of a body frame.

SUMMARY OF INVENTION

The present invention has been made regarding the state of the art noted above, and its one object is to provide a straddled vehicle that achieves smooth airflow in an intake passage as well as enhanced rigidity of a body frame.

Inventors herein have studied on a support configuration that suitably supports a right side cover and a left side cover and is unlikely to be obstruction to airflow in the intake passage. The inventors herein also have studied on a reinforcement configuration that suitably reinforces a right seat frame and a left seat frame and is unlikely to be obstruction to airflow in the intake passage.

Based on the above study, this invention provides the following construction. A straddled vehicle, according to this invention, includes:

a body frame including a right seat frame located rightward of a vehicle center plane that passes through the center of the straddled vehicle and is perpendicular to a transverse direction of the vehicle, a left seat frame located leftward of the vehicle center plane, and a cross member located between the right seat frame and the left seat frame and configured to connect the right seat frame with the left seat frame;

a seat located above the right seat frame, the left seat frame, and the cross member;

a right side cover located rightward of the right seat frame;

a left side cover located leftward of the left seat frame;

a rear fender including a part located below the right seat frame, the left seat frame, and the cross member;

an intake passage formed below the seat, leftward of the right side cover, rightward of the left side cover, and above the rear fender, and extending in a longitudinal direction of the vehicle;

an air cleaner located in a front part of the intake passage;

a left inlet port located in a rear part of the intake passage and leftward of the vehicle center plane, opened rearward, and communicating the intake passage and an outside of the straddled vehicle;

a right inlet port located in the rear part of the intake passage and rightward of the vehicle center plane, opened rearward, and communicating the intake passage and the outside of the straddled vehicle;

a first fastening portion configured to fasten the right side cover to either the right seat frame or the rear fender; and a second fastening portion configured to fasten the left side cover to either the left seat frame or the rear fender, wherein the cross member is located more rearward than the air cleaner and more forward than the right inlet port and the left inlet port, the cross member has a shape curved to be convex upward in rear view of the vehicle, the cross member is located at a position not overlapping the right inlet port or the left inlet port in the rear view of the vehicle, the first fastening portion is located at least either at a position not overlapping the right inlet port or the left inlet port in the rear view of the vehicle or at a position outside of the intake passage, and the second fastening portion is located at least either at a position not overlapping the right inlet port or the left inlet port in the rear view of the vehicle or at a position outside of the intake passage.

The straddled vehicle includes the cross member. The cross member connects the right seat frame with the left seat frame. The cross member is located more rearward than the air cleaner. Accordingly, the cross member can reinforce the right seat frame and the left seat frame at appropriate positions. This can enhance rigidity of a body frame conveniently.

In the intake passage, air flows from the right inlet port and the left inlet port to the air cleaner. The intake passage is formed below the seat, leftward of the right side cover, rightward of the left side cover, and above the rear fender. The intake passage extends in the longitudinal direction of the vehicle. The air cleaner is located in the front part of the intake passage. The right inlet port and the left inlet port are located in the rear part of the intake passage. The right inlet port and the left inlet port communicate the intake passage and the outside of the straddled vehicle. Consequently, air flows through the right inlet port and the left inlet port, thereby flowing into the intake passage. Air flows forward in the intake passage.

The right inlet port and the left inlet port are opened rearward. Consequently, air flows into the intake passage from a position rearward of the right inlet port and the left inlet port. This causes air to flow forward when air flows into the intake passage. As a result, air can flow smoothly into the intake passage and air can flow smoothly in the intake passage.

The right inlet port is located rightward of the vehicle center plane. The left inlet port is located leftward of the vehicle center plane. Consequently, the right inlet port and the left inlet port enable efficient introduction of air into the intake passage.

The cross member is located between the right seat frame and the left seat frame. The cross member is located below the seat. The cross member is located above part of the rear fender. The cross member is located more forward than the right inlet port and the left inlet port. Accordingly, the cross member is located inside of the intake passage. Here, the cross member has the shape curved to be convex upward in the rear view of the vehicle. This can suppress obstruction to airflow in the intake passage by the cross member. Moreover, the cross member is located at a position not overlapping the right inlet port or the left inlet port in the rear view of the vehicle. This can further suppress obstruction to airflow in the intake passage by the cross member.

The straddled vehicle includes the first fastening portion. The first fastening portion fastens the right side cover to either the right seat frame or the rear fender. This can support the right side cover suitably. The straddled vehicle includes the second fastening portion. The second fastening portion fastens the left side cover to either the left seat frame or the rear fender. This can support the left side cover suitably.

The first fastening portion is located at least either at a position not overlapping the right inlet port or the left inlet port in the rear view of the vehicle or at a position outside of the intake passage. Likewise, the second fastening portion is located at least either at a position not overlapping the right inlet port or the left inlet port in the rear view of the vehicle or at a position outside of the intake passage. Here, the position not overlapping the right inlet port or the left inlet port in the rear view of the vehicle may be outside or inside of the intake passage. Moreover, the position outside of the intake passage may be a position overlapping or not overlapping the right inlet port or the left inlet port in the rear view of the vehicle. Consequently, the first fastening portion and the second fastening portion are each located at either of positions a, b, and c as under:

Position a: a position inside of the intake passage and not overlapping the right inlet port or the left inlet port in the rear view of the vehicle:

Position b: a position outside of the intake passage and not overlapping the right inlet port or the left inlet port in the rear view of the vehicle:

Position c: a position outside of the intake passage and overlapping the right inlet port or the left port in the rear view of the vehicle:

If the first fastening portion is located at the position a, the first fastening portion is unlikely to be obstruction to the airflow in the intake passage. If the first fastening portion is located at either the position b or c, the first fastening portion is not obstruction to the airflow in the intake passage. Likewise, if the second fastening portion is located at the position a, the second fastening portion is unlikely to be obstruction to the airflow in the intake passage. If the second fastening portion is located at either the position b or c, the second fastening portion is not obstruction to the airflow in the intake passage.

As described above, the cross member, the first fastening portion, and the second fastening portion are unlikely to be the obstruction to the airflow in the intake passage, achieving smooth airflow in the intake passage.

In summary, the straddled vehicle described above achieves smooth airflow in the intake passage as well as enhanced rigidity of the body frame. Specifically, the cross member can reinforce the right seat frame and the left seat frame suitably without significantly obstructing the airflow in the intake passage. In addition, the first fastening portion and the second fastening portion can support the right side cover and the left side cover suitably without significantly obstructing the airflow in the intake passage.

It is preferred in the straddled vehicle described above that an area of the cross member in the rear view of the vehicle is smaller than an area of the cross member in plan view of the vehicle. The area of the cross member in the rear view of the vehicle is relatively small. This obtains a relatively enlarged flow path cross sectional area of the intake passage. This can further suppress obstruction to airflow in the intake passage by the cross member. The area of the cross member in the plan view of the vehicle is relatively large. This can easily secure strength of the cross member. Accordingly, the cross member can enhance rigidity of the body frame easily.

It is preferred in the straddled vehicle described above that the cross member contacts the seat at a position higher than the right seat frame and the left seat frame. A relatively large region formed below the cross member is usable as the intake passage. This can further suppress obstruction to airflow in the intake passage by the cross member.

It is preferred in the straddled vehicle described above that the cross member includes a right hole extending in the longitudinal direction of the vehicle, and a left hole extending in the longitudinal direction of the vehicle. According to this embodiment, inside of the intake passage, the right hole and the left hole each extend substantially parallel to the intake passage. This allows air to pass through the right hole and the left hole smoothly. That is, a further enlarged flow path cross sectional area of the intake passage is obtainable. This can further suppress obstruction to airflow in the intake passage by the cross member.

It is preferred in the straddled vehicle described above that the cross member includes a right part connected to the right seat frame and extending upward, a left part connected to the left seat frame and extending upward, an upper part extending from the right part to the left part at a position higher than the right seat frame and the left seat frame, a right reinforcement portion located more leftward than the right part and configured to connect the right seat frame with the upper part, and a left reinforcement portion located more rightward than the left part and configured to connect the left seat frame with the upper part, wherein the right hole is formed with the right part, the upper part, and the right reinforcement portion, and the left hole is formed with the left part, the upper part, and the left reinforcement portion. The cross member includes the right part, the left part, and the upper part. Accordingly, the cross member can easily have the shape curved to be convex upward in the rear view of the vehicle. The cross member includes the right reinforcement portion and the left reinforcement portion. This can easily secure strength of the cross member.

It is preferred in the straddled vehicle described above that the right reinforcement portion is also connected with the right part, and the left reinforcement portion is also connected with the left part. This can further improve strength of the cross member.

It is preferred that the straddled vehicle described above that the rear fender has an upper edge curved to be convex upward in a first cross section that contains the cross member and is perpendicular to the longitudinal direction of the vehicle, and the upper edge of the rear fender contains a part located at a position higher than a lower edge of the right seat frame and a lower edge of the left seat frame in the first cross section. In the first cross section, the upper edge of the rear fender contains the part located at a position higher than a lower edge of the right seat frame and a lower edge of the left seat frame. Thus, a part of the rear fender below the cross member is located at a relatively high position. As described above, the cross member has the shape curved to be convex upward in the rear view of the vehicle. This can prevent conveniently a distance between the cross member and the rear fender in the first cross section from being excessively small. That is, a flow path cross sectional area of the intake passage can be prevented from being excessively small conveniently in the first cross section. Thus, air can flow smoothly in the intake passage even when the part of the rear fender below the cross member is located at a relatively high position. In other words, the shape of the cross member is more helpful when the part of the rear fender below the cross member is located at a relatively high position.

It is preferred that the straddled vehicle described above includes a right guide wall located inside of the intake passage and rightward of the vehicle center plane, and a left guide wall located inside of the intake passage and leftward of the vehicle center plane, wherein at least part of the right guide wall is located more leftward than the right inlet port, the right guide wall extends forward and leftward in plan view of the vehicle, at least part of the left guide wall is located more rightward than the left inlet port, and the left guide wall extends forward and rightward in the plan view of the vehicle. The right guide wall is located inside of the intake passage. The right guide wall is located rightward of the vehicle center plane. Moreover, at least part of the right guide wall is located more leftward than the right inlet port. Consequently, the right guide wall enables to conveniently guide air having flowed from the right inlet port into the intake passage. The right guide wall extends forward and leftward in the plan view of the vehicle. Consequently, a flow path for air having flowed from the right inlet port into the intake passage expands toward the air cleaner. Consequently, the right guide wall enables convenient guiding of air, having flowed from the right inlet port into the intake passage, to the air cleaner. The left guide wall is located inside of the intake passage. The left guide wall is located leftward of the vehicle center plane. Moreover, at least part of the left guide wall is located more rightward than the left inlet port. Consequently, the left guide wall enables efficient guiding of air having flowed from the left inlet port into the intake passage conveniently. The left guide wall extends forward and rightward in the plan view of the vehicle. Consequently, a flow path for air having flowed from the left inlet port into the intake passage expands toward the air cleaner. Consequently, the left guide wall enables convenient guiding of air, having flowed from the left inlet port into the intake passage, to the air cleaner.

It is preferred in the straddled vehicle described above that a front part of the right guide wall is connected to a front part of the left guide wall. This achieves convenient prevention of air from stagnating around the front part of the right guide wall and the front part of the left guide wall. Consequently, air can flow smoothly also around the front part of the right guide wall and the front part of the left guide wall.

It is preferred in the straddled vehicle described above that at least part of the right guide wall contacts the seat and the rear fender, and at least part of the left guide wall contacts the seat and the rear fender. At least part of the right guide wall contacts the seat and the rear fender. This achieves reduction in a gap between the right guide wall and the seat and reduction in a gap between the right guide wall and the rear fender. Accordingly, air is difficult to flow into the gap between the right guide wall and the seat or the gap between the right guide wall and the rear fender. Consequently, the right guide wall enables more convenient guiding of air having flowed from the right inlet port into the intake passage. Likewise, at least part of the left guide wall contacts the seat and the rear fender. This achieves reduction in a gap between the left guide wall and the seat and reduction in a gap between the left guide wall and the rear fender. Accordingly, air is difficult to flow into the gap between the left guide wall and the seat or the gap between the left guide wall and the rear fender. Consequently, the left guide wall enables more convenient guiding of air having flowed from the left inlet port into the intake passage.

It is preferred that the straddled vehicle described above further includes a position regulator configured to join the seat with either the body frame or the rear fender to regulate movement of the seat relative to the body frame or the rear fender, wherein the right guide wall is located rightward of the position regulator in the plan view of the vehicle, the right guide wall extends from a position rightward of the position regulator to a position forward of the position regulator, the left guide wall is located leftward of the position regulator in the plan view of the vehicle, the left guide wall extends from a position leftward of the position regulator to a position forward of the position regulator. The straddled vehicle includes the position regulator. Accordingly, the movement of the seat relative to the body frame or the rear fender can be restricted conveniently. The position regulator is located leftward of the right guide wall in the plan view of the vehicle. The right guide wall extends from a position rightward of the position regulator to a position forward of the position regulator. Consequently, the position regulator is unlikely to be obstruction to flow of air having flowed from the right inlet port into the intake passage. The position regulator is located rightward of the left guide wall in the plan view of the vehicle. The left guide wall extends from a position leftward of the position regulator to a position forward of the position regulator. Consequently, the position regulator is unlikely to be obstruction to flow of air having flowed from the left inlet port into the intake passage. As described above, the position regulator is unlikely to be obstruction to the airflow in the intake passage.

It is preferred in the straddled vehicle described above that the position regulator is located at a position not overlapping the right inlet port or the left inlet port in the rear view of the vehicle. This can further suppress obstruction to airflow in the intake passage by the position regulator.

It is preferred that the straddled vehicle described above further includes a fin located inside of the intake passage, wherein the fin is located more forward than the right guide wall and the left guide wall, the fin is located more leftward than the right inlet port and more rightward than the left inlet port, and the fin extends in the longitudinal direction of the vehicle in the plan view of the vehicle. The fin enables to conveniently adjust flow of air having flowed from the right inlet port into the intake passage as well as flow of air having flowed from the left inlet port into the intake passage to be directed toward the air cleaner.

It is preferred in the straddled vehicle described above that the seat includes a guide slope configured to contact an upper part of the intake passage, wherein the guide slope is located more forward than the fin, the guide slope is located above the air cleaner, and the guide slope is inclined forward and downward. The guide slope enables to conveniently adjust airflow in the intake passage around the air cleaner to be directed toward the air cleaner.

It is preferred that the straddled vehicle described above further includes a right blocking wall located inside of the intake passage and rightward of the vehicle center plane, and a left blocking wall located inside of the intake passage and leftward of the vehicle center plane, wherein the right blocking wall is located more forward than the right inlet port, the right blocking wall overlaps at least part of a boundary between the seat and the right side cover in side view of the vehicle, the left blocking wall is located more forward than the left inlet port, and the left blocking wall overlaps at least part of a boundary between the seat and the left side cover in the side view of the vehicle. The right blocking wall is located inside of the intake passage. The right blocking wall is located rightward of the vehicle center plane. The right blocking wall is located more forward than the right inlet port. The right blocking wall overlaps at least part of the boundary between the seat and the right side cover in the side view of the vehicle. Consequently, the right blocking wall can conveniently prevent flow of air from a position more forward than the right inlet port into the intake passage through the gap between the seat and the right side cover. Likewise, the left blocking wall is located inside of the intake passage. The left blocking wall is located leftward of the vehicle center plane. The left blocking wall is located more forward than the left inlet port. The left blocking wall overlaps at least part of the boundary between the seat and the left side cover in the side view of the vehicle. Consequently, the left blocking wall can conveniently block flow of air from a position more forward than the left inlet port into the intake passage through the gap between the seat and the left side cover.

It is preferred in the straddled vehicle described above that the right side cover and the rear fender each form part of a circumferential portion of the right inlet port, and the left side cover and the rear fender each form part of a circumferential portion of the left inlet port. Consequently, the right inlet port and the left inlet port can be made large easily with a relatively simple configuration.

BRIEF DESCRIPTION OF DRAWINGS

For the purpose of illustrating the invention, there are shown in the drawings several forms which are presently preferred, it being understood, however, that the invention is not limited to the precise arrangement and instrumentalities shown.

DESCRIPTION OF EMBODIMENTS

A straddled vehicle 1 according to this invention will be described hereinafter with reference to the drawings.

1. Outline Construction of Straddled Vehicle 1

Figure 1:
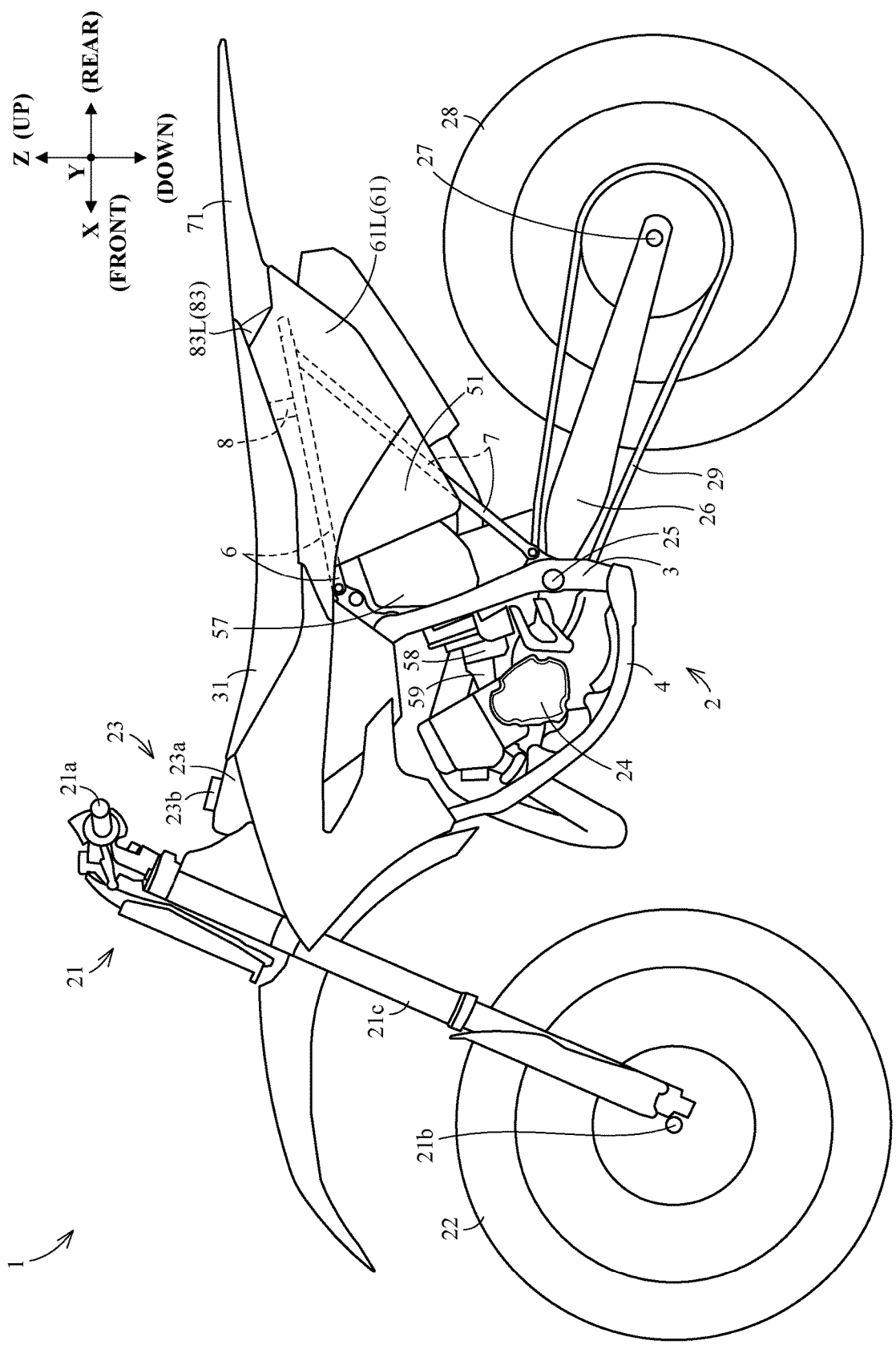
FIG. 1 is a left side view of a straddled vehicle according to an embodiment.

FIG. 1 is a left side view of a straddled vehicle according to an embodiment.

FIG. 1 shows a longitudinal direction X, a transverse direction Y, and an up-down direction Z of the straddled vehicle 1. The longitudinal direction X, transverse direction Y, and up-down direction Z are defined with reference to a driver (also called a rider) mounted on the straddled vehicle 1. The longitudinal direction X, transverse direction Y, and up-down direction Z are perpendicular to one another. The longitudinal direction X and transverse direction Y are horizontal. The up-down direction Z is vertical.

The terms "forward", "rearward", "upward", "downward", "rightward", and "leftward", respectively, mean "forward", "rearward", "upward", "downward", "rightward", and "leftward" as seen from the driver mounted on the straddled vehicle 1. Unless otherwise stated in this specification, "forward" and "rearward" include not only directions parallel to the longitudinal direction X but also directions approximate to the longitudinal direction X. The directions approximate to the longitudinal direction X are, for example, directions at angles not exceeding 45 degrees to the longitudinal direction X. Similarly, unless otherwise stated, "rightward" and "leftward" include not only directions parallel to the transverse direction Y but also directions approximate to the transverse direction Y. Unless otherwise stated, "upward" and "downward" include not only directions parallel to the up-down direction Z but also directions approximate to the up-down direction Z. For reference, the drawings show front, rear, up, down, right, and left, as appropriate.

This specification uses various expressions describing arrangements, which have the following meanings, respectively. The following description will be made taking the transverse direction Y for example, and the same may be applied to the longitudinal direction X and up-down direction Z.

The expression "Member MA is located more rightward/leftward than member MB," defines a position in the transverse direction Y of member MA relative to member MB, and does not define a position in the longitudinal direction X or the up-down direction Z of member MA relative to member MB. In the case of this expression, member MA may, or may not, overlap member MB in a side view of the vehicle.

The expression "Member MA is located rightward/leftward of member MB," without reference to a looking direction defines a position in the transverse direction Y of member MA relative to member MB, a position in the longitudinal direction X of member MA relative to member MB, and a position in the up-down direction Z of member MA relative to member MB. This expression means that member MA is located more rightward/leftward than member MB, and that at least part of member MA overlaps at least part of member MB in a side view of the vehicle.

The expression "Member MA is located rightward/leftward of member MB in a plan view of the vehicle," defines a position in the transverse direction Y of member MA relative to member MB, and a position in the longitudinal direction X of member MA relative to member MB, and does not define a position in the up-down direction Z of member MA relative to member MB. This expression means that member MA is located more rightward/leftward than member MB, and that the front end of member MA is located more forward than the rear end of member MB, and that the rear end of member MA is located more rearward than the front end of member MB.

The expression "Member MA is located rightward/leftward of member MB in a front view of the vehicle," defines a position in the transverse direction Y of member MA relative to member MB, and a position in the up-down direction Z of member MA relative to member MB, and does not define a position in the longitudinal direction X of member MA relative to member MB. This expression means that: member MA is located more rightward/leftward than member MB, the upper end of member MA is located higher than the lower end of member MB, and the lower end of member MA is located lower than the upper end of member MB.

The straddled vehicle 1 is an off-road vehicle, for example. The straddled vehicle 1 is a dual purpose vehicle, for example. The straddled vehicle 1 is also called a dual-sport motorcycle.

The straddled vehicle 1 includes a body frame 2. FIG. 1 partially shows the body frame 2 with dotted lines. The body frame 2 includes a main frame 3 and a down frame 4. The main frame 3 extends rearward and downward in the side view of the vehicle. The down frame 4 is located below the main frame 3 in the side view of the vehicle. The down frame 4 also extends rearward and downward in the side view of the vehicle. A rear part of the main frame 3 is connected to a rear part of the down frame 4. The body frame 2 further includes a head tube, not shown. The head tube is connected to a front part of the main frame 3 and a front part of the down frame 4.

The body frame 2 includes a seat frame 6, a back stay 7, and a cross member 8. The seat frame 6, the back stay 7, and the cross member 8 are located behind the main frame 3 in the side view of the vehicle. The seat frame 6 and the back stay 7 are supported by the main frame 3. The seat frame 6 extends rearward from the main frame 3 in the side view of the vehicle. The back stay 7 is located below the seat frame 6 in the side view of the vehicle. The back stay 7 extends rearward and upward from the main frame 3 in the side view of the vehicle. The seat frame 6 is connected to a rear end of the back stay 7. The cross member 8 is connected to the seat frame 6. The cross member 8 extends upward from the seat frame 6 in the side view of the vehicle.

The straddled vehicle 1 includes a steering device 21. The steering device 21 is supported by the body frame 2 (specifically, head tube). The steering device 21 is rotatable relative to the body frame 2 (specifically, head tube). The steering device 21 includes a handlebar 21a, a front axle 21b, and a front suspension 21c. The handlebar 21a is located in an upper part of the steering device 21. The front axle 21b is located lower and more forward than the handlebar 21a in the side view of the vehicle. The front suspension 21c connects the handlebar 21a with the front axle 21b. The front suspension 21c extends downward and forward in the side view of the vehicle. A driver of the straddled vehicle 1 grips the handlebar 21a. In response to operation of the handlebar 21a, the steering device 21 rotates relative to the body frame 2.

The straddled vehicle 1 includes a front wheel 22. The front wheel 22 is supported by the front axle 21b. With a rotation of the steering device 21 relative to the body frame 2, the direction of the front wheel 22 changes. Further, the front wheel 22 is rotatable about the front axle 21b.

The straddled vehicle 1 includes a fuel tank 23 and an engine 24. The fuel tank 23 stores fuel. The fuel tank 23 includes a fuel tank body 23a and a tank cap 23b. The tank cap 23b is attached to an upper part of the fuel tank body 23a. The engine 24 burns fuel to generate power for traveling the straddled vehicle 1. The fuel tank 23 and the engine 24 are located above the down frame 4 in the side view of the vehicle. The engine 24 is located below the main frame 3 in the side view of the vehicle. The engine 24 is located below the fuel tank 23 in the side view of the vehicle. The fuel tank 23 and the engine 24 are located more rearward than the steering device 21 and the front wheel 22 in the side view of the vehicle. The fuel tank 23 and the engine 24 are located more forward than the rear part of the main frame 3 in the side view of the vehicle. The fuel tank 23 and the engine 24 are supported by the body frame 2. For example, the fuel tank 23 is supported by the main frame 3. For example, the engine 24 is supported by the main frame 3 and the down frame 4. The engine 24 is fixed to the body frame 2. The engine 24 does not swing relative to the body frame 2.

The straddled vehicle 1 includes a pivot shaft 25, a swing arm 26, a rear axle 27, a rear wheel 28, and a chain 29. The pivot shaft 25 is supported by the rear part of the main frame 3. The pivot shaft 25 is located more rearward than the fuel tank 23 and the engine 24. The pivot shaft 25 is located at a position lower than the back stay 7, for example. However, the invention is not limited to this. The pivot shaft 25 may be located at a position equal to or higher than a front end of the back stay 7. The swing arm 26 is supported by the pivot shaft 25. The swing arm 26 extends rearward from the pivot shaft 25. The swing arm 26 is swingable about the pivot shaft 25. The rear axle 27 is supported by a rear part of the swing arm 26. The rear wheel 28 is supported by the rear axle 27. The rear wheel 28 is rotatable about the rear axle 27. The chain 29 transmits power of the engine 24 to the rear wheel 28. That is, the engine 24 causes the rear wheel 28 to rotate about the rear axle 27 via the chain 29.

The straddled vehicle 1 includes a seat 31. The seat 31 is located behind the fuel tank 23. At least part of the seat 31 is located at a position equal in level to the fuel tank 23 in the side view of the vehicle. The seat 31 is located at a position higher than the engine 24. The seat 31 is located above the main frame 3, the seat frame 6, and the cross member 8 in the side view of the vehicle. The seat 31 extends from a position more forward than the seat frame 6 to a position more rearward than the cross member 8.

The driver sits down across the seat 31, and puts on a knee grip. The knee grip is a holding of part of the straddled vehicle 1 between the driver's legs. The part of the straddled vehicle 1 is, for example, at least part of the main frame 3 and the fuel tank 23.

The straddled vehicle 1 includes an air cleaner 51. The air cleaner 51 is located more rearward than the fuel tank 23 and the engine 24 in the side view of the vehicle. The air cleaner 51 is located behind the main frame 3 in the side view of the vehicle. The air cleaner 51 is located more rearward than a front end of the seat frame 6 in the side view of the vehicle. The air cleaner 51 is located more forward than the cross member 8 in the side view of the vehicle. The air cleaner 51 is located below the seat 31 in the side view of the vehicle. The air cleaner 51 is located below the seat frame 6 in the side view of the vehicle. The air cleaner 51 is located higher than the front end of the back stay 7 in the side view of the vehicle. The air cleaner 51 overlaps the back stay 7 in the side view of the vehicle. The air cleaner 51 is located higher than the pivot shaft 25.

The straddled vehicle 1 includes a joint 57, a carburetor 58, and an air supply pipe 59. The joint 57 is also called air duct. The joint 57 and the air supply pipe 59 are located behind the engine 24 and in front of the air cleaner 51 in the side view of the vehicle. The air cleaner 51 is connected to the joint 57. The joint 57 is connected to the carburetor 58. The carburetor 58 is connected to the air supply pipe 59. The air supply pipe 59 is connected to an intake port (not shown) of the engine 24. The straddled vehicle 1 may include a fuel injector instead of the carburetor 58.

Figure 2:
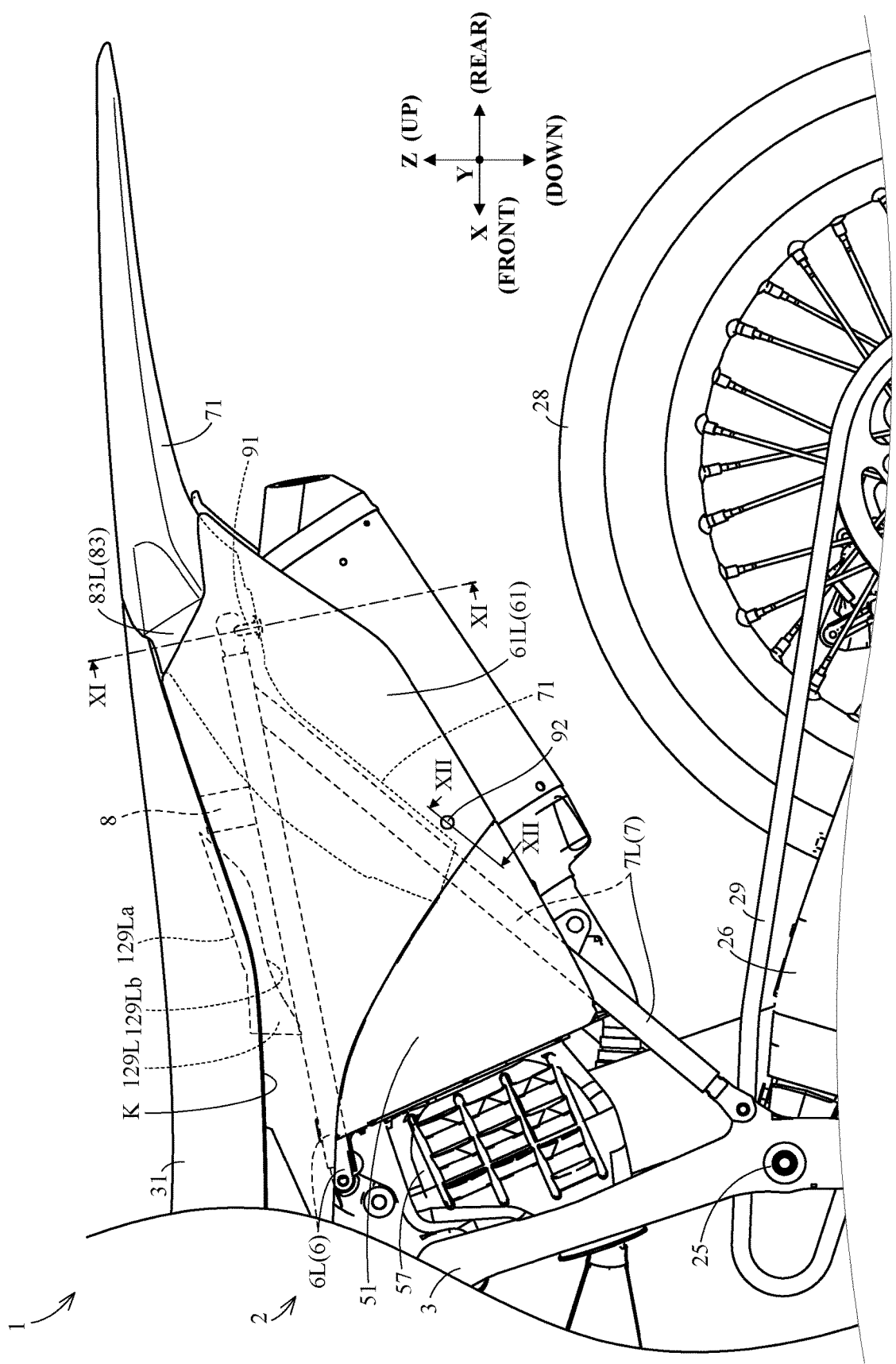
FIG. 2 is a left side view of a rear part of the straddled vehicle.
Figure 3:
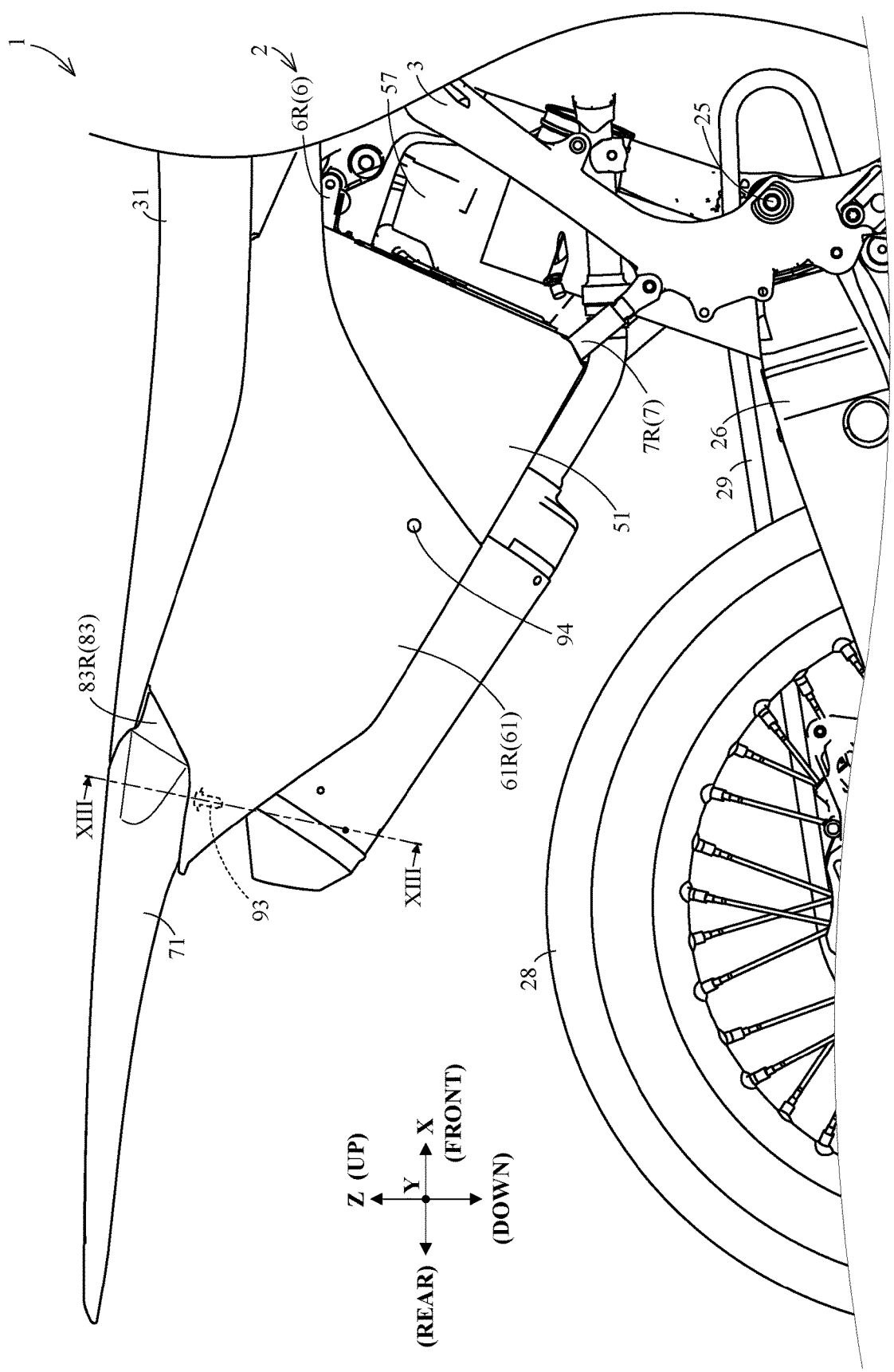
FIG. 3 is a right side view of the rear part of the straddled vehicle.

Reference is made to FIGS. 1 to 3. FIG. 2 is a left side view of a rear part of the straddled vehicle 1. FIG. 3 is a right side view of the rear part of the straddled vehicle 1. The straddled vehicle 1 includes a right side cover 61R and a left side cover 61L. FIGS. 1 and 2 each show the left side cover 61L. FIG. 3 shows the right side cover 61R. The right side cover 61R is located rightward of the left side cover 61L. When no distinction is particularly made between the right side cover 61R and the left side cover 61L, a simple term "side cover 61" is to be described.

The side cover 61 is located more rearward than the fuel tank 23 and the engine 24 in the side view of the vehicle. The side cover 61 is located more rearward than the main frame 3 in the side view of the vehicle. The side cover 61 is located more rearward than a front end of the seat 31 in the side view of the vehicle. The side cover 61 is located below the seat 31 in the side view of the vehicle. The side cover 61 is located at a position above the air cleaner 51 and a position behind the air cleaner 51 in the side view of the vehicle. The side cover 61 is located above the rear wheel 28 in the side view of the vehicle. The side cover 61 overlaps the seat frame 6, the back stay 7, and the cross member 8 in the side view of the vehicle.

The side cover 61 extends in a substantially longitudinal direction X in the side view of the vehicle. The side cover 61 passes a position above the air cleaner 51, and extends from a position more forward than the air cleaner 51 to a position more rearward than the air cleaner 51 in the side view of the vehicle. The side cover 61 extends from a position more forward than the seat frame 6 to a position more rearward than the seat frame 6 and the seat 31 in the side view of the vehicle.

The straddled vehicle 1 includes a rear fender 71. FIG. 2 partially shows the rear fender 71 with dotted lines. The rear fender 71 is located more rearward than the fuel tank 23 and the engine 24 in the side view of the vehicle. The rear fender 71 is located more rearward than the main frame 3 in the side view of the vehicle. The rear fender 71 is located at a position behind the air cleaner 51 in the side view of the vehicle. The rear fender 71 is located at a position below of the seat 31 and a position rearward of the seat 31 in the side view of the vehicle. The rear fender 71 is located above the rear wheel 28 in the side view of the vehicle. The rear fender 71 overlaps the seat frame 6 and the back stay 7 in the side view of the vehicle. The rear fender 71 overlaps the side cover 61 in the side view of the vehicle.

The rear fender 71 includes a part located below the seat frame 6, the cross member 8, and the seat 31 in the side view of the vehicle. Specifically, a front part of the rear fender 71 is located below the seat frame 6, the cross member 8, and the seat 31 in the side view of the vehicle.

The rear fender 71 extends in a substantially longitudinal direction X in the side view of the vehicle. The rear fender 71 passes below the cross member 8, and extends from a position more forward than the cross member 8 to a position more rearward than the side cover 61 in the side view of the vehicle. More specifically, the rear fender 71 extends rearward and upward from a rear part of the air cleaner 51 to a rear part of the seat 31 and a rear part of the side cover 61 in the side view of the vehicle. Moreover, the rear fender 71 extends rearward from the rear part of the seat 31 and the rear part of the side cover 61 in the side view of the vehicle.

Figure 4:
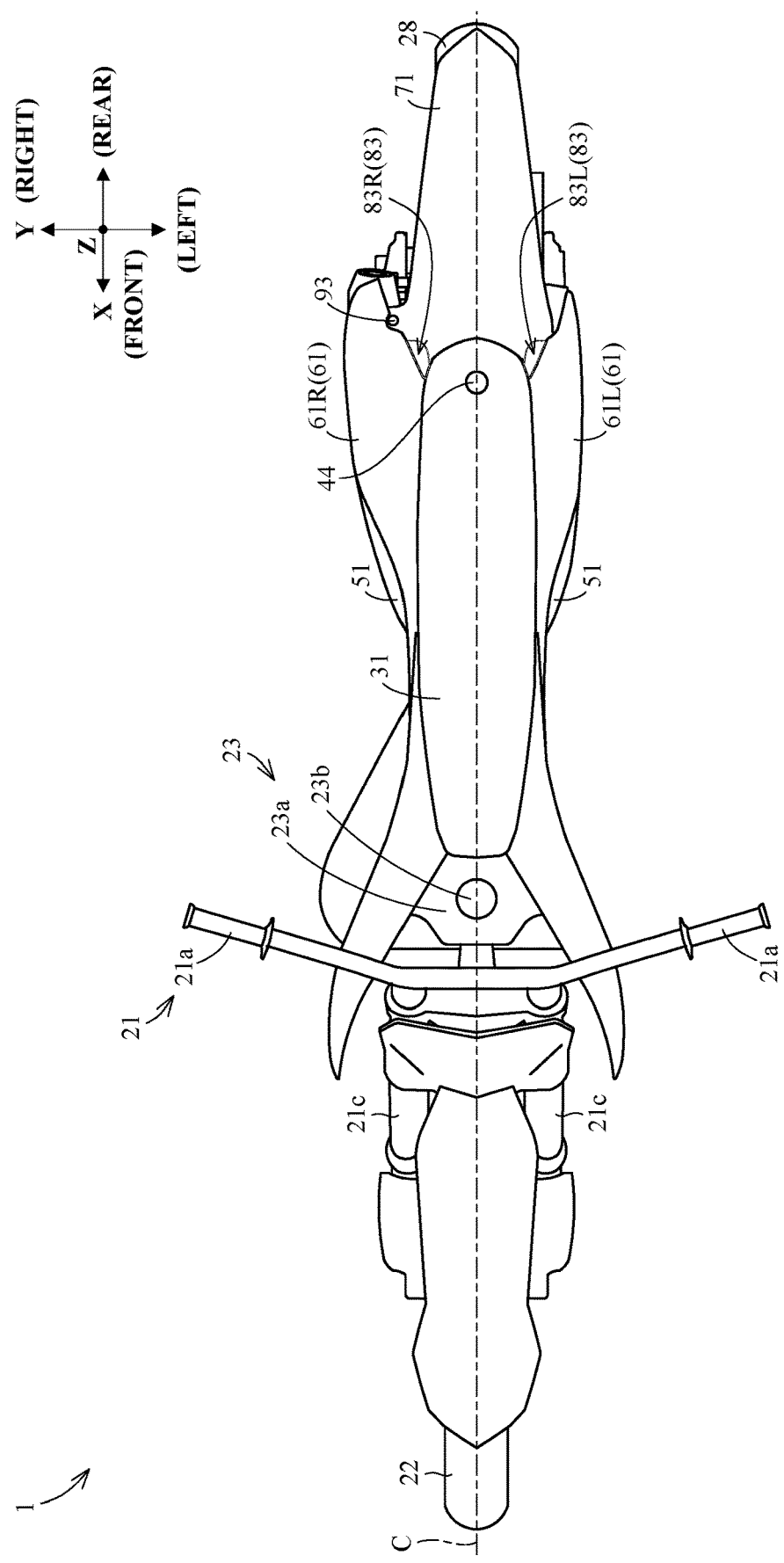
FIG. 4 is a plan view of the straddled vehicle.

FIG. 4 is a plan view of the straddled vehicle 1. FIG. 4 shows a vehicle center plane C. The vehicle center plane C is an imaginary plane that passes through the center of the straddled vehicle 1 and is perpendicular to the transverse direction Y. The seat 31 and the rear fender 71 are located on the vehicle center plane C. The front wheel 22, the fuel tank 23, and the rear wheel 28 are also located on the vehicle center plane C. The right side cover 61R is located rightward of the seat 31 in the plan view of the vehicle. The left side cover 61L is located leftward of the seat 31 in the plan view of the vehicle. The rear fender 71 extends rearward from the rear part of the seat 31 and the rear part of the side cover 61 in the plan view of the vehicle.

Figure 5:
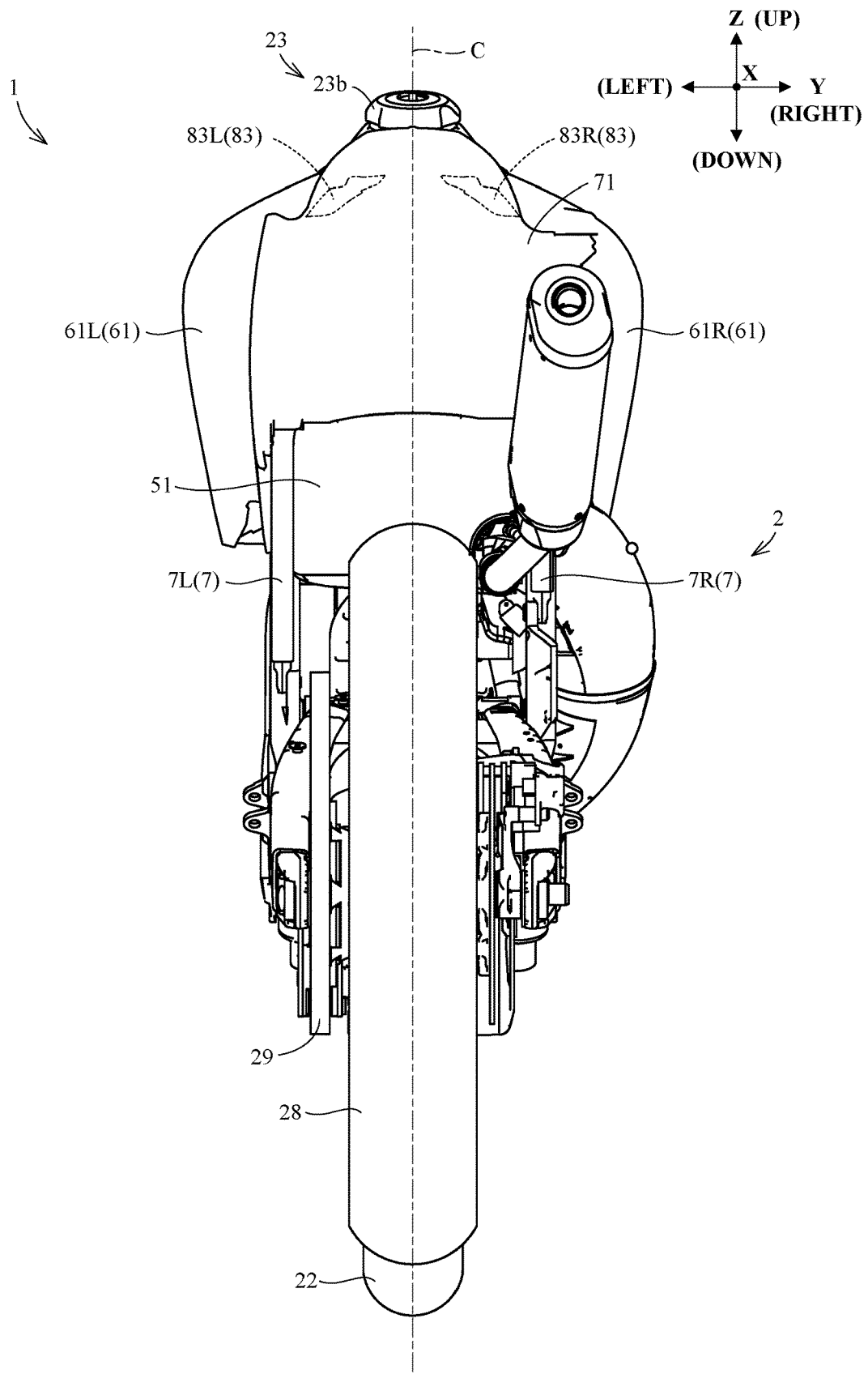
FIG. 5 is a rear view of the straddled vehicle.

FIG. 5 is a rear view of the straddled vehicle 1. The air cleaner 51 and the rear fender 71 are located on the vehicle center plane C. The rear fender 71 is located above the air cleaner 51 in the rear view of the vehicle. The rear fender 71 overlaps the seat 31 in the rear view of the vehicle. The right side cover 61R is located rightward of the air cleaner 51 and the rear fender 71 in the rear view of the vehicle. The left side cover 61L is located leftward of the air cleaner 51 and the rear fender 71 in the rear view of the vehicle.

2. Construction Below Seat 31

Figure 6:
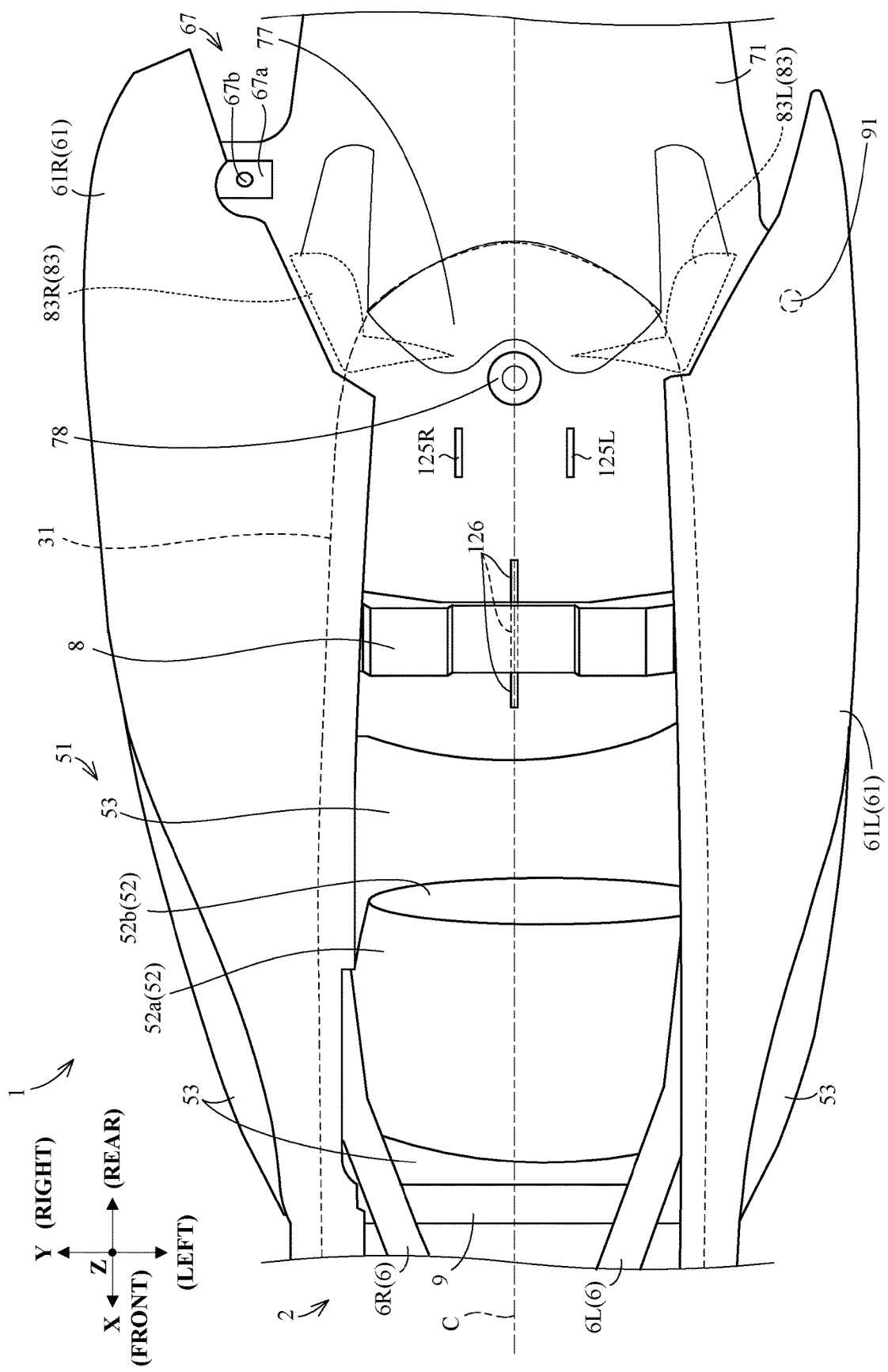
FIG. 6 is a plan view of the rear part of the straddled vehicle.
Figure 7:
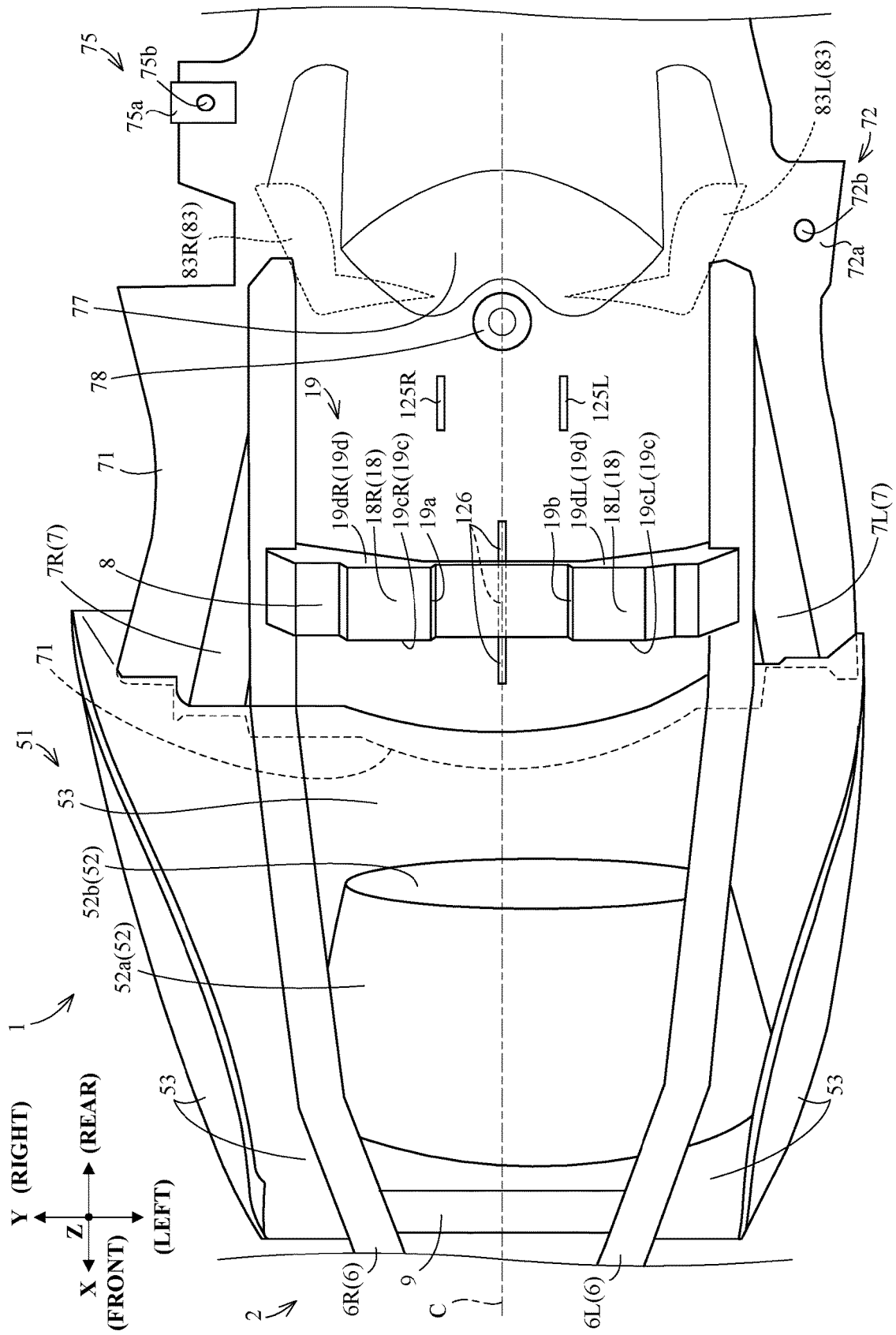
FIG. 7 is a plan view of the rear part of the straddled vehicle.

FIG. 6 is a plan view of the rear part of the straddled vehicle 1. FIG. 6 shows the seat 31 with dotted lines. FIG. 7 is also a plan view of the rear part of the straddled vehicle 1. FIG. 7 omits illustration of the seat 31 and the side cover 61. The seat frame 6 includes a right seat frame 6R and a left seat frame 6L. The left seat frame 6L is located leftward of the right seat frame 6R. The left seat frame 6L overlaps the right seat frame 6R in the side view of the vehicle, which illustration is omitted. The right seat frame 6R is located rightward of the vehicle center plane C. The left seat frame 6L is located leftward of the vehicle center plane C. The right seat frame 6R and the left seat frame 6L each extend in the longitudinal direction X in the plan view of the vehicle. The right seat frame 6R has the same construction and shape as the left seat frame 6L except for its symmetric.

The back stay 7 includes a right back stay 7R and a left back stay 7L. The left back stay 7L is located leftward of the right back stay 7R. The right back stay 7R is located rightward of the vehicle center plane C. The left back stay 7L is located leftward of the vehicle center plane C. The right back stay 7R is connected to the right seat frame 6R. The left back stay 7L is connected to the left seat frame 6L.

The cross member 8 is located between the right seat frame 6R and the left seat frame 6L. Specifically, the cross member 8 is located leftward of the right seat frame 6R and rightward of the left seat frame 6L in the plan view of the vehicle. The cross member 8 connects the right seat frame 6R with the left seat frame 6L. The cross member 8 extends in a transverse direction Y in the plan view of the vehicle.

The body frame 2 further includes a bar 9. The bar 9 is located in front of the cross member 8 in the plan view of the vehicle. The bar 9 is located more rearward than the front end of the seat frame 6 in the plan view of the vehicle. The bar 9 is located between the right seat frame 6R and the left seat frame 6L. Specifically, the bar 9 is located leftward of the right seat frame 6R and rightward of the left seat frame 6L in the plan view of the vehicle. The bar 9 connects the right seat frame 6R with the left seat frame 6L. The bar 9 extends in the transverse direction Y in the plan view of the vehicle.

The air cleaner 51 is located on the vehicle center plane C in the plan view of the vehicle. The air cleaner 51 includes an air cleaner element 52 and an air cleaner box 53. The air cleaner element 52 has a substantially cylindrical shape. The air cleaner element 52 is located on the vehicle center plane C in the plan view of the vehicle. The air cleaner element 52 includes an outer circumferential face 52a and a back face 52b. Air enters into the air cleaner element 52 from the outer circumferential face 52a and the back face 52b of the air cleaner element 52. Moreover, air flows out of the air cleaner element 52 to a joint 57. The air cleaner box 53 is located below, rightward, and leftward of the air cleaner element 52. The air cleaner 51 shown in FIGS. 1 to 5 corresponds to the air cleaner box 53.

The following describes arrangement of each component.

The seat 31 overlaps the right seat frame 6R and the left seat frame 6L in the plan view of the vehicle. The seat 31 is located above the right seat frame 6R and the left seat frame 6L. The seat 31 overlaps the right back stay 7R and the left back stay 7L in the plan view of the vehicle. The seat 31 is located above the right back stay 7R and the left back stay 7L. The seat 31 overlaps the cross member 8 in the plan view of the vehicle. The seat 31 is located above the cross member 8. The seat 31 overlaps the bar 9 in the plan view of the vehicle. The seat 31 is located above the bar 9.

The seat 31 overlaps the air cleaner 51 in the plan view of the vehicle. The seat 31 overlaps the right side cover 61R in the plan view of the vehicle. The seat 31 overlaps the left side cover 61L in the plan view of the vehicle. The seat 31 overlaps the rear fender 71 in the plan view of the vehicle. The seat 31 is located above the air cleaner 51, the right side cover 61R, and the left side cover 61L. The seat 31 is located above part of the rear fender 71 (e.g., front part of the rear fender 71). That is, the rear fender 71 contains a part located below the seat 31.

The air cleaner 51 overlaps the right seat frame 6R and the left seat frame 6L in the plan view of the vehicle. The air cleaner 51 overlaps the right back stay 7R and the left back stay 7L in the plan view of the vehicle. The air cleaner 51 does not overlap the cross member 8 in the plan view of the vehicle. The air cleaner 51 is located in front of the cross member 8 in the plan view of the vehicle. The air cleaner 51 overlaps the bar 9 in the plan view of the vehicle. The air cleaner element 52 does not overlap the bar 9 in the plan view of the vehicle. The air cleaner element 52 is located behind the bar 9 in the plan view of the vehicle.

The air cleaner 51 is located leftward of the right side cover 61R. Part of the air cleaner 51 overlaps the right side cover 61R in the plan view of the vehicle. The air cleaner 51 is located rightward of the left side cover 61L. Part of the air cleaner 51 overlaps the left side cover 61L in the plan view of the vehicle. The air cleaner element 52 is located leftward of the right side cover 61R. The air cleaner element 52 is located rightward of the left side cover 61L.

The air cleaner 51 (specifically, air cleaner box 53) overlaps the rear fender 71 in the plan view of the vehicle. FIG. 7 shows part of the rear fender 71 overlapping the air cleaner 51 in the plan view of the vehicle by dotted lines. The part of the rear fender 71 overlapping the air cleaner 51 in the plan view of the vehicle is located below the air cleaner 51. That is, the air cleaner 51 is located above part of the rear fender 71 (e.g., front part of the rear fender 71). The air cleaner element 52 does not overlap the rear fender 71 in the plan view of the vehicle. The air cleaner element 52 is located in front of the rear fender 71 in the plan view of the vehicle.

The right side cover 61R is located rightward of the right seat frame 6R. Part of the right side cover 61R overlaps the right seat frame 6R in the plan view of the vehicle. The right side cover 61R overlaps the right back stay 7R in the plan view of the vehicle. The left side cover 61L is located leftward of the left seat frame 6L. Part of the left side cover 61L overlaps the left seat frame 6L in the plan view of the vehicle. The left side cover 61L overlaps the left back stay 7L in the plan view of the vehicle. The right side cover 61R is located rightward of the cross member 8 in the plan view of the vehicle. The right side cover 61R overlaps part of the cross member 8 in the plan view of the vehicle. The left side cover 61L is located leftward of the cross member 8 in the plan view of the vehicle. The left side cover 61L overlaps part of the cross member 8 in the plan view of the vehicle. The right side cover 61R and the left side cover 61L do not overlap the bar 9 in the plan view of the vehicle. The right side cover 61R is located rightward of the bar 9. The left side cover 61L is located leftward of the bar 9.

The right side cover 61R is located rightward of the rear fender 71. Part of the right side cover 61R overlaps the rear fender 71 in the plan view of the vehicle. The left side cover 61L is located leftward of the rear fender 71. Part of the left side cover 61L overlaps the rear fender 71 in the plan view of the vehicle.

The rear fender 71 overlaps the right seat frame 6R and the left seat frame 6L in the plan view of the vehicle. The rear fender 71 overlaps the cross member 8 in the plan view of the vehicle. The rear fender 71 contains a part located below the right seat frame 6R, the left seat frame 6L, and the cross member 8. Specifically, the front part of the rear fender 71 is located below the right seat frame 6R, the left seat frame 6L, and the cross member 8.

The rear fender 71 overlaps the right back stay 7R and the left back stay 7L in the plan view of the vehicle. The rear fender 71 contains a part located below the right back stay 7R and the left back stay 7L. The rear fender 71 does not overlap the bar 9 in the plan view of the vehicle. The rear fender 71 is located behind the bar 9 in the plan view of the vehicle.

Figure 8:
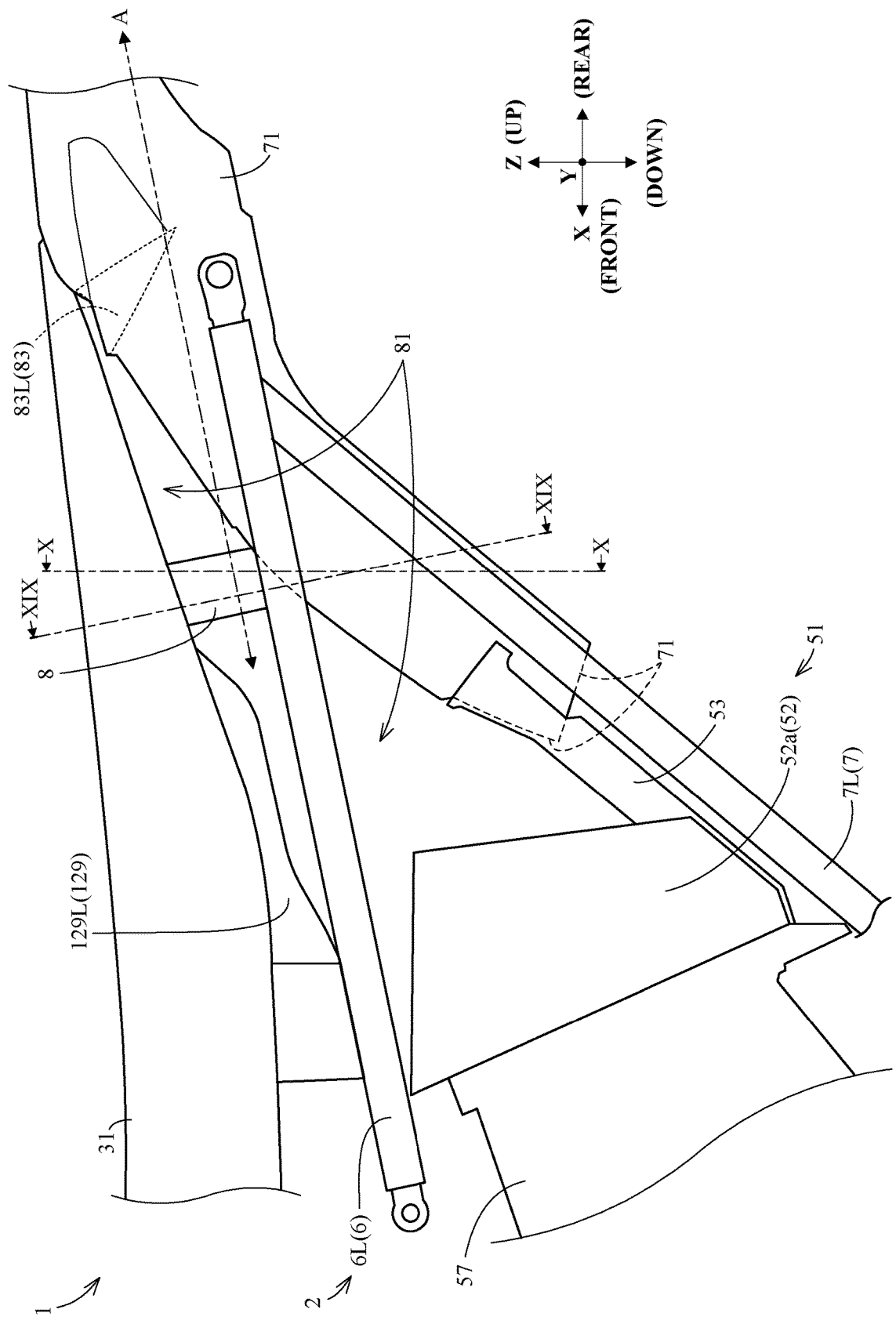
FIG. 8 is a left side view of the rear part of the straddled vehicle.
Figure 9:
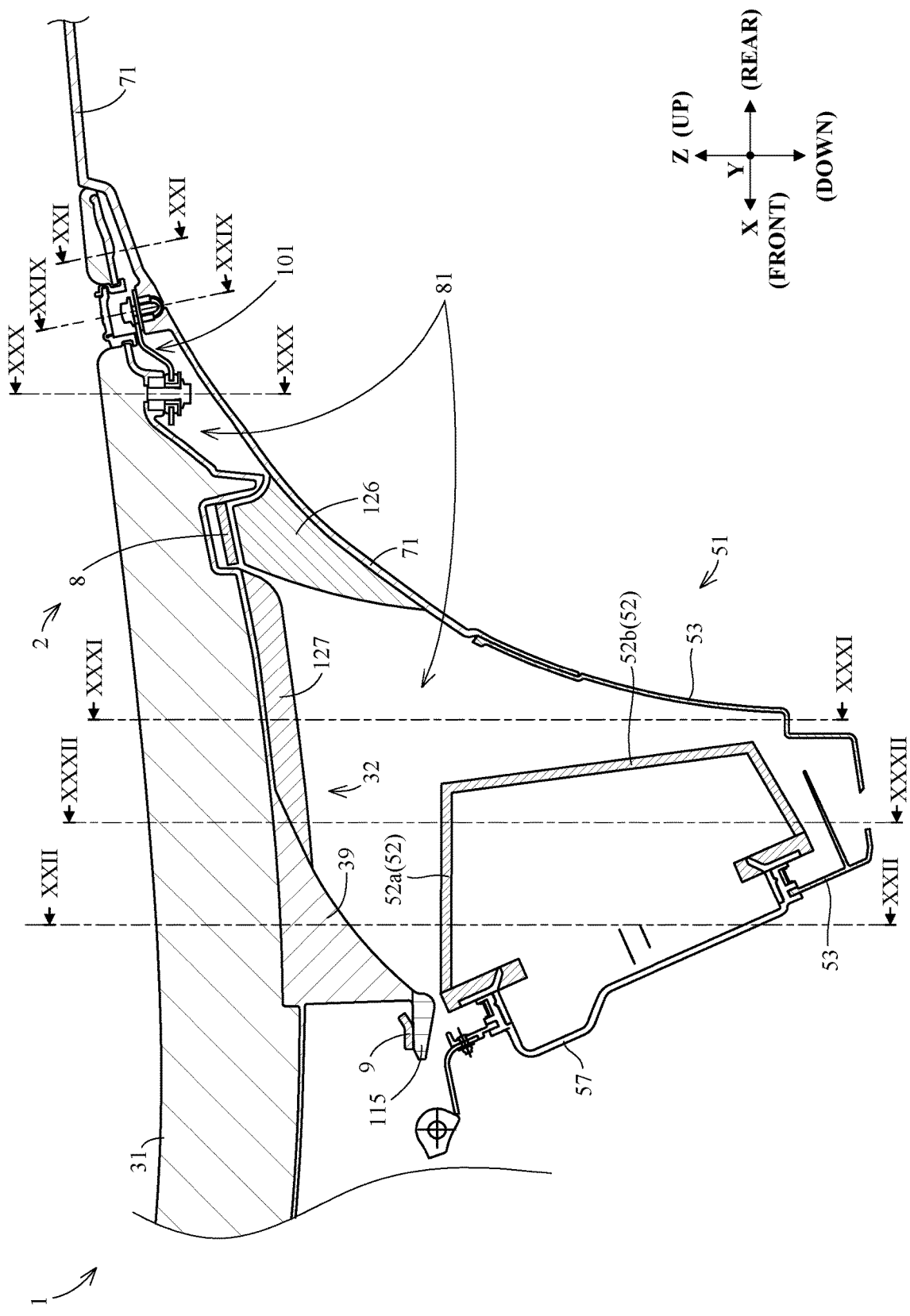
FIG. 9 is a sectional view taken on a vehicle center plane.

FIG. 8 is a left side view of the rear part of the straddled vehicle 1. FIG. 8 omits illustration of the seat 31 and the left side cover 61L. FIG. 8 omits illustration of part of the air cleaner box 53. FIG. 9 is a sectional view taken along the vehicle center plane C. The straddled vehicle 1 includes an intake passage 81. The intake passage 81 is a space where air flows toward the air cleaner 51. The intake passage 81 extends in the longitudinal direction X.

The air cleaner 51 is located in the front part of the intake passage 81. The intake passage 81 is located behind the air cleaner 51. The intake passage 81 contacts the air cleaner 51. The intake passage 81 contacts the air cleaner element 52. The intake passage 81 contacts the outer circumferential face 52a and the back face 52b of the air cleaner element 52.

The intake passage 81 extends rearward from the air cleaner 51. More specifically, the intake passage 81 extends rearward and upward.

The intake passage 81 is located below the seat 31. The intake passage 81 contacts the seat 31. The seat 31 corresponds to a top wall of the intake passage 81.

The intake passage 81 is located above the rear fender 71. The intake passage 81 contacts the rear fender 71. The rear fender 71 corresponds to a bottom wall of the intake passage 81.

Figure 10:
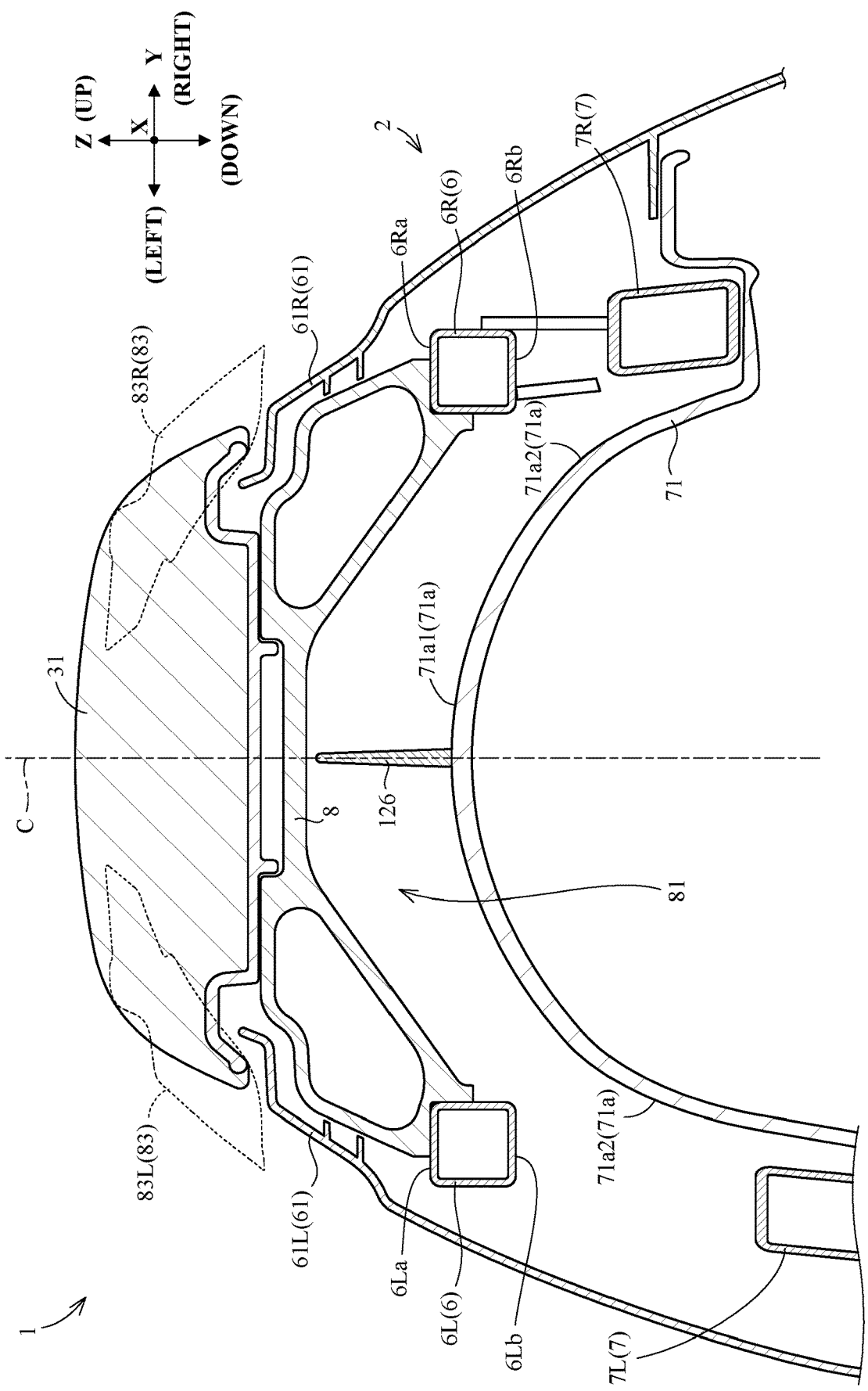
FIG. 10 is a sectional view taken on line X-X of FIG. 8.

FIG. 10 is a sectional view taken on line X-X of FIG. 8. The section taken on the line X-X corresponds to a section that contains the cross member 8 and is perpendicular to the longitudinal direction X. In this specification, the section that contains the cross member 8 and is perpendicular to the longitudinal direction X is called a "first cross section".

In the first cross section, the seat 31 passes through a position above the cross member 8, and extends in the transverse direction Y. The cross member 8 contacts the seat 31. The cross member 8 contacts the seat 31 at a position higher than the right seat frame 6R and the left seat frame 6L.

In the first cross section, the rear fender 71 passes through a position below the seat frame 6, the back stay 7, and the cross member 8, and extends in the transverse direction Y. The rear fender 71 does not contact the cross member 8. The rear fender 71 also does not contact the seat frame 6. A space below the seat frame 6 and the cross member 8 and above the rear fender 71 is part of the intake passage 81.

The right side cover 61R is located rightward of the seat frame 6, the back stay 7, and the cross member 8. In the first cross section, the right side cover 61R extends in the substantially up-down direction Z. In the first cross section, the right side cover 61R passes through a position rightward of the right seat frame 6R, and extends from the seat 31 to the rear fender 71.

The intake passage 81 is located leftward of the right side cover 61R. The intake passage 81 contacts the right side cover 61R. The right side cover 61R corresponds to a right wall of the intake passage 81.

The left side cover 61L is located leftward of the seat frame 6, the back stay 7, and the cross member 8. In the first cross section, the left side cover 61L extends in the substantially up-down direction Z. In the first cross section, the left side cover 61L passes through a position leftward of the left seat frame 6L, and extends from the seat 31 to the rear fender 71.

The intake passage 81 is located rightward of the left side cover 61L. The intake passage 81 contacts the left side cover 61L. The left side cover 61L corresponds to a left wall of the intake passage 81.

In summary, the intake passage 81 is defined by the seat 31, the right side cover 61R, the left side cover 61L, and the rear fender 71. The intake passage 81 is surrounded by the seat 31, the right side cover 61R, the left side cover 61L, and the rear fender 71.

The rear fender 71 includes an upper edge 71a in the first cross section. The upper edge 71a is curved convexly upward.

In the first cross section, the rear fender 71 is located at a relatively high position. The right seat frame 6R includes an upper edge 6Ra and a lower edge 6Rb in the first cross section. The left seat frame 6L includes an upper edge 6La and a lower edge 6Lb in the first cross section. The upper edge 71*a* of the rear fender 71 contains a first portion 71*a*1 located at a position higher than the lower edge 6Rb and the lower edge 6Lb. The first portion 71*a*1 is located leftward of the right seat frame 6R and rightward of the left seat frame 6L. The first portion 71*a*1 intersects the vehicle center plane C in the first cross section.

The upper edge 71*a* contains a second portion 71*a*2 located at a position lower than the lower edge 6Rb and the lower edge 6Lb. The second portion 71*a*2 is located rightward of the first portion 71*a*1 and leftward of the first portion 71*a*1.

The entire of the upper edge 71*a* of the rear fender 71 is located at a position lower than the upper edge 6Ra and the upper edge 6La. That is, the rear fender 71 is located at a position lower than the upper edge 6Ra and the upper edge 6La in the first cross section.

Reference is made to FIG. 4. The straddled vehicle 1 includes a right inlet port 83R and a left inlet port 83L. The right inlet port 83R communicates the intake passage 81 and the outside of the straddled vehicle 1. Also, the left inlet port 83L communicates the intake passage 81 and the outside of the straddled vehicle 1. The right inlet port 83R is located rightward of the vehicle center plane C. The left inlet port 83L is located leftward of the vehicle center plane C.

The right inlet port 83R and the left inlet port 83L are located near the rear part of the seat 31. The right inlet port 83R and the left inlet port 83L are arranged side by side in the transverse direction Y in the plan view of the vehicle. The right inlet port 83R and the left inlet port 83L are symmetric in shape. When no distinction is particularly made between the right inlet port 83R and the left inlet port 83L, a simple term "inlet port 83" is to be described.

Reference is made to FIG. 2. The left inlet port 83L is opened rearward. The left inlet port 83L is defined by the seat 31, the left side cover 61L, and the rear fender 71. The left inlet port 83L is a gap among the seat 31, the left side cover 61L, and the rear fender 71. The seat 31, the left side cover 61L, and the rear fender 71 each form part of a circumferential portion of the left inlet port 83L. Specifically, the circumferential portion of the left inlet port 83L contains a part formed with the seat 31, a part formed with the left side cover 61L, and a part formed with the rear fender 71.

Reference is made to FIG. 3. The right inlet port 83R is opened rearward. The right inlet port 83R is defined by the seat 31, the right side cover 61R, and the rear fender 71. The right inlet port 83R is a gap among the seat 31, the right side cover 61R, and the rear fender 71. The seat 31, the right side cover 61R, and the rear fender 71 each form part of a circumferential portion of the right inlet port 83R.

FIG. 5 shows the right inlet port 83R and the left inlet port 83L by dotted lines. The right inlet port 83R and the left inlet port 83L overlap the rear fender 71 (specifically, a rear part of the rear fender 71) in the rear view of the vehicle. The right inlet port 83R and the left inlet port 83L are located in substantially the same level.

Reference is made to FIG. 8. FIG. 8 shows the left inlet port 83L by dotted lines. The left inlet port 83L is located in a rear part of the intake passage 81. The left inlet port 83L is located more rearward than the air cleaner 51. The left inlet port 83L is located more rearward than the cross member 8. At least part of the left inlet port 83L is located more rearward than the left seat frame 6L. The left inlet port 83L is located at a position higher than the air cleaner 51. The left inlet port 83L is located at a position higher than the left seat frame 6L.

The right inlet port 83R is located in a rear part of the intake passage 81, which illustration is omitted. The right inlet port 83R is located more rearward than the air cleaner 51. The right inlet port 83R is located more rearward than the cross member 8. At least part of the right inlet port 83R is located more rearward than the right seat frame 6R. The right inlet port 83R is located at a position higher than the air cleaner 51. The right inlet port 83R is located at a position higher than the right seat frame 6R.

The intake passage 81 extends from the air cleaner 51 to the inlet port 83. The intake passage 81 in the longitudinal direction X ranges more rearward than the air cleaner 51 and more forward than the inlet port 83.

Reference is made to FIGS. 6 to 8. Part of the seat frame 6 is located inside of the intake passage 81. The front end of the seat frame 6 is located outside of the intake passage 81. The front end of the seat frame 6 is located more forward than the intake passage 81. The entire of the cross member 8 is located inside of the intake passage 81.

3. Support Configuration of Side Cover 61

The following describes a support configuration of the left side cover 61L and that of the right side cover 61R.

3-1. Support Configuration of Left Side Cover 61L

Reference is made to FIG. 6. The left side cover 61L is supported by the rear fender 71. Specifically, the straddled vehicle 1 includes a fastening portion 91. The fastening portion 91 fastens the left side cover 61L to the rear fender 71. The left side cover 61L is connected to the rear fender 71 via the fastening portion 91.

The fastening portion 91 is located at a position inside of the intake passage 81. The fastening portion 91 is located leftward of the left inlet port 83L in the plan view of the vehicle. The fastening portion 91 is located more rearward than the air cleaner 51 in the plan view of the vehicle. The fastening portion 91 is located more rearward than the cross member 8 in the plan view of the vehicle.

Reference is made to FIG. 2. The fastening portion 91 is located below the left inlet port 83L in the side view of the vehicle. The fastening portion 91 is located below the left seat frame 6L in the side view of the vehicle. The fastening portion 91 is located more rearward than the left back stay 7L in the side view of the vehicle.

Figure 11:
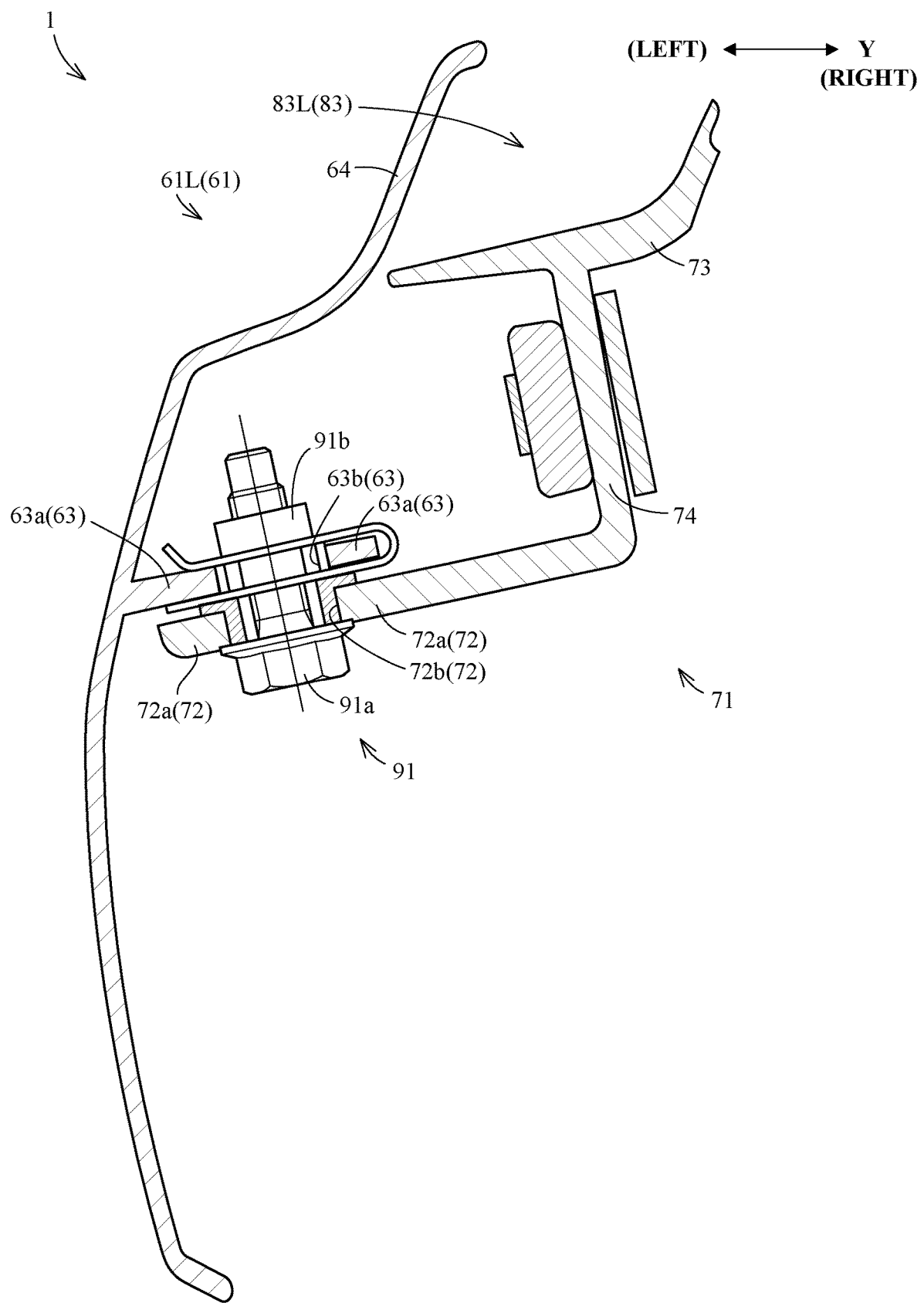
FIG. 11 is a sectional view taken on line XI-XI of FIG. 2.

FIG. 11 is a sectional view taken on line XI-XI of FIG. 2. The left side cover 61L includes a coupling portion 63. The rear fender 71 includes a coupling portion 72. The fastening portion 91 fastens the coupling portion 63 to the coupling portion 72.

For example, the coupling portion 63 includes a seating portion 63*a* and a through hole 63*b*. The seating portion 63*a* has a plate shape. The through hole 63*b* is formed in the seating portion 63*a*. The through hole 63*b* passes through the seating portion 63*a*. The coupling portion 72 includes a seating portion 72*a* and a through hole 72*b*. The seating portion 72*a* has a plate shape. The through hole 72*b* is formed in the seating portion 72*a*. The through hole 72*b* passes through the seating portion 72*a*. The seating portion 72*a* is located below the seating portion 63*a*. The seating portion 63*a* and the seating portion 72*a* are located in a stack manner. The through hole 72*b* and the through hole 63*b* are located coaxially. The fastening portion 91 includes a screw 91*a* and a nut 91*b*. The screw 91*a* is inserted into the through holes 63b and 72b. The screw 91a is coupled to the nut 91b. The screw 91a and the nut 91b grip the seating portions 63a and 72a.

Examples of the screw 91a include a bolt, a vis screw, or a tapping screw. The nut 91b is, for example, a typical nut or a speed nut (also called clip-on nut).

FIG. 11 shows part of the left inlet port 83L. The left side cover 61L further includes a portion 64. The portion 64 forms a left part of the circumferential portion of the left inlet port 83L. The rear fender 71 further includes a portion 73. The portion 73 forms a lower part of the circumferential portion of the left inlet port 83L.

The fastening portion 91 is located at a position apart from the left inlet port 83L. Specifically, the fastening portion 91 is located lower and more leftward than the left inlet port 83L.

The rear fender 71 further includes a portion 74. The portion 74 is fastened to the left seat frame 6L. Thereby, the rear fender 71 is supported by the left seat frame 6L. The rear fender 71 is fixed to the body frame 2.

The fastening portion 91 corresponds to one example of the second fastening portion in the present invention.

Reference is made to FIG. 2. The left side cover 61L is supported by the air cleaner 51. Specifically, the straddled vehicle 1 includes a fastening portion 92. The fastening portion 92 fastens the left side cover 61L and the air cleaner 51 (more specifically, air cleaner box 53). The left side cover 61L is connected to the air cleaner 51 (more specifically, air cleaner box 53) via the fastening portion 92.

The fastening portion 92 is located more forward than the left inlet port 83L in the side view of the vehicle. The fastening portion 92 is located more forward than the fastening portion 91 in the side view of the vehicle. The fastening portion 92 is located more forward than the cross member 8 in the side view of the vehicle. The fastening portion 92 is located at a position lower than the left inlet port 83L. The fastening portion 92 is located at a position lower than the fastening portion 91. The fastening portion 92 is located at a position lower than the cross member 8. The fastening portion 92 is located below the rear fender 71 in the side view of the vehicle.

Figure 12:
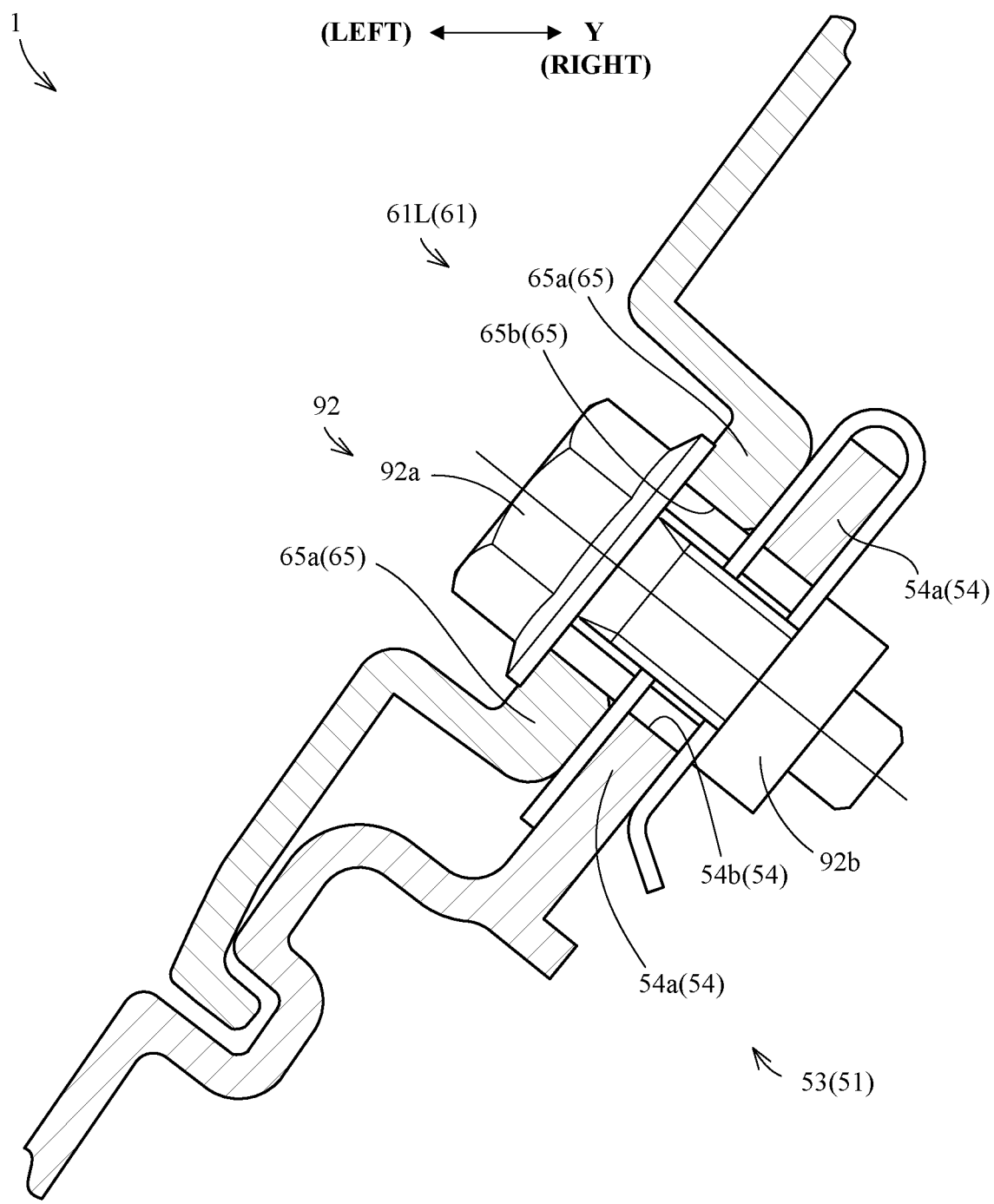
FIG. 12 is a sectional view taken on line XII-XII of FIG. 2.

FIG. 12 is a sectional view taken on line XII-XII of FIG. 2. The left side cover 61L includes a coupling portion 65. The air cleaner box 53 includes a coupling portion 54. The fastening portion 92 fastens the coupling portion 65 to the coupling portion 54.

For example, the coupling portion 65 includes a seating portion 65a and a through hole 65b. The seating portion 65a has a plate shape. The through hole 65b is formed in the seating portion 65a. The coupling portion 54 includes a seating portion 54a and a through hole 54b. The seating portion 54a has a plate shape. The through hole 54b is formed in the seating portion 54a. The seating portion 54a and the seating portion 65a are located in a stack manner. The through hole 54b and the through hole 65b are located coaxially. The fastening portion 92 includes a screw 92a and a nut 92b. The screw 92a is inserted into the through holes 65b and 54b. The screw 92a is coupled to the nut 92b. The screw 92a and the nut 92b grip the seating portions 65a and 54a.

3-2. Support Configuration of Right Side Cover 61R

Reference is made to FIG. 4. The right side cover 61R is supported by the rear fender 71. Specifically, the straddled vehicle 1 includes a fastening portion 93. The fastening portion 93 fastens the right side cover 61R to the rear fender 71. The right side cover 61R is connected to the rear fender 71 via the fastening portion 93.

The fastening portion 93 is located at a position outside of the intake passage 81. The fastening portion 93 is located more rearward than the right inlet port 83R. That is, the fastening portion 93 is located more rearward than the intake passage 81. The fastening portion 93 is located more rightward than the right inlet port 83R.

Reference is made to FIG. 3. The fastening portion 93 is located at a position lower than the right inlet port 83R.

Figure 13:
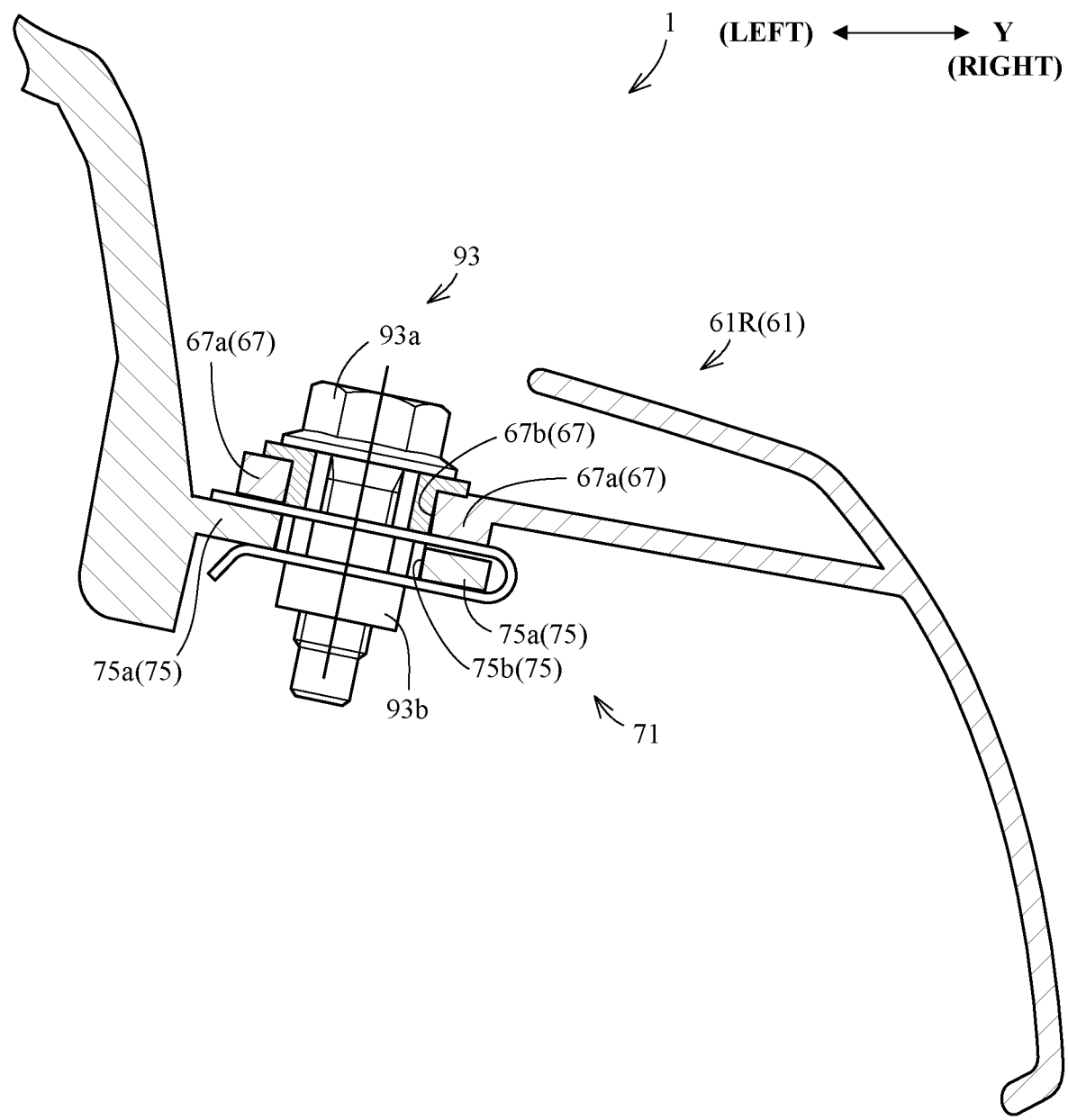
FIG. 13 is a sectional view taken on line XIII-XIII of FIG. 3.

FIG. 13 is a sectional view taken on line XIII-XIII of FIG. 3. The right side cover 61R includes a coupling portion 67. The rear fender 71 includes a coupling portion 75. The fastening portion 93 fastens the coupling portion 67 to the coupling portion 75.

For example, the coupling portion 67 includes a seating portion 67a and a through hole 67b. The seating portion 67a has a plate shape. The through hole 67b is formed in the seating portion 67a. The coupling portion 75 includes a seating portion 75a and a through hole 75b. The seating portion 75a has a plate shape. The through hole 75b is formed in the seating portion 75a. The seating portion 75a and the seating portion 67a are located in a stack manner. The through hole 75b and the through hole 67b are located coaxially. The fastening portion 93 includes a screw 93a and a nut 93b. The screw 93a is inserted into the through holes 67b and 75b. The nut 93b is attached to the screw 93a. The screw 93a and the nut 93b grip the seating portions 67a and 75a.

The fastening portion 93 corresponds to one example of the first fastening portion in the present invention.

Reference is made to FIG. 3. The right side cover 61R is supported by the air cleaner 51. Specifically, the straddled vehicle 1 includes a fastening portion 94. The fastening portion 94 fastens the right side cover 61R and the air cleaner 51 (more specifically, air cleaner box 53). The right side cover 61R is connected to the air cleaner 51 (more specifically, air cleaner box 53) via the fastening portion 94.

The fastening portion 94 is located more forward than the right inlet port 83R in the side view of the vehicle. The fastening portion 94 is located more forward than the fastening portion 93 in the side view of the vehicle. The fastening portion 94 is located at a position lower than the right inlet port 83R. The fastening portion 94 is located at a position lower than the fastening portion 93.

The configuration that the fastening portion 94 fastens the right side cover 61R and the air cleaner 51 is substantially the same as the configuration that the fastening portion 92 fastens the left side cover 61L and the air cleaner 51.

4. Profile of Cross Member 8

Figure 14:
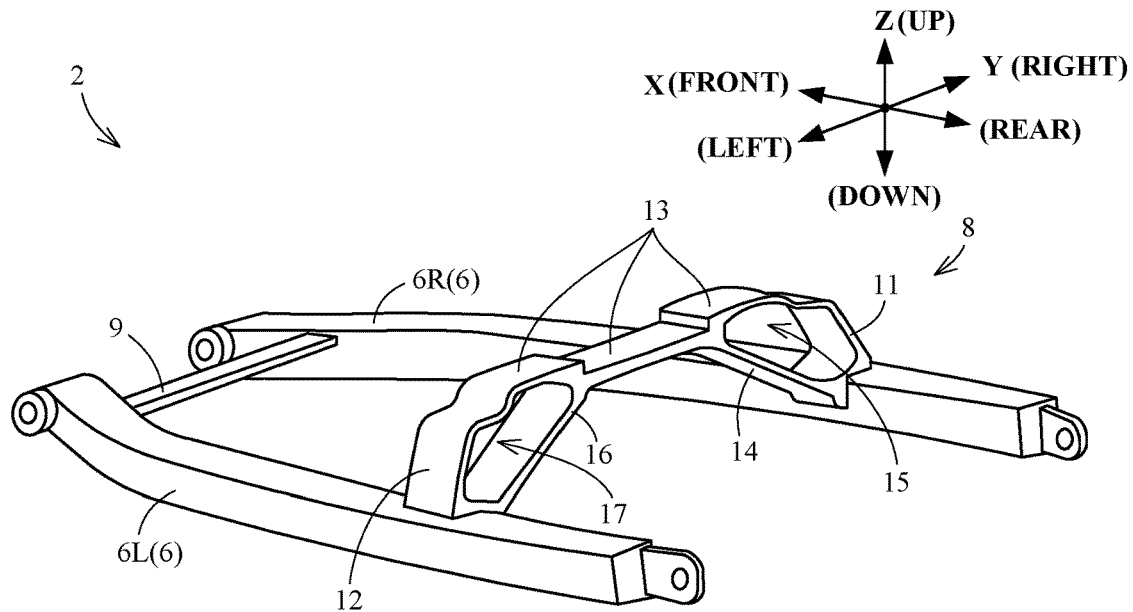
FIG. 14 is a perspective view of a seat frame, a cross member, and a bar.
Figure 15:
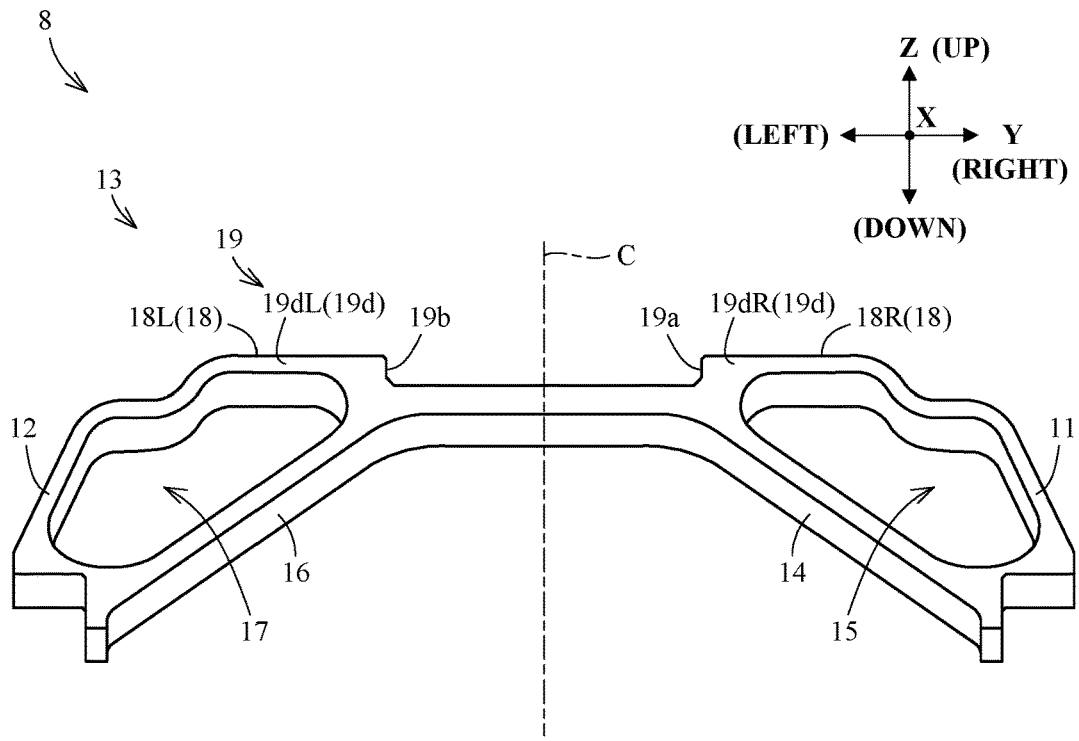
FIG. 15 is a rear view of the cross member.

Reference is made to FIGS. 7, 8, 14, and 15. FIG. 14 is a perspective view of the seat frame 6, the cross member 8, and the bar 9. FIG. 15 is a rear view of the cross member 8.

The cross member 8 is configured with a thin curved plate member. Each element of the cross member 8 is long in the longitudinal direction X and short in the up-down direction Z. In other words, the cross member 8 has a length in the up-down direction Z smaller than that in the longitudinal direction X in its cross section perpendicular to the transverse direction Y.

Reference is made to FIGS. 7 and 15. An area of the cross member 8 in the rear view of the vehicle is smaller than an area of the cross member 8 in the plan view of the vehicle. More specifically, the cross member 8 has a projection area projected on an imaginary plane perpendicular to the longitudinal direction X that is smaller than a projection area projected on an imaginary plane perpendicular to the up-down direction Z.

Reference is made to FIGS. 14 and 15. The cross member 8 has a shape curved to be convex upward in the rear view of the vehicle. The cross member 8 includes a right part 11, a left part 12, and an upper part 13. The right part 11 is located rightward of the vehicle center plane C. The right part 11 is connected to the right seat frame 6R. The right part 11 extends upward from the right seat frame 6R. The left part 12 is located leftward of the vehicle center plane C. The left part 12 is connected to the left seat frame 6L. The left part 12 extends upward from the left seat frame 6L. The upper part 13 is located at a position higher than the right seat frame 6R and the left seat frame 6L. The upper part 13 connects the right part 11 with the left part 12. The upper part 13 is connected to an upper end of the right part 11 and an upper end of the left part 12. The upper part 13 extends from the right part 11 to the left part 12. The upper part 13 extends in the transverse direction Y.

The cross member 8 includes a right reinforcement portion 14. The right reinforcement portion 14 is located rightward of the vehicle center plane C. The right reinforcement portion 14 is located more leftward than the right part 11. The right reinforcement portion 14 connects the right seat frame 6R with the upper part 13. The right reinforcement portion 14 is also connected with the right part 11. More specifically, the right reinforcement portion 14 extends leftward and upward. The right reinforcement portion 14 includes a lower end and an upper end. The lower end of the right reinforcement portion 14 is connected to the right seat frame 6R. The lower end of the right reinforcement portion 14 is also connected to the right part 11. The upper end of the right reinforcement portion 14 is connected to the upper part 13. The upper end of the right reinforcement portion 14 is located more leftward than the upper end of the right part 11.

The cross member 8 has a right hole 15. The right hole 15 is located rightward of the vehicle center plane C. The right hole 15 is formed with the right part 11, the upper part 13, and the right reinforcement portion 14. The right hole 15 is surrounded by the right part 11, the upper part 13, and the right reinforcement portion 14. The right hole 15 extends in the substantially longitudinal direction X.

The cross member 8 includes a left reinforcement portion 16. The left reinforcement portion 16 is located leftward of the vehicle center plane C. The left reinforcement portion 16 is located more rightward than the left part 12. The left reinforcement portion 16 connects the left seat frame 6L with the upper part 13. The left reinforcement portion 16 is also connected with the left part 12. More specifically, the left reinforcement portion 16 extends rightward and upward. The left reinforcement portion 16 includes a lower end and an upper end. The lower end of the left reinforcement portion 16 is connected to the left seat frame 6L. The lower end of the left reinforcement portion 16 is also connected to the left part 12. The upper end of the left reinforcement portion 16 is connected to the upper part 13. The upper end of the left reinforcement portion 16 is located more rightward than the upper end of the left part 12.

The cross member 8 has a left hole 17. The left hole 17 is located leftward of the vehicle center plane C. The left hole 17 is formed with the left part 12, the upper part 13, and the left reinforcement portion 16. The left hole 17 is surrounded by the left part 12, the upper part 13, and the left reinforcement portion 16. The left hole 17 extends in the substantially longitudinal direction X.

Here in FIGS. 6 and 7, the illustration of the right hole 15 and the left hole 17 is omitted.

Reference is made to FIG. 8. FIG. 8 shows an axis A of the right hole 15. The axis A is substantially parallel to the longitudinal direction X. More specifically, the axis A extends rearward and upward. The axis A is perpendicular to the transverse direction Y. The axis A is parallel to an axis of the left hole 17. The axis A conforms to the axis of the left hole 17 in the side view of the vehicle.

The cross member 8 is manufactured, for example, by extrusion. The cross member 8 has a cross-sectional shape which is substantially uniform along an extrusion direction. The axis A conforms to the extrusion direction of the cross member 8.

5. Support Configuration of Seat 31

The support configuration of the seat 31 includes a configuration of receiving a load of the seat 31, a configuration of positioning the seat 31 in the horizontal direction, and a configuration of regulating movement of the seat 31. The following describes these configurations.

5-1. Configuration of Receiving Load of Seat 31

Figure 16:
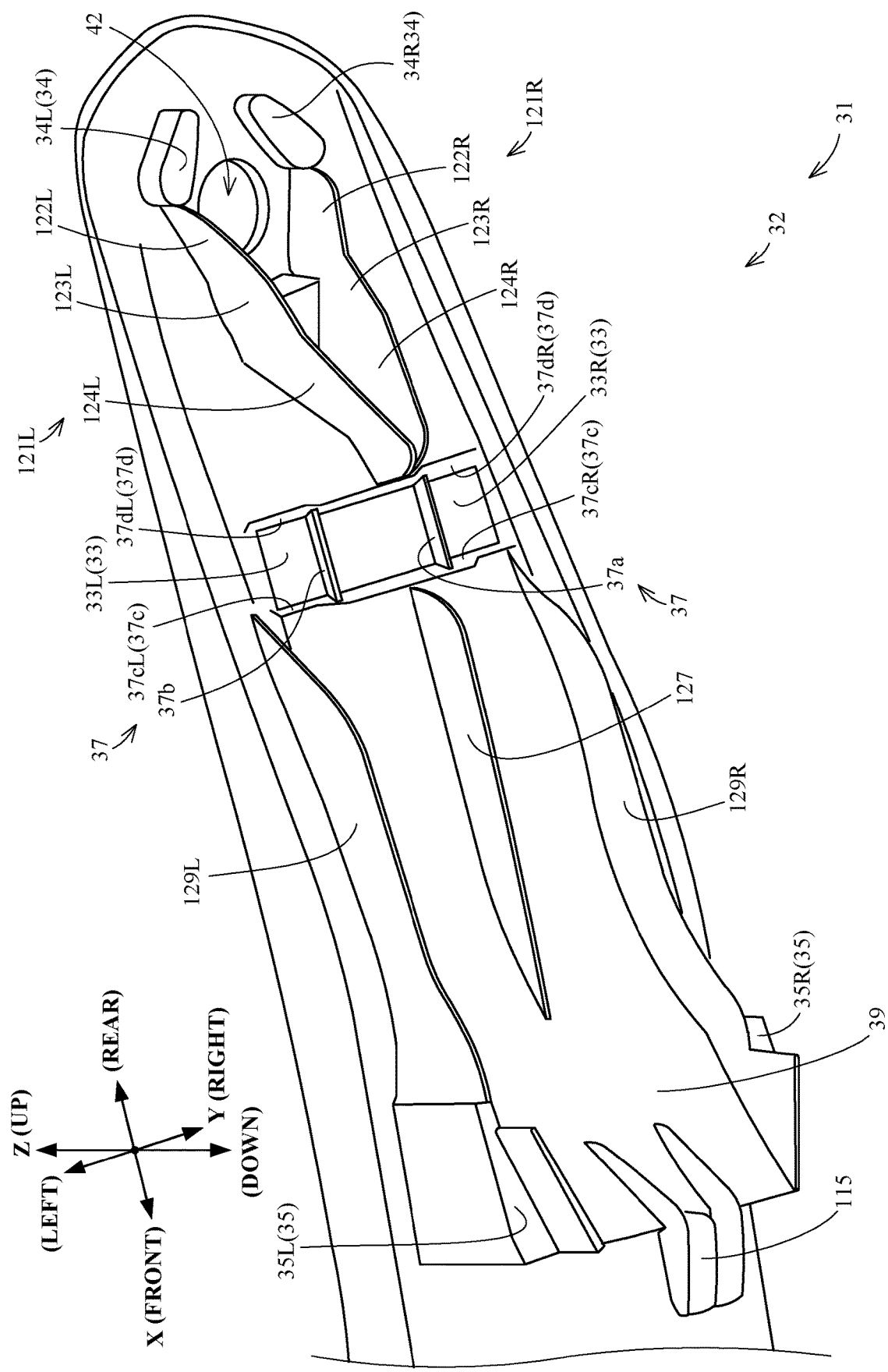
FIG. 16 is a perspective view of a base of the seat.
Figure 17:
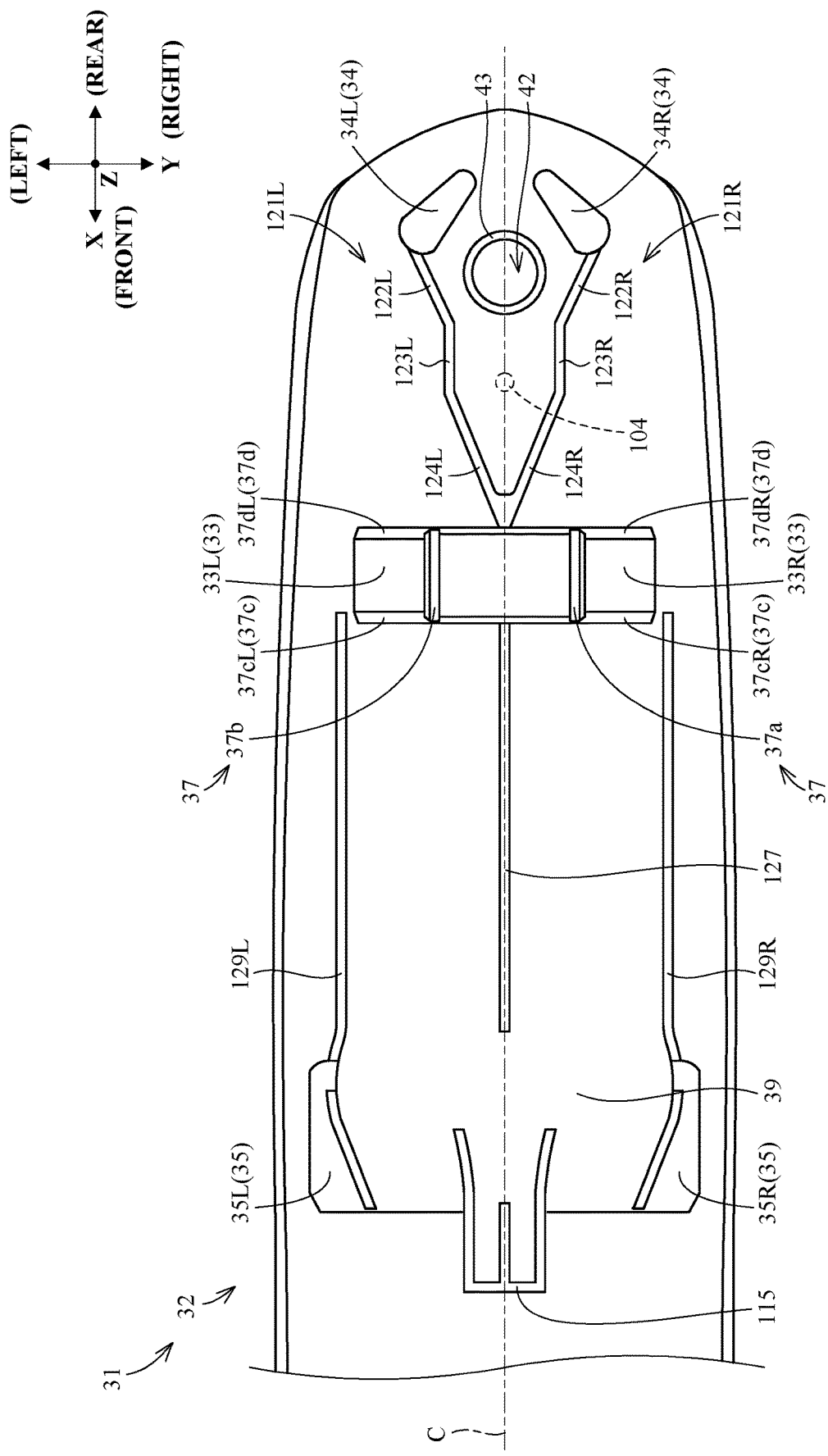
FIG. 17 is a bottom view of the seat.

FIG. 16 is a perspective view of a base of the seat 31. FIG. 17 is a bottom view of the seat 31. The seat 31 includes a base 32. The base 32 contacts the intake passage 81. The base 32 contacts an upper part of the intake passage 81.

The seat 31 includes a first load transmitting portion 33, a second load transmitting portion 34, and a third load transmitting portion 35. The first load transmitting portion 33, the second load transmitting portion 34, and the third load transmitting portion 35 are located on the base 32 of the seat 31. The second load transmitting portion 34 is located more rearward than the first load transmitting portion 33. The third load transmitting portion 35 is located more forward than the first load transmitting portion 33.

The first load transmitting portion 33 includes a plane substantially horizontal and directed downward. Likewise, the second load transmitting portion 34 and the third load transmitting portion 35 each include a plane substantially horizontal and directed downward.

The first load transmitting portion 33 includes a right part 33R and a left part 33L. The second load transmitting portion 34 includes a right part 34R and a left part 34L. The third load transmitting portion 35 includes a right part 35R and a left part 35L. The right parts 33R, 34R, and 35R are each located rightward of the vehicle center plane C. The left parts 33L, 34L, and 35L are each located leftward of the vehicle center plane C. The right part 33R and the left part 33L are arranged side by side in the transverse direction Y. The right part 34R and the left part 34L are arranged side by side in the transverse direction Y. The right part 35R and the left part 35L are arranged side by side in the transverse direction Y.

At least part of the right part 33R of the first load transmitting portion 33 is located more rightward than the second load transmitting portion 34. At least part of the left part 33L of the first transmitting portion 33 is located more leftward than the second load transmitting portion 34. At least part of the right part 35R of the third load transmitting portion 35 is located more rightward than the first load transmitting portion 33 and the second load transmitting portion 34. At least part of the left part 35L of the third load transmitting portion 35 is located more leftward than the first load transmitting portion 33 and the second load transmitting portion 34.

Figure 18:
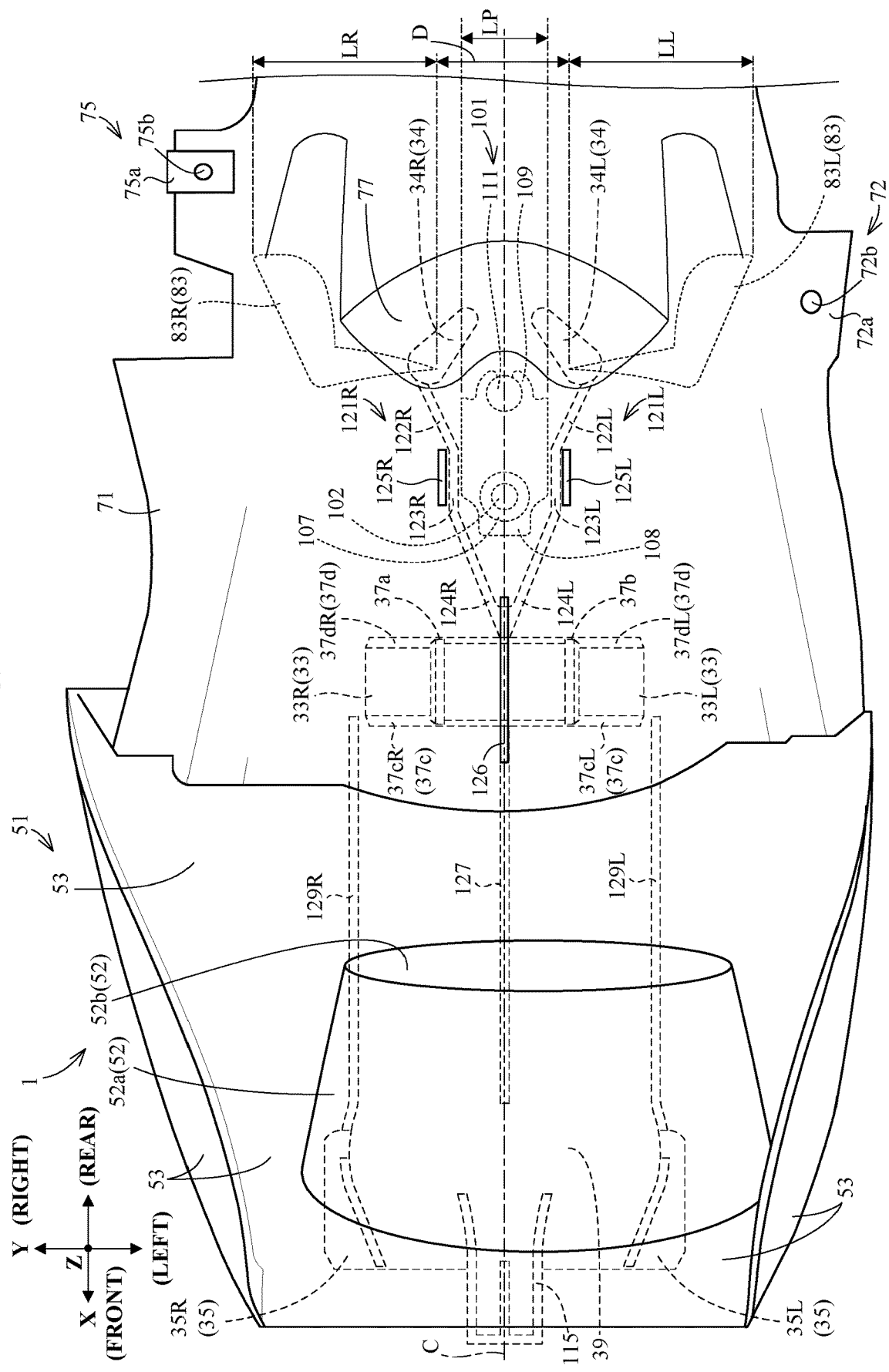
FIG. 18 is a plan view of an air cleaner and a rear fender.

FIG. 18 is a plan view of the air cleaner 51 and the rear fender 71. FIG. 18 shows the first load transmitting portion 33, the second load transmitting portion 34, and the third load transmitting portion 35 by dotted lines. FIG. 18 shows the inlet port 83 by dotted lines. The first load transmitting portion 33, the second load transmitting portion 34, and the third load transmitting portion 35 are located more forward than the right inlet port 83R and the left inlet port 83L in the plan view of the vehicle. The first load transmitting portion 33 and the second load transmitting portion 34 are located more rearward than the air cleaner 51 in the plan view of the vehicle. The third load transmitting portion 35 overlaps the air cleaner 51 in the plan view of the vehicle. Part of the third load transmitting portion 35 overlaps the air cleaner element 52 in the plan view of the vehicle.

The second load transmitting portion 34 is located adjacent to the inlet port 83 in the plan view of the vehicle. The second load transmitting portion 34 is located leftward of the right inlet port 83R and rightward of the left inlet port 83L in the plan view of the vehicle. More specifically, at least part of the right part 34R of the second load transmitting portion 34 is located more leftward than the right inlet port 83R. At least part of the left part 34L of the second load transmitting portion 34 is located more rightward than the left inlet port 83L. The right inlet port 83R, the second load transmitting portion 34, and the left inlet port 83L are arranged side by side in the transverse direction Y in the plan view of the vehicle.

At least part of the right inlet port 83R is located more rightward than the first load transmitting portion 33, the second load transmitting portion 34, and the third load transmitting portion 35. At least part of the left inlet port 83L is located more leftward than the first load transmitting portion 33, the second load transmitting portion 34, and the third load transmitting portion 35.

Reference is made to FIGS. 7 and 15. The cross member 8 includes a load receiver 18. The load receiver 18 is located on the upper part 13 of the cross member 8. The load receiver 18 includes a plane substantially horizontal and directed upward. The load receiver 18 is located at a position overlapping the first load transmitting portion 33 in the plan view of the vehicle.

The load receiver 18 includes a right part 18R and a left part 18L. The right part 18R is located rightward of the vehicle center plane C. The left part 18L is located leftward of the vehicle center plane C.

Figure 19:
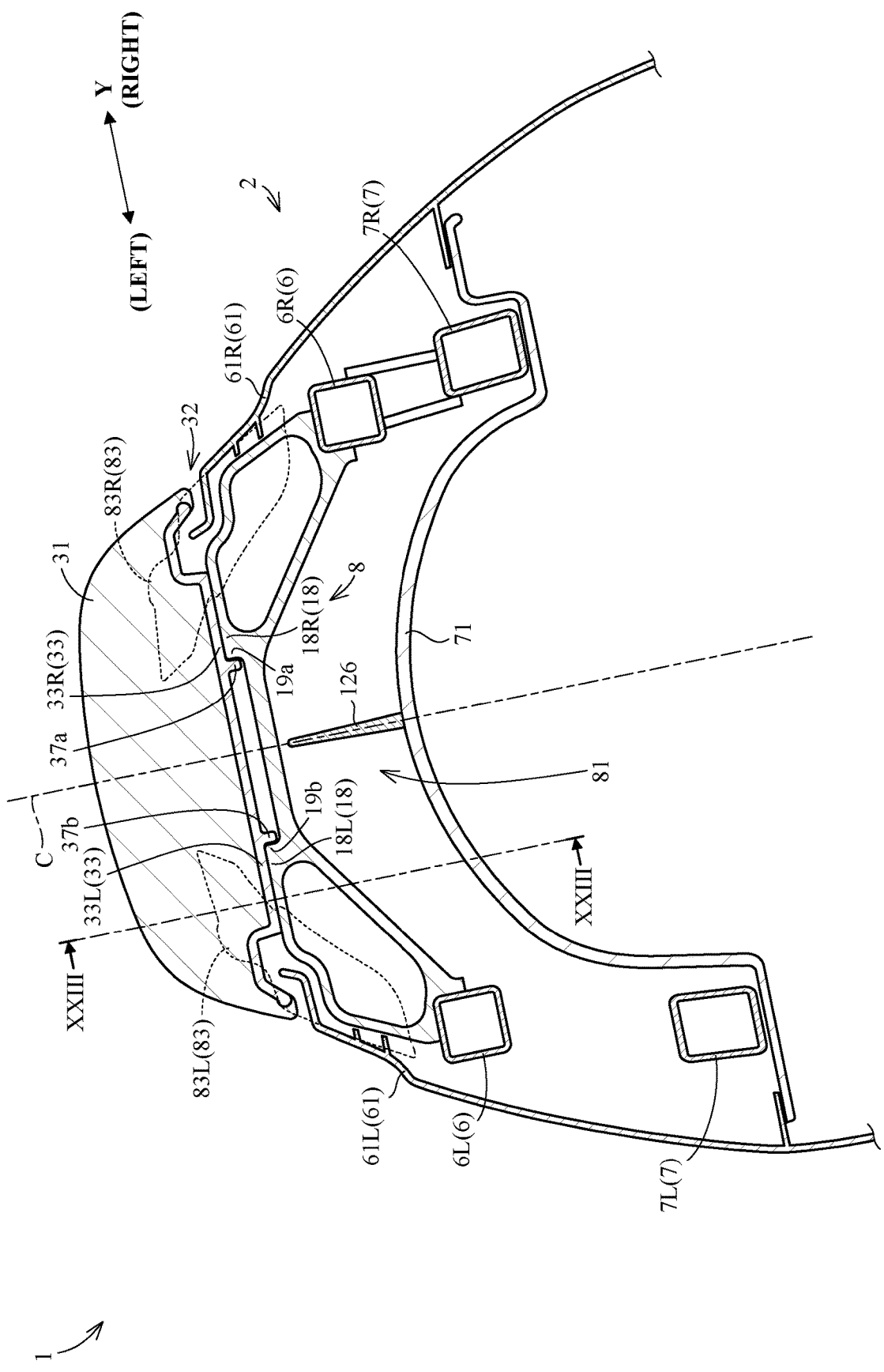
FIG. 19 is a sectional view taken on line XIX-XIX of FIG. 8.

FIG. 19 is a sectional view taken on line XIX-XIX of FIG. 8. The line XIX-XIX of FIG. 8 is perpendicular to the axis A of the right hole 15. The load receiver 18 of the cross member 8 is located below the first load transmitting portion 33 of the seat 31. The load receiver 18 contacts the first load transmitting portion 33.

Specifically, the right part 18R is located below the right part 33R. The right part 18R is in surface contact with the right part 33R. The left part 18L is located below the left part 33L. The left part 18L is in surface contact with the left part 33L.

The load receiver 18 receives a load of the seat 31 via the first load transmitting portion 33. The load of the seat 31 applied to the load receiver 18 is a downward external force acting on the load receiver 18. In other words, the load that the load receiver 18 receives from the seat 31 is a downward external force exerted on the load receiver 18.

Moreover, the load receiver 18 restricts movement of the first load transmitting portion 33 to a position lower than the load receiver 18. That is, the load receiver 18 restricts downward movement of the seat 31 relative to the cross member 8. However, the load receiver 18 allows upward movement of the seat 31 relative to the cross member 8.

Figure 20:
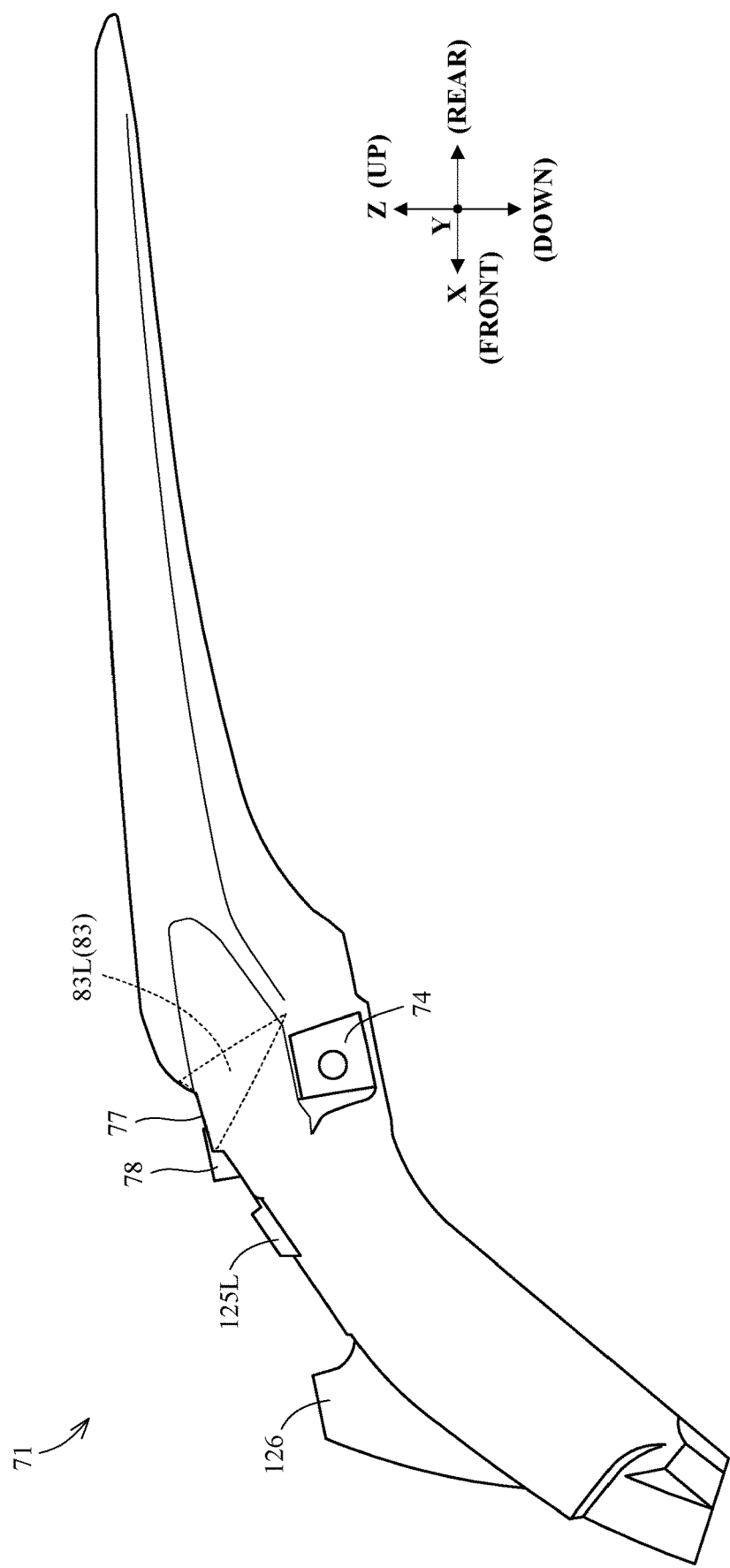
FIG. 20 is a side view of the rear fender.

Reference is made to FIGS. 18 and 20. FIG. 20 is a side view of the rear fender 71. FIG. 20 shows the inlet port 83 by dotted lines.

The rear fender 71 includes a load receiver 77. The load receiver 77 is located on a top face of the rear fender 71. The load receiver 77 includes a plane substantially horizontal and directed upward. The load receiver 77 is located at a position overlapping the second load transmitting portion 34 in the plan view of the vehicle.

The load receiver 77 is located adjacent to the inlet port 83 in the plan view of the vehicle. At least part of the load receiver 77 is located leftward of the right inlet port 83R and rightward of the left inlet port 83L in the plan view of the vehicle. The right inlet port 83R, the load receiver 77, and the left inlet port 83L are arranged side by side in the transverse direction Y in the plan view of the vehicle. The load receiver 77 extends from a position rightward of the vehicle center plane C to a position leftward of the vehicle center plane C.

Figure 21:
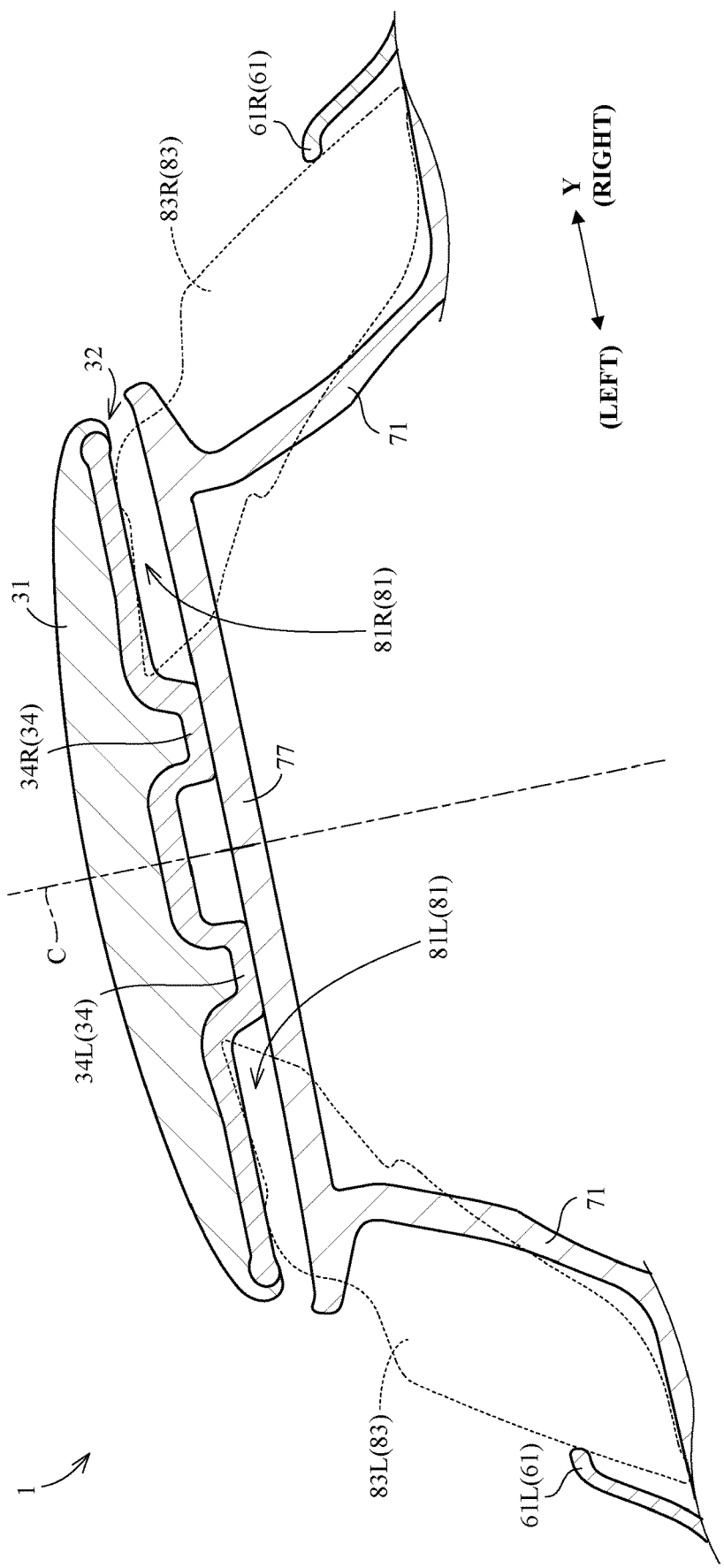
FIG. 21 is a sectional view taken on line XXI-XXI of FIG. 9.

FIG. 21 is a sectional view taken on line XXI-XXI of FIG. 9. FIG. 21 shows the inlet port 83 by dotted lines. The load receiver 77 of the rear fender 71 is located below the second load transmitting portion 34 of the seat 31. The load receiver 77 contacts the second load transmitting portion 34.

Specifically, the load receiver 77 is located below the right part 34R and the left part 34L. The load receiver 77 is in surface contact with the right part 34R and the left part 34L.

The load receiver 77 receives a load of the seat 31 via the second load transmitting portion 34. The load of the seat 31 applied to the load receiver 77 is a downward external force acting on the load receiver 77.

Moreover, the load receiver 77 restricts movement of the second load transmitting portion 34 to a position lower than the load receiver 77. That is, the load receiver 77 restricts downward movement of the seat 31 relative to the rear fender 71. However, the load receiver 77 allows upward movement of the seat 31 relative to the rear fender 71.

Figure 22:
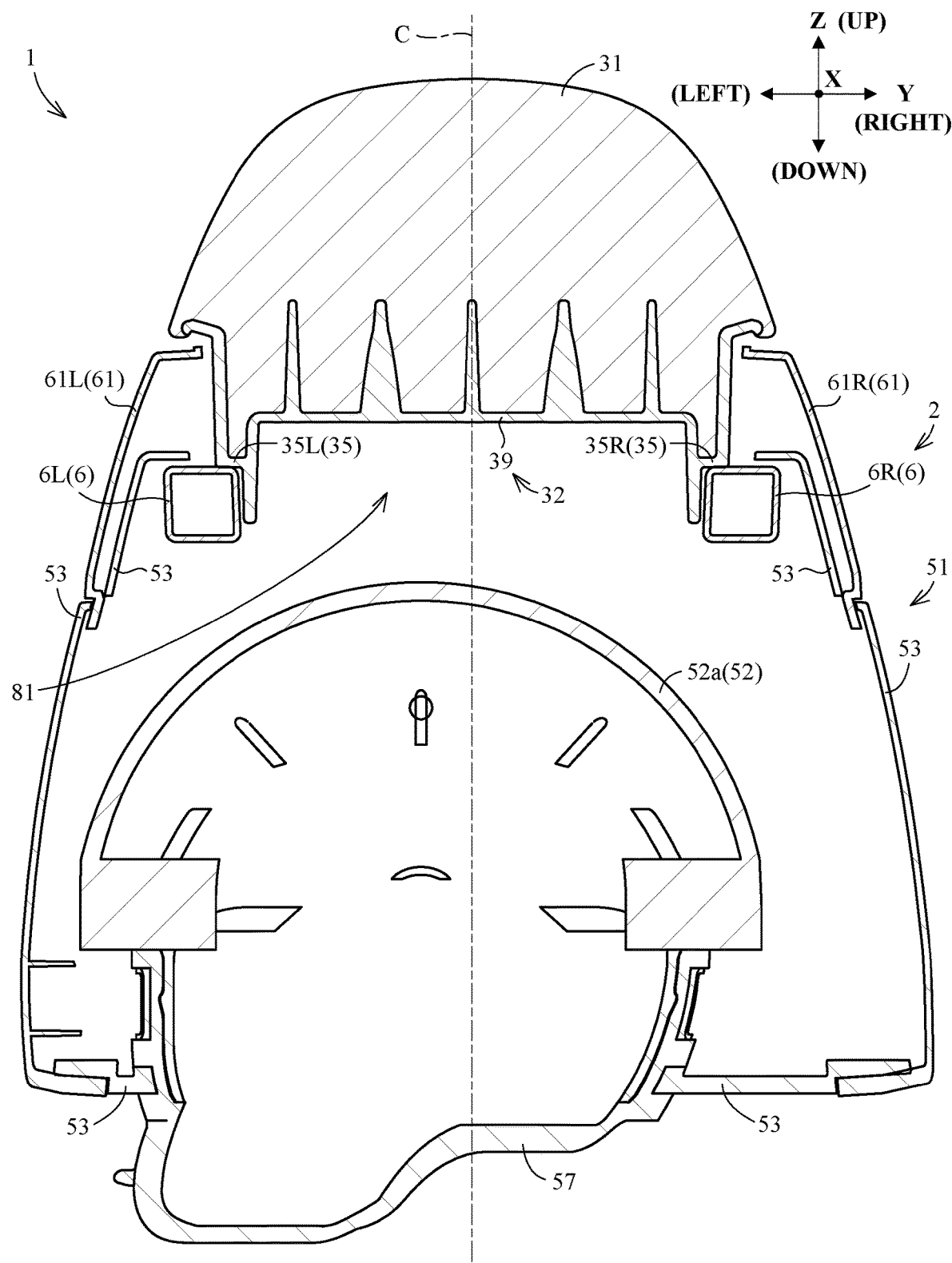
FIG. 22 is a sectional view taken on line XXII-XXII of FIG. 9.

FIG. 22 is a sectional view taken on line XXII-XXII of FIG. 9. The seat frame 6 is located below the third load transmitting portion 35. The seat frame 6 contacts the third load transmitting portion 35.

Specifically, the right seat frame 6R includes a plane substantially horizontal and directed upward. The right seat frame 6R is located below the right part 35R. The right seat frame 6R is in surface contact with the right part 35R. The left seat frame 6L includes a plane substantially horizontal and directed upward. The left seat frame 6L is located below the left part 35L. The left seat frame 6L is in surface contact with the left part 35L.

The seat frame 6 receives a load of the seat 31 via the third load transmitting portion 35. The load of the seat 31 applied to the seat frame 6 is a downward external force acting on the seat frame 6.

Moreover, the seat frame 6 restricts movement of the third load transmitting portion 35 to a position lower than the seat frame 6. That is, the seat frame 6 restricts downward movement of the seat 31 relative to the seat frame 6. However, the seat frame 6 permits upward movement of the seat 31 relative to the seat frame 6.

5-2. Configuration of Positioning Seat 31 in Horizontal Direction

Reference is made to FIGS. 16 and 17. The seat 31 includes a horizontal position determining portion 37. The horizontal position determining portion 37 is located on the base 32 of the seat 31. The horizontal position determining portion 37 is located adjacent to the first load transmitting portion 33.

The horizontal position determining portion 37 includes a right position determining portion 37a. The right position determining portion 37a includes a plane substantially perpendicular relative to the transverse direction Y and directed rightward. The right position determining portion 37a is located rightward of the vehicle center plane C. The right position determining portion 37a extends downward, for example, from a left edge of the right part 33R of the first load transmitting portion 33.

The horizontal position determining portion 37 includes a left position determining portion 37b. The left position determining portion 37b includes a plane substantially perpendicular relative to the transverse direction Y and directed leftward. The left position determining portion 37b is located leftward of the vehicle center plane C. The right position determining portion 37a and the left position determining portion 37b are arranged side by side in the transverse direction Y in the plan view of the vehicle. The left position determining portion 37b extends downward, for example, from a right edge of the left part 33L of the first load transmitting portion 33.

The horizontal position determining portion 37 includes a front position determining portion 37c. The front position determining portion 37c includes a plane substantially perpendicular relative to the longitudinal direction X and directed rearward. The front position determining portion 37c includes a right part 37cR and a left part 37cL. The right part 37cR is located rightward of the vehicle center plane C. The right part 37R extends downward, for example, from a front edge of the right part 33R of the first load transmitting portion 33. The left part 37cL is located leftward of the vehicle center plane C. The left part 37cL extends downward, for example, from a front edge of the left part 33L of the first load transmitting portion 33.

The horizontal position determining portion 37 includes a rear position determining portion 37d. The rear position determining portion 37d is located more rearward than the front position determining portion 37c. The front position determining portion 37c and the rear position determining portion 37d align in the longitudinal direction X in the plan view of the vehicle. The rear position determining portion 37d includes a plane substantially perpendicular relative to the longitudinal direction X and directed forward. The rear position determining portion 37d includes a right part 37dR and a left part 37dL. The right part 37dR is located rightward of the vehicle center plane C. The right part 37dR extends downward, for example, from a rear edge of the right part 33R of the first load transmitting portion 33. The left part 37dL is located leftward of the vehicle center plane C. The left part 37dL extends downward, for example, from a rear edge of the left part 33L of the first load transmitting portion 33.

FIG. 18 shows the horizontal position determining portion 37 by dotted lines. The horizontal position determining portion 37 is located more forward than the inlet port 83 in the plan view of the vehicle. The horizontal position determining portion 37 is located more rearward than the air cleaner 51. The horizontal position determining portion 37 is located more leftward than the right inlet port 83R and more rightward than the left inlet port 83L in the plan view of the vehicle. At least part of the right inlet port 83R is located more rightward than the horizontal position determining portion 37. At least part of the left inlet port 83L is located more leftward than the horizontal position determining portion 37.

Reference is made to FIGS. 7 and 15. The cross member 8 includes a horizontal position determining portion 19. The horizontal position determining portion 19 is located on the upper part 13 of the cross member 8. The horizontal position determining portion 19 is located at substantially the same position as the horizontal position determining portion 37 in the plan view of the vehicle. The horizontal position determining portion 19 contacts the horizontal position determining portion 37. The horizontal position determining portion 19 restricts movement of the seat 31 in the substantially horizontal direction relative to the cross member 8. The following describes a construction of the horizontal position determining portion 19 in detail.

The horizontal position determining portion 19 includes a right position determining portion 19a. The right position determining portion 19a includes a plane substantially perpendicular relative to the transverse direction Y and directed leftward. The right position determining portion 19a is located rightward of the vehicle center plane C. The right position determining portion 19a extends downward, for example, from a left edge of the right part 18R of the load receiver 18.

The horizontal position determining portion 19 includes a left position determining portion 19b. The left position determining portion 19b includes a plane substantially perpendicular relative to the transverse direction Y and directed rightward. The left position determining portion 19b is located leftward of the vehicle center plane C. The left position determining portion 19b extends downward, for example, from a right edge of the left part 18L of the load receiver 18.

Reference is made to FIG. 7. The horizontal position determining portion 19 includes a front position determining portion 19c. The front position determining portion 19c includes a plane substantially perpendicular relative to the longitudinal direction X and directed forward. The front position determining portion 19c includes a right part 19cR and a left part 19cL. The right part 19cR is located rightward of the vehicle center plane C. The right part 19cR extends downward, for example, from a front edge of the right part 18R. The left part 19dL is located leftward of the vehicle center plane C. The left part 19cL extends downward, for example, from a front edge of the left part 18L, for example.

Reference is made to FIGS. 7 and 15. The horizontal position determining portion 19 includes a rear position determining portion 19d. The rear position determining portion 19d is located more rearward than the front position determining portion 19c. The rear position determining portion 19d includes a plane substantially perpendicular relative to the longitudinal direction X and directed rearward. The rear position determining portion 19d includes a right part 19dR and a left part 19dL. The right part 19dR is located rightward of the vehicle center plane C. The right part 19dR extends downward from a rear edge of the right part 18R, for example. The left part 19dL is located leftward of the vehicle center plane C. The left part 19dL extends downward, for example, from a rear edge of the left part 18L, for example.

Reference is made to FIG. 19. The right position determining portion 19a is located rightward of the right position determining portion 37a. The right position determining portion 19a contacts the right position determining portion 37a. Specifically, the right position determining portion 19a is in surface contact with the right position determining portion 37a. Thereby, the right position determining portion 19a restricts movement of the right position determining portion 37a to a position more rightward than the right position determining portion 19a. That is, the right position determining portion 19a restricts rightward movement of the seat 31 relative to the cross member 8.

The left position determining portion 19b is located leftward of the left position determining portion 37b. The left position determining portion 19b contacts the left position determining portion 37b. Specifically, the left position determining portion 19b is in surface contact with the left position determining portion 37b. Thereby, the left position determining portion 19b restricts movement of the left position determining portion 37b to a position more leftward than the left position determining portion 19b. That is, the left position determining portion 37b restricts leftward movement of the seat 31 relative to the cross member 8.

Figure 23:
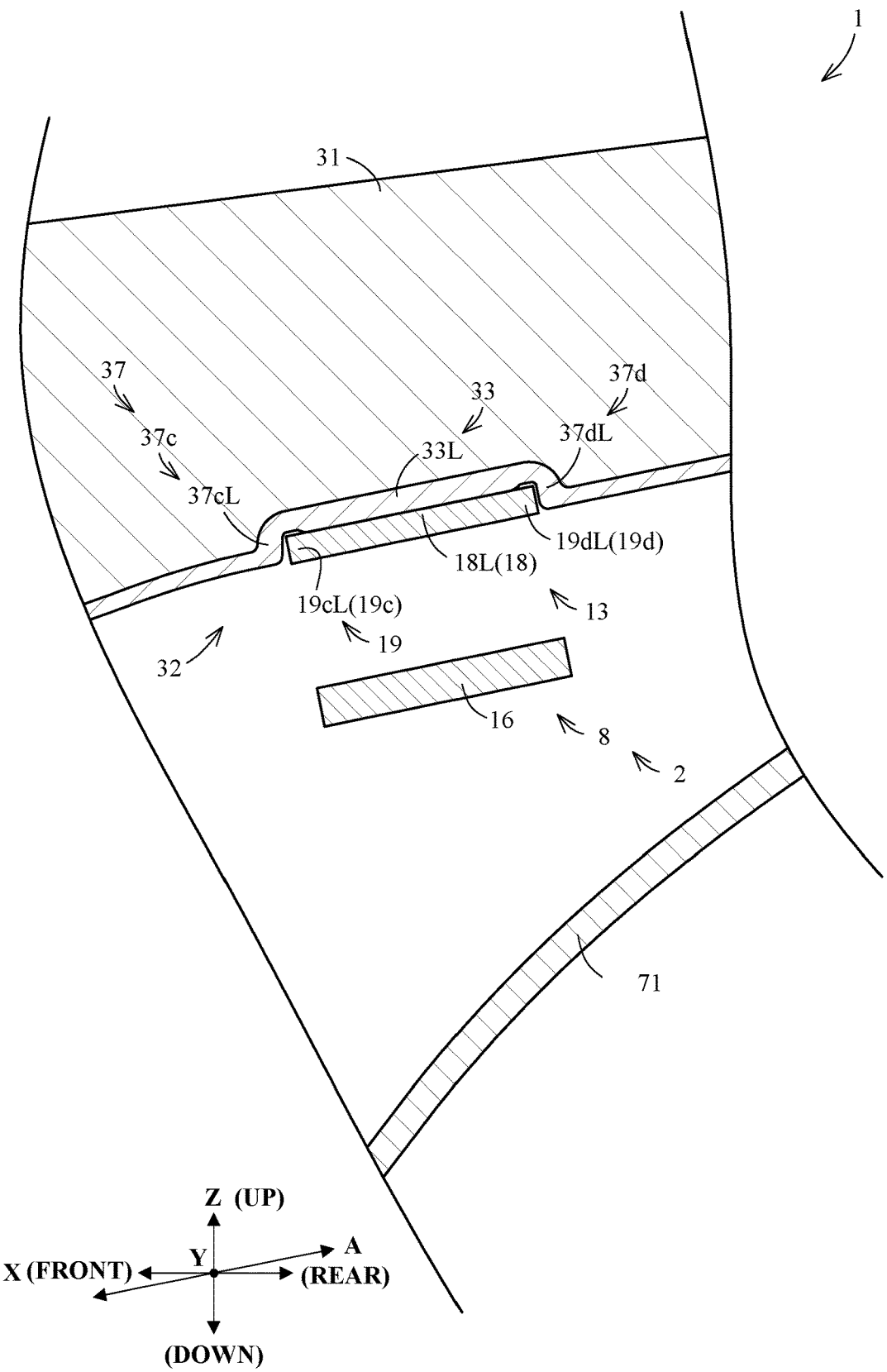
FIG. 23 is a sectional view taken on line XXIII-XXIII of FIG. 19.

FIG. 23 is a sectional view taken on line XXIII-XXIII of FIG. 19. The front position determining portion 19c is located behind the front position determining portion 37c. The front position determining portion 19c contacts the front position determining portion 37c. Specifically, the left part 19cL is located behind the left part 37cL. The left part 19cL is in surface contact with the left part 37cL. The right part 19cR is located behind the right part 37cR, which illustration is omitted. The right part 19cR is in surface contact with the right part 37cR. Thereby, the front position determining portion 19c restricts movement of the front position determining portion 37c to a position more rearward than the front position determining portion 19c. That is, the front position determining portion 19c restricts rearward movement of the seat 31 relative to the cross member 8.

The rear position determining portion 19d is located in front of the rear position determining portion 37d. The rear position determining portion 19d contacts the rear position determining portion 37d. Specifically, the left part 19dL is located in front of the left part 37dL. The left part 19dL is in surface contact with the left part 37dL. The right part 19dR are located forward of the right part 37dR, which illustration is omitted. The right part 19dR is in surface contact with the right part 37dR. Thereby, the rear position determining portion 19d restricts movement of the rear position determining portion 37d to a position more forward than the rear position determining portion 19d. That is, the rear position determining portion 19d restricts forward movement of the seat 31 relative to the cross member 8.

In summary, the right position determining portion 19a and the left position determining portion 19b restrict movement of the seat 31 in the transverse direction Y relative to the cross member 8. The right position determining portion 19a and the left position determining portion 19b position the seat 31 in the transverse direction Y. The front position determining portion 19c and the rear position determining portion 19d restrict movement of the seat 31 in the longitudinal direction X relative to the cross member 8. The front position determining portion 19c and the rear position determining portion 19d position the seat 31 in the longitudinal direction X. Consequently, the horizontal position determining portion 19 restricts movement of the seat 31 relative to the cross member 8 in the transverse direction Y and the longitudinal direction X (i.e., horizontal direction). That is, the horizontal position determining portion 19 positions the seat 31 in the horizontal direction.

As shown in FIG. 23, the cross member 8 is flat in a cross section perpendicular to the transverse direction Y. More specifically, the cross member 8 has a length in the longitudinal direction X larger than that in the up-down direction Z in its cross section perpendicular to the transverse direction Y.

The horizontal position determining portion 37 corresponds to one example of the first horizontal position determining portion in the present invention. The horizontal position determining portion 19 corresponds to one example of the second horizontal position determining portion in the present invention.

5-3. Configuration of Regulating Movement of Seat 31

Reference is made to FIG. 9. The straddled vehicle 1 includes a position regulator 101. The position regulator 101 joins the seat 31 with the rear fender 71. Specifically, the position regulator 101 couples the rear part of the seat 31 with the rear fender 71. The position regulator 101 regulates movement of the seat 31 relative to the rear fender 71. Especially, the position regulator 101 regulates upward movement of the seat 31 relative to the rear fender 71. The position regulator 101 restricts rising of the seat 31 relative to the rear fender 71.

The position regulator 101 is located on vehicle center plane C. The position regulator 101 is located below the seat 31. The position regulator 101 is located above the rear fender 71. The position regulator 101 is located more rearward than the air cleaner 51. The position regulator 101 is located more rearward than the cross member 8.

Figure 24:
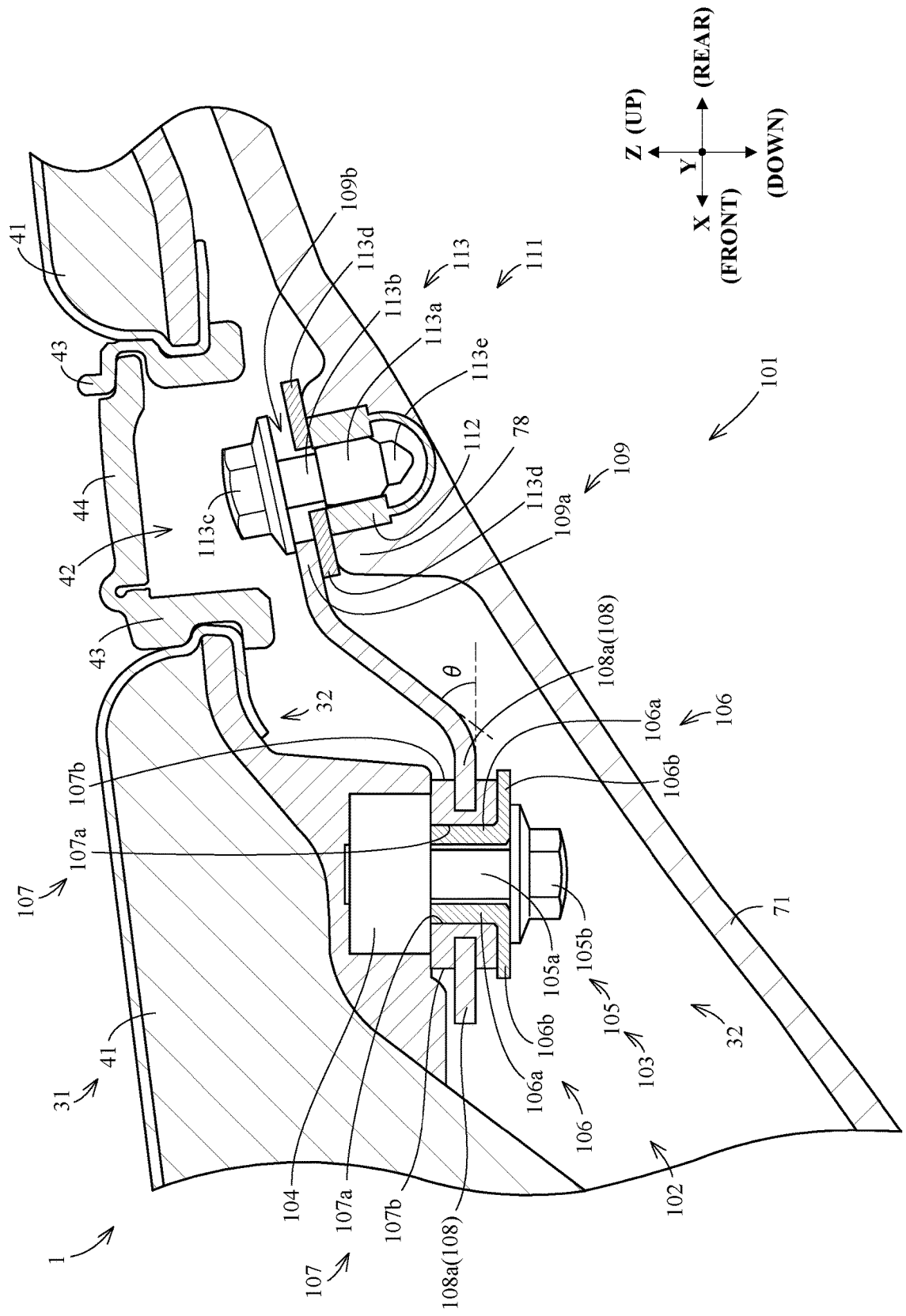
FIG. 24 is a sectional view of a position regulator along the vehicle center plane.

FIG. 24 is a sectional view of the position regulator 101 along the vehicle center plane C. The position regulator 101 includes a holder 102, an elastic member 107, a stay 108, a coupling portion 109, and a fastening portion 111. The holder 102 is supported by the seat 31. The holder 102 holds the elastic member 107. Thereby, the elastic member 107 is supported by the seat 31 via the holder 102. The elastic member 107 is elastically deformable. The stay 108 is supported by the elastic member 107. The stay 108 supports the coupling portion 109. Thereby, the coupling portion 109 is supported by the elastic member 107 via the stay 108. The fastening portion 111 fastens the coupling portion 109 and the rear fender 71. Thereby, the seat 31 is joined to the rear fender 71.

The following describes the position regulator 101 in detail.

The holder 102 is supported by the seat 31. The holder 102 is supported on the base 32 of the seat 31. The holder 102 extends downward from the seat 31.

The holder 102 includes a fastening portion 103. The fastening portion 103 is joined to the seat 31. The fastening portion 103 is located on the vehicle center plane C.

The fastening portion 103 includes a nut 104. The nut 104 is located on the vehicle center plane C. The nut 104 is fixed to the base 32 of the seat 31. The nut 104 is, for example, an insert nut.

The fastening portion 103 includes a bolt 105. The bolt 105 is coupled to the nut 104. More specifically, the bolt 105 includes a screw 105a and a head 105b. The screw 105a extends in the substantially up-down direction Z. That is, the bolt 105 has an axis substantially parallel to the up-down direction Z. The screw 105a has a first end and a second end. The first end of the screw 105a is coupled to the nut 104. The second end of the screw 105a is connected to the head 105b. The head 105b is located below the nut 104. The head 105b is located on the vehicle center plane C.

The holder 102 includes a collar 106. The collar 106 is supported by the fastening portion 103. More specifically, the collar 106 includes a cylinder 106a and a flange 106b. The cylinder 106a has a cylindrical shape. The cylinder 106a has a through hole. The through hole of the cylinder 106a has an inner diameter larger than an outer diameter of the screw 105a. The screw 105a is inserted into the through hole of the cylinder 106a. In other words, the cylinder 106a is fitted outside of the screw 105a. The cylinder 106a has a first end and a second end. The first end of the cylinder 106a contacts the nut 104. The second end of the cylinder 106a is connected to the flange 106b. The flange 106b extends outward from the second end of the cylinder 106a. The flange 106b contacts the head 105b. Specifically, a lower face of the flange 106b contacts the head 105b. The bolt 105 and the nut 104 grip the collar 106.

The elastic member 107 is located below the seat 31. The elastic member 107 is located above the rear fender 71. The elastic member 107 is located on the vehicle center plane C. The elastic member 107 has a tube shape. In other words, the elastic member 107 has an annular shape. The elastic member 107 includes a through hole 107a and an outer circumferential face 107b. The through hole 107a is formed at the center of the elastic member 107. The through hole 107a has an inner diameter substantially equal to an outer diameter of the cylinder 106a of the collar 106. The material of the elastic member 107 is, for example, rubber or resin. The elastic member 107 is, for example, a grommet or a bushing.

The elastic member 107 is held by the holder 102. The holder 102 is inserted into the through hole 107a of the elastic member 107. Specifically, the elastic member 107 is attached to the collar 106. The elastic member 107 is fitted outside of the cylinder 106a of the collar 106. In other words, the cylinder 106a of the collar 106 is inserted into the through hole 107a of the elastic member 107. The elastic member 107 closely contacts the cylinder 106a. An inner circumferential face of the through hole 107a of the elastic member 107 is in close contact with an outer circumferential face of the cylinder 106a. Moreover, the elastic member 107 contacts the nut 104. The elastic member 107 contacts the flange 106b (more specifically, top face of the flange 106b).

Figure 25:
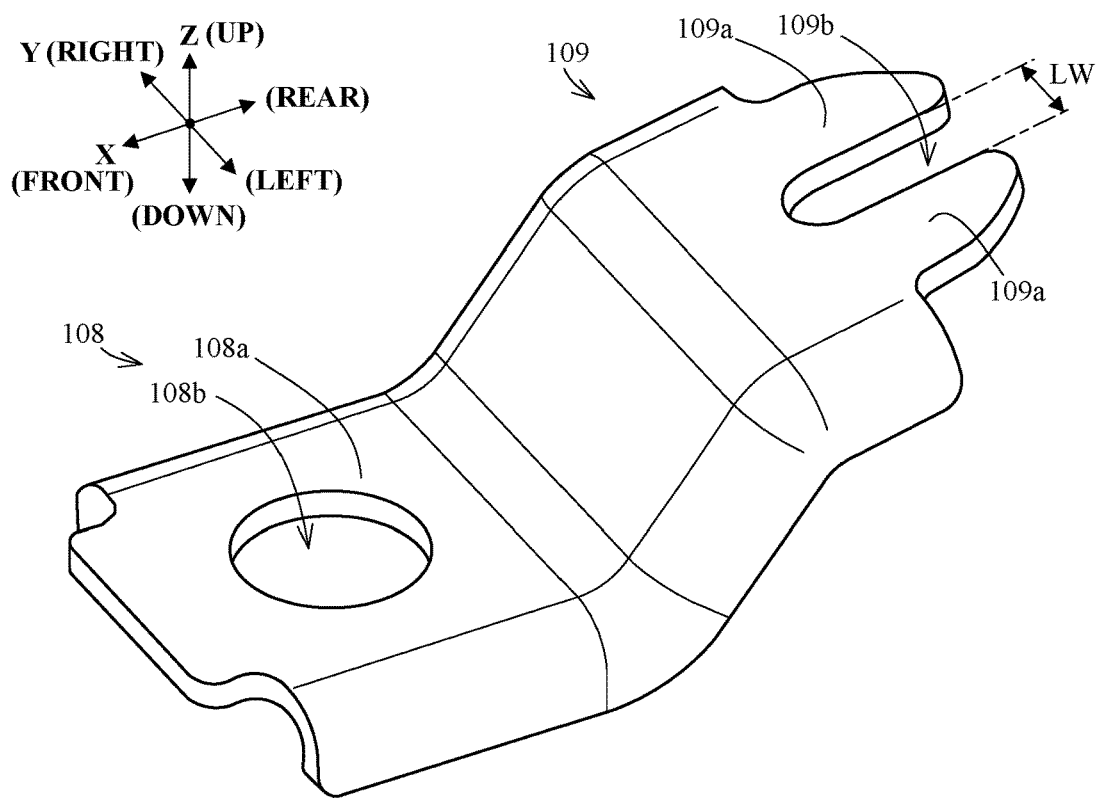
FIG. 25 is a perspective view of a stay.

FIG. 25 is a perspective view of the stay 108. The stay 108 includes a plate portion 108a and a through hole 108b. The through hole 108b is formed in the plate portion 108a. The through hole 108b has an inner diameter substantially equal to an outer diameter of the elastic member 107. The stay 108 is, for example, made of metal.

Reference is made to FIG. 24. The stay 108 is located below the seat 31. The stay 108 is located above the rear fender 71. The stay 108 is connected to the outer circumferential face 107b of the elastic member 107. The stay 108 is fitted to the outer circumferential face 107b of the elastic member 107. In other words, the elastic member 107 is inserted into the through hole 108b of the stay 108. The stay 108 closely contacts to the elastic member 107. More specifically, an inner circumferential face of the through hole 108b of the stay 108 is in close contact with the outer circumferential face 107b of the elastic member 107. Note that the elastic member 107 may include a groove. The groove is formed in the outer circumferential face 107b of the elastic member 107. The groove extends in a circumferential direction. The plate portion 108a cuts into the groove, whereby the elastic member 107 can support the stay 108 conveniently.

The stay 108 extends rearward from the elastic member 107. More specifically, the stay 108 extends rearward and upward from the elastic member 107.

The elastic member 107 is elastically deformed, whereby the stay 108 is slightly movable relative to the elastic member 107. FIG. 24 exemplarily shows an angle θ of the stay 108 relative to the elastic member 107. The angle θ is variable depending on elastic deformation of the elastic member 107, for example. The elastic deformation of the elastic member 107 allows a rear part of the stay 108 to swing in the up-down direction Z relative to the elastic member 107 (i.e., seat 31), for example.

The coupling portion 109 is supported by the stay 108. The coupling portion 109 is supported on the rear part of the stay 108. The coupling portion 109 is fixed to the stay 108. The coupling portion 109 is located below the seat 31. The coupling portion 109 is located above the rear fender 71. The coupling portion 109 is located on the vehicle center plane C. The coupling portion 109 is located more rearward than the holder 102. The coupling portion 109 is located more rearward than the elastic member 107. The coupling portion 109 is located higher than the elastic member 107.

The elastic member 107 is elastically deformed, whereby the coupling portion 109 is slightly movable relative to the elastic member 107. The elastic deformation of the elastic member 107 allows the coupling portion 109 to move in the up-down direction Z relative to the elastic member 107, for example. That is, the elastic member 107 is elastically deformed, whereby the coupling portion 109 is movable in the up-down direction Z relative to the seat 31.

Reference is made to FIG. 25. The coupling portion 109 and the stay 108 are formed integrally, for example. The coupling portion 109 and the stay 108 are inseparable from each other, for example. The coupling portion 109 is, for example, made of metal.

The coupling portion 109 includes a seating portion 109a and a through hole 109b. The seating portion 109a has a plate shape. The seating portion 109a is substantially horizontal. The through hole 109b is formed in the seating portion 109a. The through hole 109b passes through the seating portion 109a in the up-down direction Z.

The through hole 109b is a long hole. The through hole 109b has a length in a long side direction larger than a width LW of the through hole 109b. The through hole 109b extends in the longitudinal direction X, for example. The long side direction of the through hole 109b is substantially parallel to the longitudinal direction X, for example. The width LW of the through hole 109b corresponds to a length of the through hole 109b in the transverse direction Y, for example.

The through hole 109b is a cutout hole. Specifically, the through hole 109b is opened at a perimeter edge of the seating portion 109a. For example, the through hole 109b has a front end and a rear end. The rear end of the through hole 109b reaches a rear edge of the seating portion 109a. The rear end of the through hole 109b is opened at the rear edge of the seating portion 109a. The through hole 109b is opened rearward. The rear end of the through hole 109b is not closed with the seating portion 109a. The front end of the through hole 109b is not opened. The front end of the through hole 109b is closed with the seating portion 109a.

Reference is made to FIG. 24. The through hole 109b is located on the vehicle center plane C.

The fastening portion 111 fastens the coupling portion 109 and the rear fender 71. The fastening portion 111 is located below the seat 31. The fastening portion 111 is located above the rear fender 71. The fastening portion 111 is located on the vehicle center plane C. The fastening portion 111 is located more rearward than the holder 102. The fastening portion 111 is located more rearward than the fastening portion 103. The fastening portions 111 and 103 align in the longitudinal direction X. The fastening portion 111 is located more rearward than the elastic member 107.

The fastening portion 111 includes a nut 112. The nut 112 is located on the vehicle center plane C. The nut 112 is fixed to the rear fender 71. The rear fender 71 includes a boss 78 configured to fix the nut 112. The boss 78 has a cylindrical shape extending in the up-down direction Z. The nut 112 is embedded into a center part in a top face of the boss 78. The nut 112 is, for example, an insert nut.

The fastening portion 111 includes a bolt 113. The bolt 113 is coupled to the nut 112. The bolt 113 is so-called a screw with captive washer. The bolt 113 is also called a bolt with washer. The bolt 113 is also called a sems screw.

Figure 26:
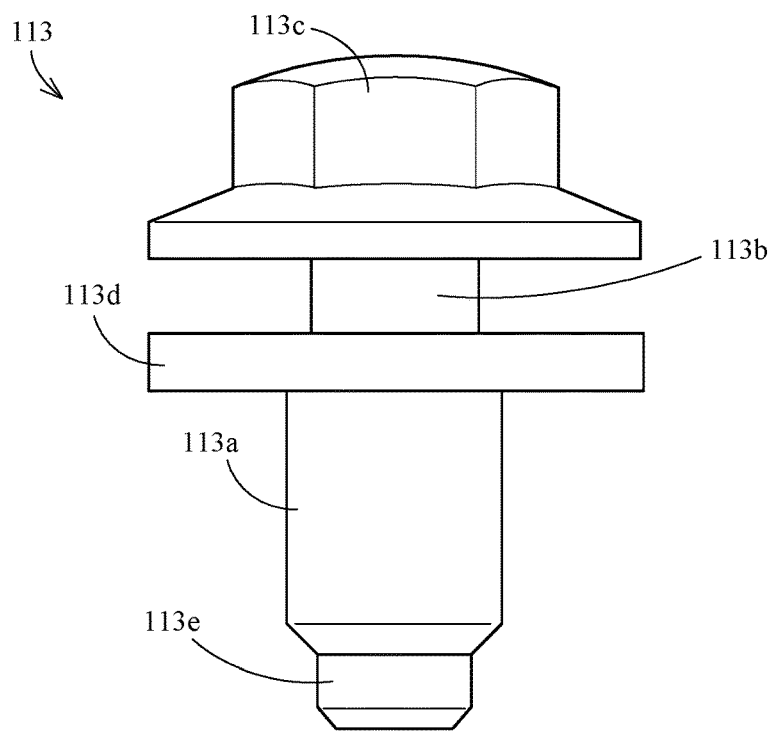
FIG. 26 is a detailed diagram of a bolt configured to fasten a coupling portion to the rear fender.

FIG. 26 is a detailed view of the bolt 113. The bolt 113 includes a screw 113a, a shaft 113b, and a head 113c. The screw 113a is coupled with the nut 112. The shaft 113b is connected to the screw 113a. The head 113c is connected to the shaft 113b. An axis of the shaft 113b conforms to an axis of the screw 113a. The axis of the screw 113a and the axis of the shaft 113b correspond to an axis of the bolt 113.

More specifically, the screw 113a has a first end and a second end. The first end of the screw 113a is coupled with the nut 112. The second end of the screw 113a is connected to the shaft 113b. The shaft 113b has a first end and a second end. The first end of the shaft 113b is connected to the second end of the screw 113a. The second end of the shaft 113b is connected to the head 113c.

The shaft 113b is thinner than the screw 113a. The shaft 113b has an outer diameter smaller than an outer diameter of the screw 113a. The outer diameter of the shaft 113b is smaller than the width LW of the through hole 109b. The head 113c has an outer diameter larger than the outer diameter of the shaft 113b. The outer diameter of the head 113c is larger than the width LW of the through hole 109b.

The bolt 113 includes a washer 113d. The washer 113d is, for example, a plain washer. The washer 113d has an outer diameter larger than the width LW of the through hole 109b. The washer 113d has a through hole not shown. The through hole of the washer 113d has an inner diameter larger than the outer diameter of the shaft 113b. The inner diameter of the through hole of the washer 113d is smaller than the outer diameter of the screw 113a. The inner diameter of the through hole of the washer 113d is smaller than the outer diameter of the head 113c.

The washer 113d is attached to the shaft 113b. The washer 113d is fitted outside of the shaft 113b. In other words, the shaft 113b is inserted into the through hole of the washer 113d. The washer 113d is movable between the head 113c and the screw 113a. Specifically, the washer 113d is movable relative to the shaft 113b in a direction of the axis of the shaft 113b. The washer 113d is rotatable relative to the shaft 113b around the axis of the shaft 113b. Here, the washer 113d is not removable from the shaft 113b. The screw 113a and the head 113c restrict movement of the washer 113d. A range where the washer 113d is movable in the direction of the axis of the shaft 113b is limited to a range from the first end of the shaft 113b to the second end of the shaft 113b.

The bolt 113 includes a distal end 113e. The distal end 113e is connected to the screw 113a. The distal end 113e is connected to the first end of the screw 113a. The distal end 113e extends from the screw 113a in the direction of the axis of the screw 113a. The distal end 113e has an outer diameter smaller than the outer diameter of the screw 113a. The outer diameter of the distal end 113e is smaller than an inner diameter of the nut 112. The distal end 113e guides the screw 113a to the nut 112. The distal end 113e is called a lead.

Reference is made to FIG. 24. The screw 113a is screwed on the nut 112. The axis of the bolt 105 is substantially parallel to the up-down direction Z. Specifically, the axis of the screw 113a and the axis of the shaft 113b are substantially parallel to the up-down direction Z. The head 113c is located above the nut 112. The head 113c is located on the vehicle center plane C. The shaft 113b is located in the through hole 109b of the coupling portion 109. The seating portion 109a of the coupling portion 109 is located between the head 113c and the washer 113d. Specifically, the seating portion 109a is located below the head 113c and above the washer 113d.

Since the through hole 109b is a cutout hole, the shaft 113b is easily insertable into the through hole 109b. Specifically, the shaft 113b passes through the rear end of the through hole 109b, thereby being movable between the outside and inside of the through hole 109b. For example, in order to insert the shaft 113b into the through hole 109b, the shaft 113b enters from the outside of the through hole 109b through the rear end of the through hole 109b to the inside of the through hole 109b.

The through hole 109b is a long hole. Accordingly, the shaft 113b can be located easily into the through hole 109b even when at least one of the seat 31, the rear fender 71, and the position regulator 101 contains a dimensional error. For example, when the long side direction of the through hole 109b is substantially parallel to the longitudinal direction X, the shaft 113b can be located easily into the through hole 109b even when at least one of the seat 31, the rear fender 71, and the position regulator 101 contains a dimensional error in the longitudinal direction X.

The head 113c and the nut 112 grip the seating portion 109a and the washer 113d. Specifically, the head 113c contacts a top face of the seating portion 109a. A lower face of the seating portion 109a contacts a top face of the washer 113d. A lower face of the washer 113d contacts the nut 112. When the screw 113a is joined with the nut 112, the head 113c presses the seating portion 109a and the washer 113d against the nut 112. Thereby, the fastening portion 111 fixes the coupling portion 109 to the rear fender 71.

In summary, the elastic member 107 is supported by the seat 31. The coupling portion 109 is supported by the elastic member 107. The fastening portion 111 fastens the coupling portion 109 to the rear fender 71. Thus, the seat 31 and the rear fender 71 are joined by the position regulator 101. Accordingly, the position regulator 101 regulates movement of the seat 31 relative to the rear fender 71. Especially, the position regulator 101 conveniently regulates upward movement of the rear part of the seat 31 relative to the rear fender 71.

Since the seat 31 has relatively low rigidity, the seat 31 itself is likely to be bent and warped. Accordingly, when the seat 31 receives a relatively large external force from crew members of the straddled vehicle 1, for example, the seat 31 may move relative to the rear fender 71. Here, the crew members of the straddled vehicle 1 include the driver and a fellow passenger. In this case, the elastic member 107 is elastically deformed, whereby the stay 108 is moved relative to the elastic member 107. For example, the elastic member 107 is elastically deformed, whereby the angle θ of the stay 108 relative to the elastic member 107 is varied. For example, when the seat 31 is moved upward relative to the rear fender 71, the elastic member 107 is elastically deformed, whereby the stay 108 swings to be directed downward relative to the elastic member 107, and the coupling portion 109 is moved downward relative to the seat 31. Accordingly, a load applied to the fastening portion 111 from the coupling portion 109 is smaller than the external force applied to the seat 31. Thus, the elastic member 107 relieves the load applied to the fastening portion 111. Consequently, the fastening portion 111 does not receive an excessively large load.

The elastic member 107 also relieves the load applied to the fastening portion 103. That is, a load applied to the fastening portion 103 from the stay 108 is also smaller than the external force applied to the seat 31. Consequently, the fastening portion 103 does not receive an excessively large load.

Reference is made to FIG. 18. FIG. 18 shows the position regulator 101 by dotted lines. FIG. 18 omits illustration of a boss 78 of the rear fender 71 for convenience. The position regulator 101 is located more forward than the inlet port 83 in the plan view of the vehicle. The position regulator 101 is located more leftward than the right inlet port 83R and more rightward than the left inlet port 83L in the plan view of the vehicle. The position regulator 101 is located more rearward than the air cleaner 51 in the plan view of the vehicle.

The position regulator 101 is located more forward than the second load transmitting portion 34 and the load receiver 77 in the plan view of the vehicle. The position regulator 101 is located more leftward than the right part 34R of the second load transmitting portion 34 and more rightward than the left part 34L of the second load transmitting portion 34 in the plan view of the vehicle. The position regulator 101 is located more rearward than the first load transmitting portion 33 in the plan view of the vehicle. The position regulator 101 is located more leftward than the right part 33R of the first load transmitting portion 33 and more rightward than the left part 33L of the first load transmitting portion 33 in the plan view of the vehicle. Thus, the position regulator 101 is surrounded by the first load transmitting portion 33 and the second load transmitting portion 34 in the plan view of the vehicle.

The fastening portion 111 is located adjacent to the second load transmitting portion 34 in the plan view of the vehicle. The fastening portion 111 is located more leftward than the right part 34R of the second load transmitting portion 34 and more rightward than the left part 34L of the second load transmitting portion 34 in the plan view of the vehicle. The right part 34R, the fastening portion 111, and the left part 34L are arranged side by side in the transverse direction Y in the plan view of the vehicle.

FIG. 18 shows widths LR, LL, and LP. The width LR is a length of the right inlet port 83R in the transverse direction Y. The width LL is a length of the left inlet port 83L in the transverse direction Y. The width LP is a length of the position regulator 101 in the transverse direction Y. FIG. 18 shows a distance D. The distance D is a distance between the right inlet port 83R and the left inlet port 83L in the transverse direction Y. The distance D corresponds to a distance between a left end of the right inlet port 83R and a right end of the left inlet port 83L in the transverse direction Y.

The width LR is substantially equal to the width LL. The distance D is smaller than the width LR. The distance D is smaller than the width LL. The width LP is smaller than the width LR. The width LP is smaller than the width LL. The width LP is smaller than the distance D.

Reference is made to FIG. 24. The seat 31 includes a seat body 41 and a through hole 42. The through hole 42 is formed in the seat body 41. The through hole 42 passes through the seat body 41 in the up-down direction Z. The through hole 42 is provided for attachment and detachment of the fastening portion 111. Specifically, a tool for operation of the bolt 113 is insertable into the through hole 42.

The through hole 42 is located above the fastening portion 111. The through hole 42 is located above the bolt 113. The through hole 42 is located above the head 113c. The through hole 42 is located on an extension line of the axis of the bolt 113.

The through hole 42 is located on the vehicle center plane C. The through hole 42 is located more rearward than the holder 102. The through hole 42 is located more rearward than the elastic member 107.

In this embodiment, the through hole 42 is defined by a protecting portion 43. The protecting portion 43 is fixed to the seat body 41. The protecting portion 43 has a tube shape. The protecting portion 43 corresponds to an inner wall of the through hole 42. The protecting portion 43 protects the seat body 41 from damages, and also protects the bolt 113 from pollution.

The through hole 42 has an inner diameter larger than the outer diameter of the head 113c. The inner diameter of the through hole 42 is smaller than twice the outer diameter of the head 113c, for example.

Reference is made to FIG. 17. The through hole 42 is located near the second load transmitting portion 34 in the plan view of the vehicle. The through hole 42 is located more leftward than the right part 34R of the second load transmitting portion 34 and more rightward than the left part 34L of the second load transmitting portion 34 in the plan view of the vehicle.

The through hole 42 overlaps the fastening portion 111 in the plan view of the vehicle, which illustration is omitted. However, the through hole 42 does not overlap the holder 102 or the elastic member 107 in the plan view of the vehicle. The inner diameter of the through hole 42 is relatively small.

Reference is made to FIG. 24. At least part of the head 113c is located inside of the through hole 42. For example, only part of the head 113c may be located inside of the through hole 42. For example, the entire of the head 113c may be located inside of the through hole 42. At least part of the head 113c is located at a position higher than a lower end of the through hole 42. For example, only part of the head 113c may be located at a position higher than the lower end of the through hole 42. For example, the entire of the head 113c may be located at a position higher than the lower end of the through hole 42. The head 113c is located at a position lower than an upper end of the through hole 42. Specifically, the entire of the head 113c is located at a position lower than the upper end of the through hole 42.

The through hole 42 restricts an area where the bolt 113 is movable. Strictly speaking, when at least part of the head 113c is located inside of the through hole 42, the through hole 42 restricts an area where the bolt 113 is movable. For example, even when the bolt 113 is detached from the nut 112, the through hole 42 restricts movement of the bolt 113 by contact of the inner wall of the through hole 42 to the head 113c. Specifically, the area where the head 113c is movable in the substantially horizontal direction is restricted within the through hole 42. Accordingly, an area where the shaft 113b is movable in the substantially horizontal direction is also restricted. As a result, the shaft 113b is immovable to a position more rearward than the rear end of the through hole 109b. That is, the shaft 113b is undetachable from the through hole 109b. The shaft 113b is kept inserted in the through hole 109b. A position of the through hole 109b (especially, rear end of the through hole 109b) is determined taking into consideration of a position of the through hole 42 and a dimension of the bolt 113. Thus, the through hole 42 restricts the area where the bolt 113 is movable in the substantially horizontal direction, thereby restricting detachment of the shaft 113b from the coupling portion 109.

Moreover, the head 113c is located above the coupling portion 109 (through hole 109b). The outer diameter of the head 113c is larger than the width LW of the through hole 109b. Thus, the head 113c cannot pass through the through hole 109b. Consequently, in such a state where the shaft 113b is inserted into the through hole 109b, the bolt 113 does not drop off downward from the coupling portion 109 even when the bolt 113 moves in the direction of the axis of the bolt 113.

The washer 113d is located below the coupling portion 109 (through hole 109b). The outer diameter of the washer 113d is larger than the width LW of the through hole 109b. Thus, the washer 113d cannot pass through the through hole 109b. Consequently, in such a state where the shaft 113b is inserted into the through hole 109b, the bolt 113 is not removed upward from the coupling portion 109 even when the bolt 113 moves in the direction of the axis of the bolt 113.

Thus, the bolt 113 is undetachable from the coupling portion 109 as long as the shaft 113b is inserted into the through hole 109b. At least part of the head 113c is kept located inside of the through hole 42 as long as the shaft 113b is inserted into the through hole 109b.

In summary, the through hole 42 restricts the area where the bolt 113 is movable in the substantially horizontal direction, whereby the shaft 113b is kept inserted in the through hole 109b. Thus, the bolt 113 is undetachable from the coupling portion 109 even when the bolt 113 is detached from the nut 112.

Here, in order to detach the bolt 113 from the coupling portion 109, the bolt 113 is removed from the nut 112 and the bolt 105 is removed from the nut 104. Thereby, the elastic member 107 is separated from the fastening portion 103. Thereafter, the bolt 113, the coupling portion 109, the stay 108, and the elastic member 107 are moved downward integrally. Thereby, the head 113c of the bolt 113 is moved outside of the through hole 42. Specifically, the entire of the head 113c is moved to a position lower than the lower end of the through hole 42. When the head 113c is located outside of the through hole 42, the through hole 42 does not restrict the area where the head 113c is movable in the substantially horizontal direction. Thereafter, the bolt 113, the coupling portion 109, the stay 108, and the elastic member 107 are moved rearward. Thereby, the shaft 113b is moved from inside of the through hole 109b to outside of the through hole 109b through the rear end of the through hole 109b. The shaft 113b is detached from the through hole 109b. That is, the bolt 113 is detached from the coupling portion 109.

The seat 31 further includes a cap 44. The cap 44 is attachable and detachable to and from an upper part of the protecting portion 43. When the cap 44 is attached to the protecting portion 43, the cap 44 closes the upper part of the through hole 42. When the cap 44 is detached from the protecting portion 43, the upper part of the through hole 42 is opened. The cap 44 is formed integrally with the protecting portion 43, for example. For example, the cap 44 is connected to the protecting portion 43 via a bending-deformable member, for example.

The following describes attaching and detaching operation of the fastening portion 111.

Operation of removing the bolt 113 from the nut 112 is performed along with the following procedures. Firstly, the cap 44 is removed from the protecting portion 43. Thereby, the upper part of the through hole 42 is opened. A tool is inserted into the through hole 42 from the above of the through hole 42. A tip end of the tool is brought into contact with the head 113c. The tool causes the bolt 113 to rotate. Thereby, the bolt 113 is removed from the nut 112. Also after the bolt 113 is removed from the nut 112, the shaft 113b is kept inserted in the through hole 109b. That is, the bolt 113 is undetachable from the coupling portion 109. At least part of the head 113c is kept located inside of the through hole 42.

Operation of fastening the bolt 113 to the nut 112 is performed along with the following procedures. The cap 44 is removed from the protecting portion 43. A tool is inserted into the through hole 42 from the above of the through hole 42. A tip end of the tool is brought into contact with the head 113c. Firstly, the tool presses the bolt 113 downward. The distal end 113e enters a hole of the nut 112, and guides the screw 113a to a suitable position. Then, the tool causes the bolt 113 to rotate. Thereby, the screw 113a is screwed on the nut 112. That is, the bolt 113 is coupled with the nut 112. Thereafter, the cap 44 is attached to the protecting portion 43. Thereby, the upper part of the through hole 42 is closed.

Here, even when the position of the nut 112 is invisible through the through hole 42, the screw 113a is easily guidable to the nut 112 since the bolt 113 includes the distal end 113e. That is, the bolt 113 is couplable with the nut 112 easily.

The fastening portion 111 corresponds to one example of the "fastening portion configured to fasten the coupling portion to the rear fender" in the present invention.

Reference is made to FIGS. 16 and 17. The straddled vehicle 1 further includes a hook 115 in addition to the position regulator 101. The hook 115 restricts movement of the seat 31.

The hook 115 is supported by the seat 31. The hook 115 is fixed to the seat 31. The hook 115 is connected to the base 32 of the seat 31. The hook 115 is located more forward than the third load transmitting portion 35 in the plan view of the vehicle. The hook 115 is located on the vehicle center plane C. The hook 115 extends in a substantially longitudinal direction X in the plan view of the vehicle. The hook 115 is formed integrally with the base 32 of the seat 31, for example.

Reference is made to FIG. 18. The hook 115 is located more forward than the inlet port 83. The hook 115 overlaps the air cleaner 51 in the plan view of the vehicle. The hook 115 is located in front of the rear fender 71 in the plan view of the vehicle.

Reference is made to FIG. 9. The hook 115 is located inside of the intake passage 81. The hook 115 is located below the seat 31. The hook 115 is located below the bar 9. The hook 115 contacts the bar 9. The bar 9 restricts movement of the hook 115 to a position higher than the bar 9. The bar 9 restricts upward movement of the seat 31 relative to the body frame 2. More specifically, the bar 9 restricts a front part of the seat 31 from rising relative to the body frame 2. However, the bar 9 permits downward movement of the seat 31 relative to the body frame 2.

6. Arrangement of Inlet Port 83

Figure 27:
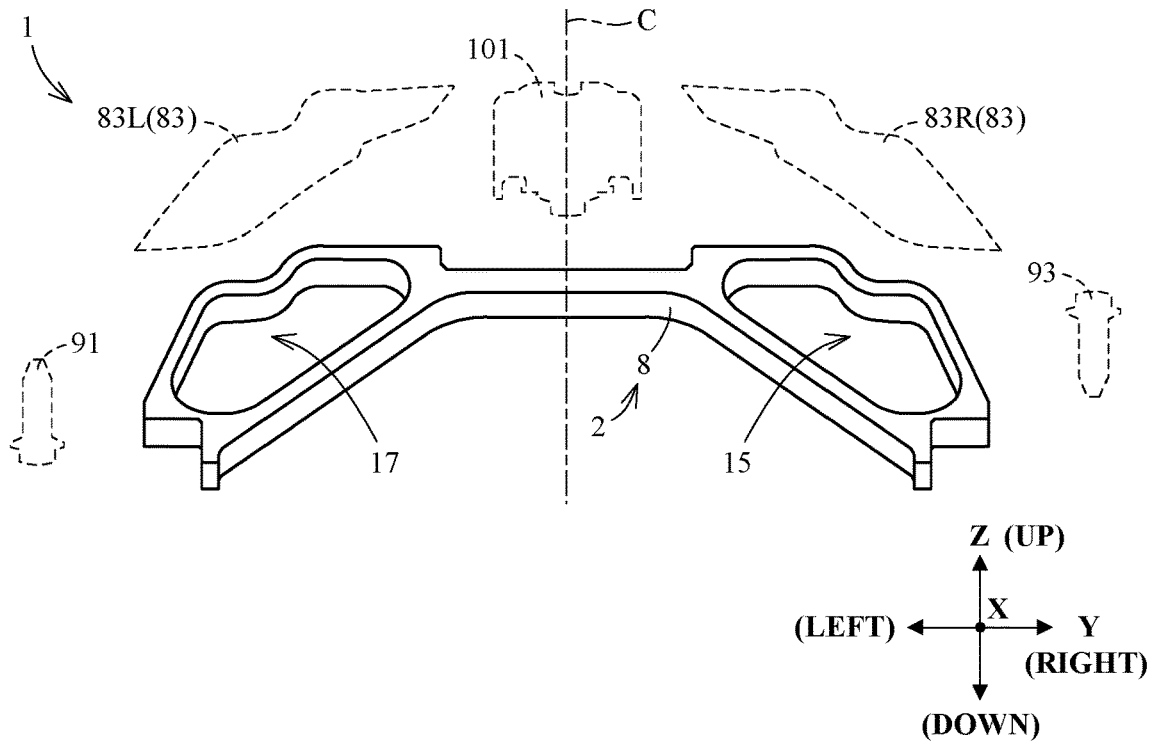
FIG. 27 is a rear view of the cross member.

FIG. 27 is a rear view of the cross member 8. FIG. 27 shows the right inlet port 83R, the left inlet port 83L, the fastening portions 91 and 93, and the position regulator 101 by dotted lines.

The cross member 8 is located at a position not overlapping the right inlet port 83R or the left inlet port 83L in the rear view of the vehicle. The cross member 8 is located below the right inlet port 83R and the left inlet port 83L in the rear view of the vehicle.

The fastening portion 91 is located at a position not overlapping the right inlet port 83R or the left inlet port 83L in the rear view of the vehicle. The fastening portion 91 is located at a position lower than the right inlet port 83R and the left inlet port 83L in the rear view of the vehicle. The fastening portion 91 is located more leftward than the right inlet port 83R and the left inlet port 83L in the rear view of the vehicle.

The fastening portion 93 is located at a position not overlapping the right inlet port 83R or the left inlet port 83L in the rear view of the vehicle. The fastening portion 93 is located at a position lower than the right inlet port 83R and the left inlet port 83L in the rear view of the vehicle. The fastening portion 93 is located more rightward than the right inlet port 83R and the left inlet port 83L in the rear view of the vehicle.

The position regulator 101 is located at a position not overlapping the right inlet port 83R or the left inlet port 83L in the rear view of the vehicle. The position regulator 101 is located at a position substantially equal in level to the right inlet port 83R and the left inlet port 83L. The position regulator 101 is located leftward of the right inlet port 83R in the rear view of the vehicle. The position regulator 101 is located rightward of the left inlet port 83L in the rear view of the vehicle.

Figure 28:
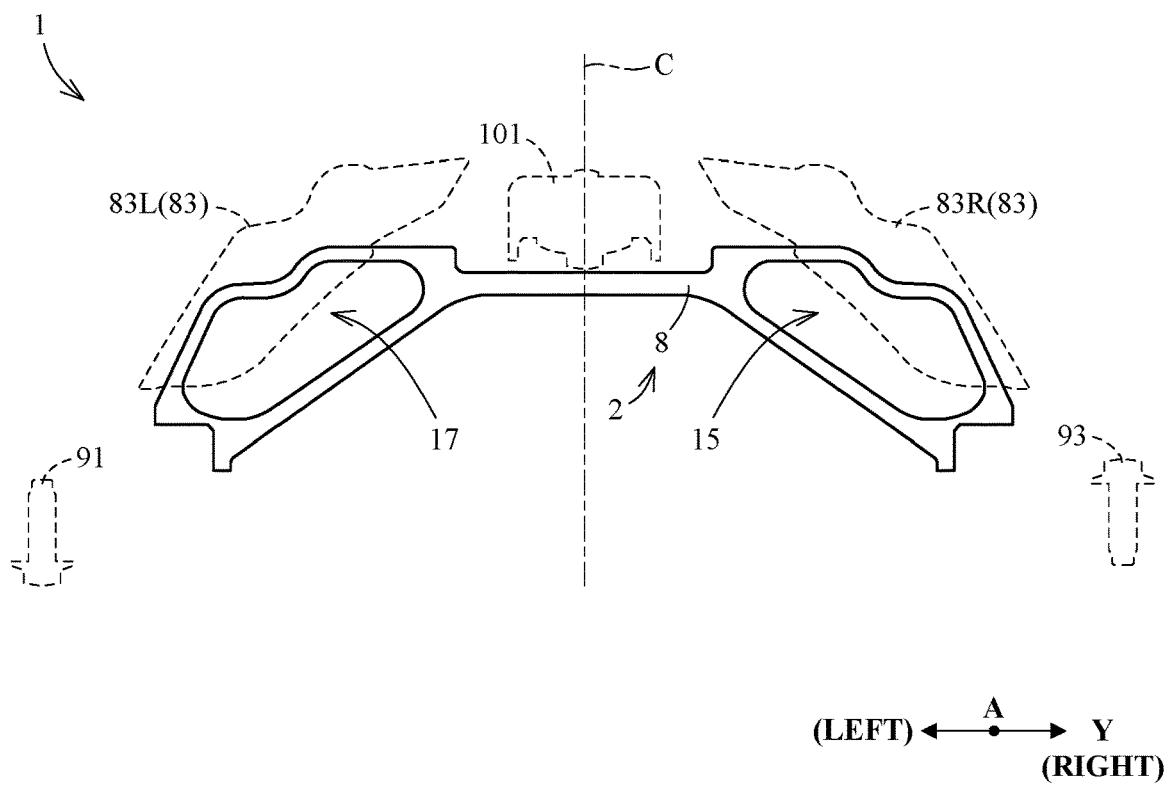
FIG. 28 is a perspective view of the cross member seen from an axis of a right hole.

FIG. 28 is a perspective view of the cross member 8 seen from the axis A of the right hole 15. FIG. 28 shows the right inlet port 83R, the left inlet port 83L, the fastening portions 91 and 93, and the position regulator 101 by dotted lines.

When seen from the axis A of the right hole 15, the cross member 8 is located at a position overlapping the inlet port 83 (i.e., right inlet port 83R and left inlet port 83L). When seen from the axis A of the right hole 15, part of the right inlet port 83R overlaps part of the right hole 15. When seen from the axis A of the right hole 15, part of the left inlet port 83L overlaps part of the left hole 17.

When seen from the axis A of the right hole 15, the fastening portion 91 is located at a position not overlapping the inlet port 83. When seen from the axis A of the right hole 15, the fastening portion 91 is located more leftward than the inlet port 83.

When seen from the axis A of the right hole 15, the fastening portion 93 is located at a position not overlapping the inlet port 83. When seen from the axis A of the right hole 15, the fastening portion 93 is located more rightward than the inlet port 83.

When seen from the axis A of the right hole 15, the position regulator 101 is located at a position not overlapping the inlet port 83. When seen from the axis A of the right hole 15, the right inlet port 83R, the position regulator 101, and the left inlet port 83L are arranged side by side in the transverse direction Y. When seen from the axis A of the right hole 15, the position regulator 101 is located leftward of the right inlet port 83R. When seen from the axis A of the right hole 15, the position regulator 101 is located rightward of the left inlet port 83L.

7. Inner Configuration of Intake Passage 81.

The straddled vehicle 1 includes various configurations for achieving smooth gas flow within the intake passage 81. The following describes these configurations.

Reference is made to FIGS. 16 and 17. The straddled vehicle 1 includes a right guide wall 121R and a left guide wall 121L. The right guide wall 121R and the left guide wall 121L guide air within the intake passage 81.

The right guide wall 121R and the left guide wall 121L are located inside of the intake passage 81. Specifically, the right guide wall 121R and the left guide wall 121L are attached to the base 32 of the seat 31. The right guide wall 121R and the left guide wall 121L extend downward from the base 32 of the seat 31. The right guide wall 121R and the left guide wall 121L are formed integrally with the base 32 of the seat 31, for example.

The right guide wall 121R and the left guide wall 121L are located more rearward than the first load transmitting portion 33. That is, the right guide wall 121R and the left guide wall 121L are located more rearward than the cross member 8. The right guide wall 121R and the left guide wall 121L are located more forward than the second load transmitting portion 34.

The right guide wall 121R is located rightward of the vehicle center plane C. The left guide wall 121L is located leftward of the vehicle center plane C. The right guide wall 121R is located rightward of the through hole 42. The left guide wall 121L is located leftward of the through hole 42. The right guide wall 121R is connected to the right part 34R of the second load transmitting portion 34. The left guide wall 121L is connected to the left part 34L of the second load transmitting portion 34.

The right guide wall 121R extends forward and leftward in the plan view of the vehicle. The left guide wall 121L extends forward and rightward in the plan view of the vehicle.

More specifically, the right guide wall 121R includes a rear part 122R, an intermediate part 123R, and a front part 124R. The rear part 122R is connected to the right part 34R of the second load transmitting portion 34. The rear part 122R extends forward and leftward from the right part 34R of the second load transmitting portion 34. The intermediate part 123R is connected to the rear part 122R. The intermediate part 123R extends forward from the rear part 122R. The intermediate part 123R extends substantially parallel to the longitudinal direction X. The front part 124R is connected to the intermediate part 123R. The front part 124R extends forward and leftward from the intermediate part 123R.

The left guide wall 121L has the same construction and shape as the right guide wall 121R except for its symmetric. That is, the left guide wall 121L includes a rear part 122L, an intermediate part 123L, and a front part 124L. The rear part 122L, the intermediate part 123L, and the front part 124L correspond to the rear part 122R, the intermediate part 123R, and the front part 124R, respectively.

The front part 124R of the right guide wall 121R is connected to the front part 124L of the left guide wall 121L. More specifically, a front end of the front part 124L is connected to a front end of the front part 124R. A connection position of the front parts 124R and 124L is located on the vehicle center plane C. The right guide wall 121R and the left guide wall 121L entirely have a substantial V-shape in the plan view of the vehicle.

Reference is made to FIG. 18. The right guide wall 121R and the left guide wall 121L are located more forward than the right inlet port 83R and the left inlet port 83L. The right guide wall 121R and the left guide wall 121L are located more rearward than the air cleaner 51. At least part of the right guide wall 121R is located more leftward than the right inlet port 83R. At least part of the left guide wall 121L is located more rightward than the left inlet port 83L.

The right guide wall 121R is located rightward of the position regulator 101 in the plan view of the vehicle. The right guide wall 121R extends from a position rightward of the position regulator 101 to a position forward of the position regulator 101. The left guide wall 121L is located leftward of the position regulator 101 in the plan view of the vehicle. The left guide wall 121L extends from a position leftward of the position regulator 101 to a position forward of the position regulator 101. A connection position of the front part 124L of the right guide wall 121R and the front part 124L of the left guide wall 121L is located forward of the position regulator 101 in the plan view of the vehicle.

Figure 29:
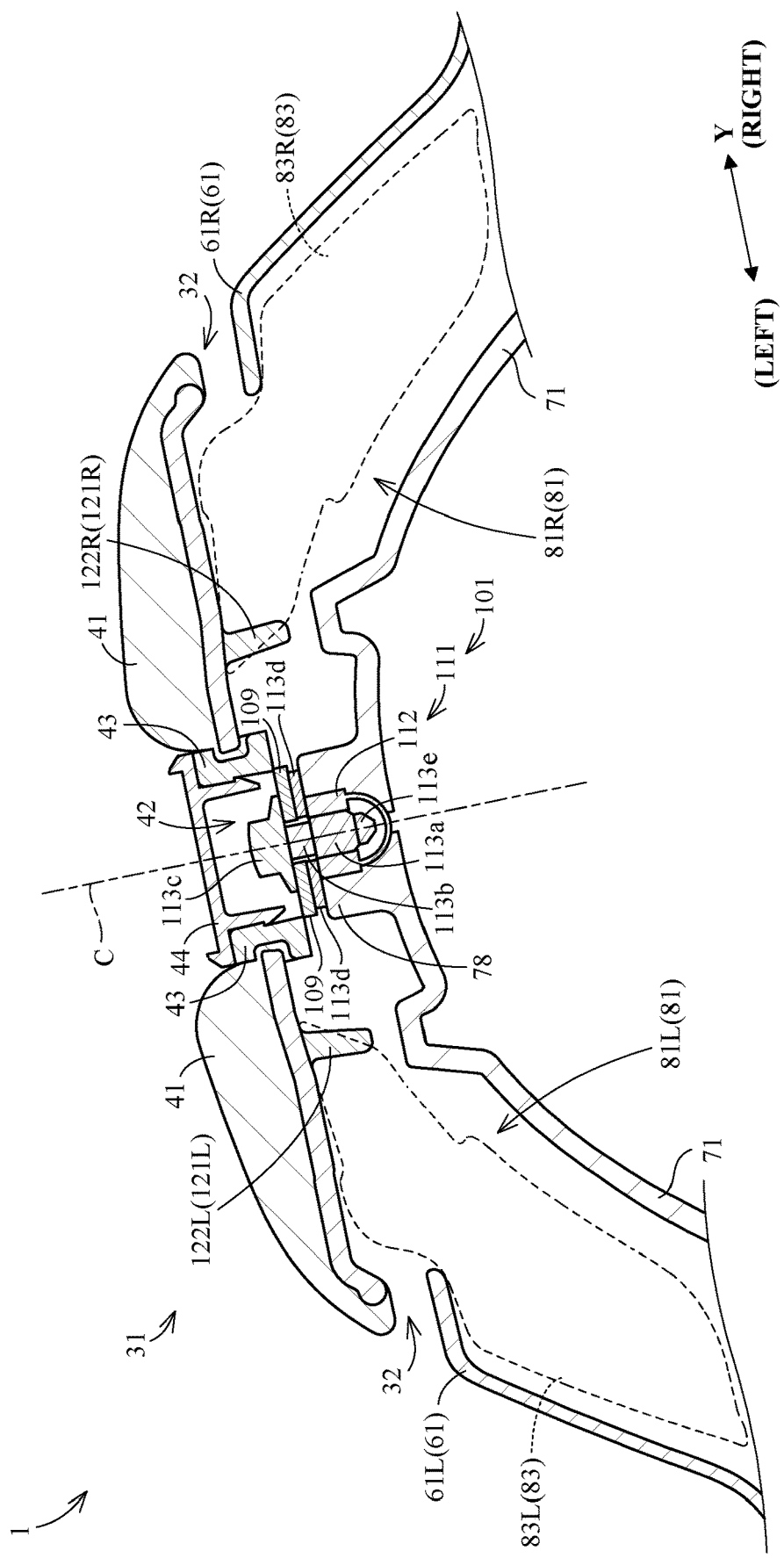
FIG. 29 is a sectional view taken on line XXIX-XXIX of FIG. 9.

FIG. 29 is a sectional view taken on line XXIX-XXIX of FIG. 9. FIG. 29 shows the position of the inlet port 83 by dotted lines. The right guide wall 121R (specifically, rear part 122R) is located at a position overlapping the right inlet port 83R. More specifically, the rear part 122R is located at a position overlapping the left end of the right inlet port 83R. The left guide wall 121L (specifically, rear part 122L) is located at a position overlapping the left inlet port 83L. More specifically, the rear part 122L is located at a position overlapping the right end of the left inlet port 83L.

The right guide wall 121R is located rightward of the position regulator 101. The left guide wall 121L is located leftward of the position regulator 101. The rear part 122R is located rightward of the fastening portion 111. Specifically, the rear part 122L is located leftward of the fastening portion 111. The rear parts 122R and 122L are located adjacent to the fastening portion 111. The rear parts 122R and 122L extend from a position higher than the lower end of the through hole 42 to a position lower than the lower end of the through hole 42. In FIG. 29, the rear parts 122R and 122L are not in contact with the rear fender 71. However, a large part of the rear part 122R and a large part of the rear part 122L each contact the rear fender 71. Moreover, the rear parts 122R and 122L contact the seat 31.

The intake passage 81 is divided into a right intake passage 81R and a left intake passage 81L by the right guide wall 121R and the left guide wall 121L, respectively. The right intake passage 81R is located rightward of the right guide wall 121R and leftward of the right side cover 61R. The right intake passage 81R extends from the front part 124R of the right guide wall 121R to the right inlet port 83R. The left intake passage 81L is located leftward of the left guide wall 121L and rightward of the left side cover 61L. The left intake passage 81L extends from the front part 124L of the left guide wall 121L to the left inlet port 83L. The right intake passage 81R and the left intake passage 81L join in front of the right guide wall 121R and the left guide wall 121L.

The right intake passage 81R corresponds to a flow path for air having flowed from the right inlet port 83R into the intake passage 81. In other words, the right intake passage 81R corresponds to a flow path for air after passing through the right inlet port 83R. The left intake passage 81L corresponds to a flow path for air having flowed from the left inlet port 83L into the intake passage 81. In other words, the left intake passage 81L corresponds to a flow path for air after passing through the left inlet port 83L.

Air flows from outside of the straddled vehicle 1 through the right inlet port 83R into the right intake passage 81R. Air flows from outside of the straddled vehicle 1 through the left inlet port 83L into the left intake passage 81L. The air having flowed in the right intake passage 81R and the air having flowed in the left intake passage 81L join in front of the right guide wall 121R and the left guide wall 121L.

Figure 30:
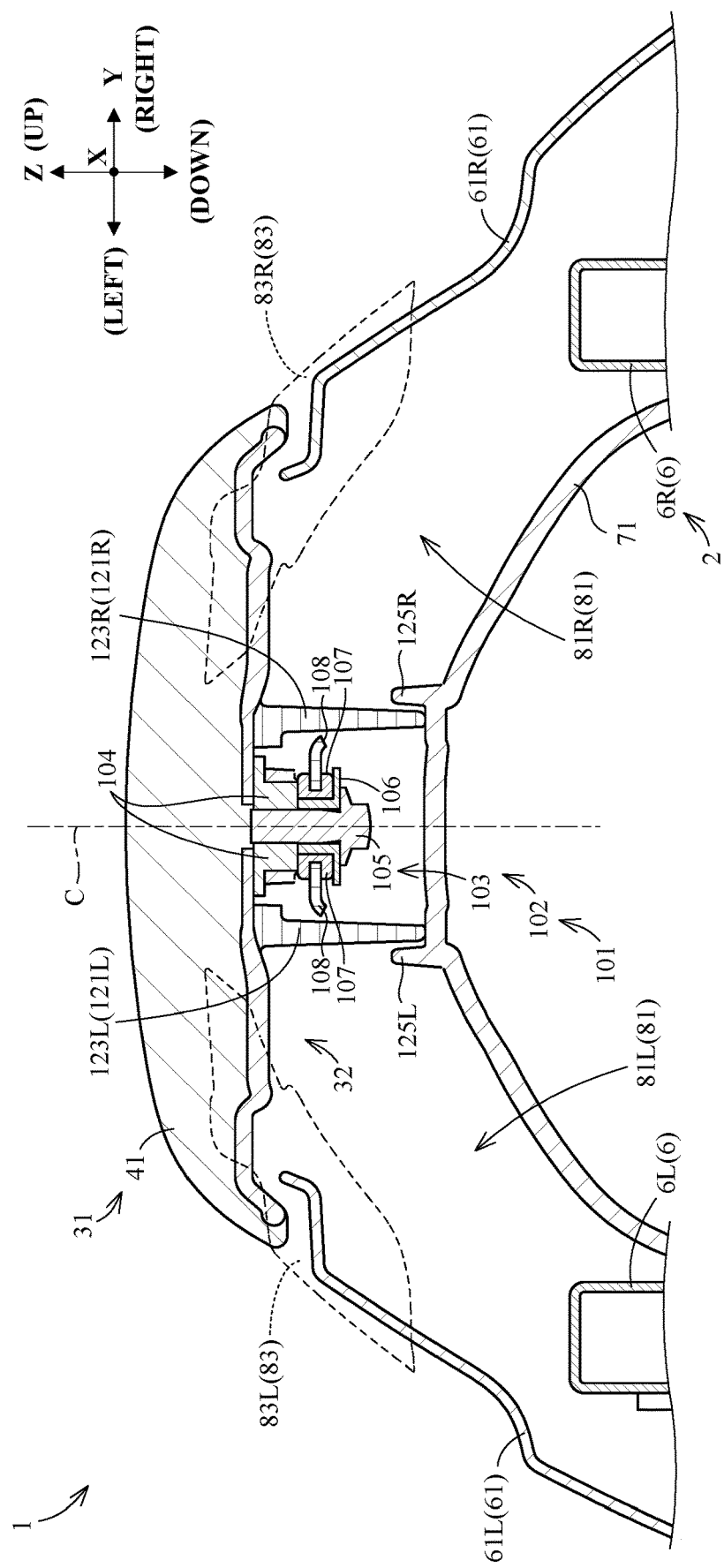
FIG. 30 is a sectional view taken on line XXX-XXX of FIG. 9.

FIG. 30 is a sectional view taken on line XXX-XXX of FIG. 9. FIG. 30 shows the position of the inlet port 83 by dotted lines. The right guide wall 121R (specifically, intermediate part 123R) is located more leftward than the right inlet port 83R. The left guide wall 121L (specifically, intermediate part 123L) is located more rightward than the left inlet port 83L.

The right guide wall 121R is located rightward of the position regulator 101. The left guide wall 121L is located leftward of the position regulator 101. Specifically, the intermediate part 123R is located rightward of the holder 102 and the elastic member 107. The intermediate part 123L is located leftward of the holder 102 and the elastic member 107. The intermediate parts 123R and 123L are located adjacent to the holder 102 and the elastic member 107.

The intermediate part 123R contacts the seat 31 and the rear fender 71. Specifically, an upper edge of the intermediate part 123R is connected to the base 32 of the seat 31. A lower edge of the intermediate part 123R contacts the rear fender 71. Thus, the intermediate part 123R extends from the seat 31 to the rear fender 71. The intermediate part 123L also contacts the seat 31 and the rear fender 71. Specifically, an upper edge of the intermediate part 123L is connected to the base 32 of the seat 31. A lower edge of the intermediate part 123L contacts the rear fender 71. Thus, the intermediate part 123L extends from the seat 31 to the rear fender 71.

Accordingly, the intermediate parts 123R and 123L block the right intake passage 81R from the left intake passage 81L. Moreover, the intermediate parts 123R and 123L each have a function of transmitting a load of the seat 31. The rear fender 71 receives a load of the seat 31 via the intermediate parts 123R and 123L. The rear fender 71 receives a load of the seat 31 adjacent to the holder 102 and the elastic member 107.

The straddled vehicle 1 includes a right projection portion 125R and a left projection portion 125L. The right projection portion 125R and the left projection portion 125L are located inside of the intake passage 81. Specifically, the right projection portion 125R and the left projection portion 125L are each attached to the rear fender 71. The right projection portion 125R and the left projection portion 125L are formed integrally with the rear fender 71, for example. The right projection portion 125R and the left projection portion 125L each protrude upward from the rear fender 71. However, the right projection portion 125R and the left projection portion 125L do not each contact the seat 31. The right projection portion 125R is located at a position substantially same in level as a lower part of the intermediate part 123R. The right projection portion 125R is located slightly rightward of the intermediate part 123R. When the intermediate part 123R moves rightward relative to the rear fender 71, the intermediate part 123R contacts the right projection portion 125R. Thereby, the right projection portion 125R restricts excessive rightward movement of the intermediate part 123R. The left projection portion 125L is located at a position substantially same in level as a lower part of the intermediate part 123L. The left projection portion 125L is located slightly leftward of the intermediate part 123L. When the intermediate part 123L moves leftward relative to the rear fender 71, the intermediate part 123L contacts the left projection portion 125L. Thereby, the left projection portion 125L restricts excessive leftward movement of the intermediate part 123L.

Reference is made to FIG. 18. The right projection portion 125R and the left projection portion 125L are located more forward than the right inlet port 83R and the left inlet port 83L in the plan view of the vehicle. The right projection portion 125R and the left projection portion 125L are located more rearward than the air cleaner 51 in the plan view of the vehicle. The right projection portion 125R and the left projection portion 125L are located more leftward than the right inlet port 83R and more rightward than the left inlet port 83L in the plan view of the vehicle. The right projection portion 125R and the left projection portion 125L extend substantially parallel to the longitudinal direction X.

Reference is made to FIG. 9. The straddled vehicle 1 includes a first fin 126 and a second fin 127. The first fin 126 and the second fin 127 regulate flow of air within the intake passage 81. The first fin 126 and the second fin 127 adjust flow of air within the intake passage 81 to be in the longitudinal direction X.

The first fin 126 and the second fin 127 are located inside of the intake passage 81. The first fin 126 is connected to the rear fender 71. The first fin 126 does not contact the seat 31. The second fin 127 is located more forward than the first fin 126. The second fin 127 is connected to the seat 31. The second fin 127 does not contact the rear fender 71.

Reference is made to FIG. 18. The first fin 126 and the second fin 127 are located more forward than the inlet port 83 in the plan view of the vehicle. The first fin 126 and the second fin 127 are located more rearward than the air cleaner 51 in the plan view of the vehicle. Part of the second fin 127 overlaps the air cleaner 51 in the plan view of the vehicle.

The first fin 126 and the second fin 127 are located more forward than the position regulator 101 in the plan view of the vehicle. The first fin 126 and the second fin 127 are located more forward than the right guide wall 121R and the left guide wall 121L in the plan view of the vehicle. More specifically, part of the first fin 126 is located more forward than the right guide wall 121R and the left guide wall 121L in the plan view of the vehicle. The entire of the second fin 127 is located more forward than the right guide wall 121R and the left guide wall 121L in the plan view of the vehicle.

The first fin 126 and the second fin 127 are located more leftward than the right inlet port 83R and more rightward than the left inlet port 83L in the plan view of the vehicle. The first fin 126 and the second fin 127 are located on the vehicle center plane C in the plan view of the vehicle. The first fin 126 and the second fin 127 are located in front of the connection position between the front part 124R of the right guide wall 121R and the front part 124L of the left guide wall 121L in the plan view of the vehicle.

The first fin 126 and the second fin 127 extend in a substantially longitudinal direction X in the plan view of the vehicle. The first fin 126 and the second fin 127 are located so as to be arranged in line in the longitudinal direction X in the plan view of the vehicle. Part of the first fin 126 overlaps part of the second fin 127 in the plan view of the vehicle. Specifically, a front part of the first fin 126 overlaps a rear part of the second fin 127 in the plan view of the vehicle.

Reference is made to FIG. 20. The first fin 126 is attached to the rear fender 71. The first fin 126 extends upward from the rear fender 71. The first fin 126 is formed integrally with the rear fender 71, for example.

Reference is made to FIGS. 6 and 7. The first fin 126 overlaps the cross member 8 in the plan view of the vehicle.

Reference is made to FIG. 10. The first fin 126 extends upward from the upper edge 71a of the rear fender 71. The first fin 126 extends to a position higher than the upper edge 6Ra of the right seat frame 6R and the upper edge 6La of the left seat frame 6L. However, the first fin 126 does not contact the cross member 8. The first fin 126 is located below the cross member 8.

Reference is made to FIGS. 16 and 17. The second fin 127 is attached to the base 32 of the seat 31. The second fin 127 extends downward from the base 32 of the seat 31. The second fin 127 is formed integrally with the base 32 of the seat 31, for example.

The second fin 127 is located more forward than the first load transmitting portion 33 in the plan view of the vehicle. Consequently, the second fin 127 is located more forward than the cross member 8 in the plan view of the vehicle. The second fin 127 is located more rearward than the third load transmitting portion 35 in the plan view of the vehicle.

The first fin 126 and the second fin 127 each correspond to one example of the fin in the present invention.

Reference is made to FIGS. 9, 16, and 17. The seat 31 includes a guide slope 39. The guide slope 39 is located on the base 32 of the seat 31.

The guide slope 39 contacts the upper part of the intake passage 81. The guide slope 39 guides air to the air cleaner 51. The guide slope 39 is inclined forward and downward. The guide slope 39 curves forward and downward.

The guide slope 39 is located more forward than the first load transmitting portion 33 in the plan view of the vehicle. The guide slope 39 is located more forward than the first fin 126 and the second fin 127 in the plan view of the vehicle. The guide slope 39 is located more rearward than the hook 115 in the plan view of the vehicle. The guide slope 39 is located more leftward than the right part 35R of the third load transmitting portion 35 and more rightward than the left part 35L of the third load transmitting portion 35 in the plan view of the vehicle. The guide slope 39 is located above the air cleaner 51. More specifically, the guide slope 39 is located above the outer circumferential face 52a of the air cleaner element 52.

Reference is made to FIG. 18. The guide slope 39 is located more forward than the inlet port 83. The guide slope 39 overlaps the air cleaner 51 in the plan view of the vehicle. The guide slope 39 overlaps the outer circumferential face 52a of the air cleaner element 52 in the plan view of the vehicle.

Reference is made to FIGS. 16 and 17. The straddled vehicle 1 includes a right blocking wall 129R and a left blocking wall 129L. The right blocking wall 129R and the left blocking wall 129L prevent flow of air from a position other than the inlet port 83 into the intake passage 81. This suppresses reduction in a substantial distance of the intake passage 81. In other words, reduction in an effective distance of the intake passage 81 is suppressed. Specifically, it is suppressed that a distance where air runs through the intake passage 81 before being taken into the air cleaner 51 becomes shorter than a distance between the air cleaner 51 and the inlet port 83. A distance where air actually flows within the intake passage 81 corresponds to the substantial distance of the intake passage 81 and the effective distance of the intake passage 81.

The right blocking wall 129R and the left blocking wall 129L are located inside of the intake passage 81.

The right blocking wall 129R and the left blocking wall 129L are attached to the base 32 of the seat 31. The right blocking wall 129R and the left blocking wall 129L extend downward from the base 32 of the seat 31. The right blocking wall 129R and the left blocking wall 129L are formed integrally with the base 32 of the seat 31, for example.

The right blocking wall 129R is located rightward of the vehicle center plane C in the plan view of the vehicle. The left blocking wall 129L is located leftward of the vehicle center plane C in the plan view of the vehicle. The right blocking wall 129R and the left blocking wall 129L extend in the longitudinal direction X in the plan view of the vehicle.

The right blocking wall 129R and the left blocking wall 129L are located more forward than the first load transmitting portion 33. The right blocking wall 129R and the left blocking wall 129L are located more rearward than the third load transmitting portion 35. The right blocking wall 129R is located more rightward than the first load transmitting portion 33 in the plan view of the vehicle. The left blocking wall 129L is located more leftward than the first load transmitting portion 33 in the plan view of the vehicle.

The right blocking wall 129R is located rightward of the second fin 127 in the plan view of the vehicle. The left blocking wall 129L is located leftward of the second fin 127 in the plan view of the vehicle. The right blocking wall 129R, the second fin 127, and the left blocking wall 129L are arranged side by side in the transverse direction Y.

Reference is made to FIG. 18. The right blocking wall 129R is located more forward than the right inlet port 83R. The left blocking wall 129L is located more forward than the left inlet port 83L. The right blocking wall 129R and the left blocking wall 129L are located more rearward than the air cleaner 51 in the plan view of the vehicle. Part of the right blocking wall 129R and part of the left blocking wall 129L overlap the air cleaner 51 in the plan view of the vehicle. Part of the right blocking wall 129R and part of the left blocking wall 129L overlap the air cleaner element 52 in the plan view of the vehicle.

Figure 31:
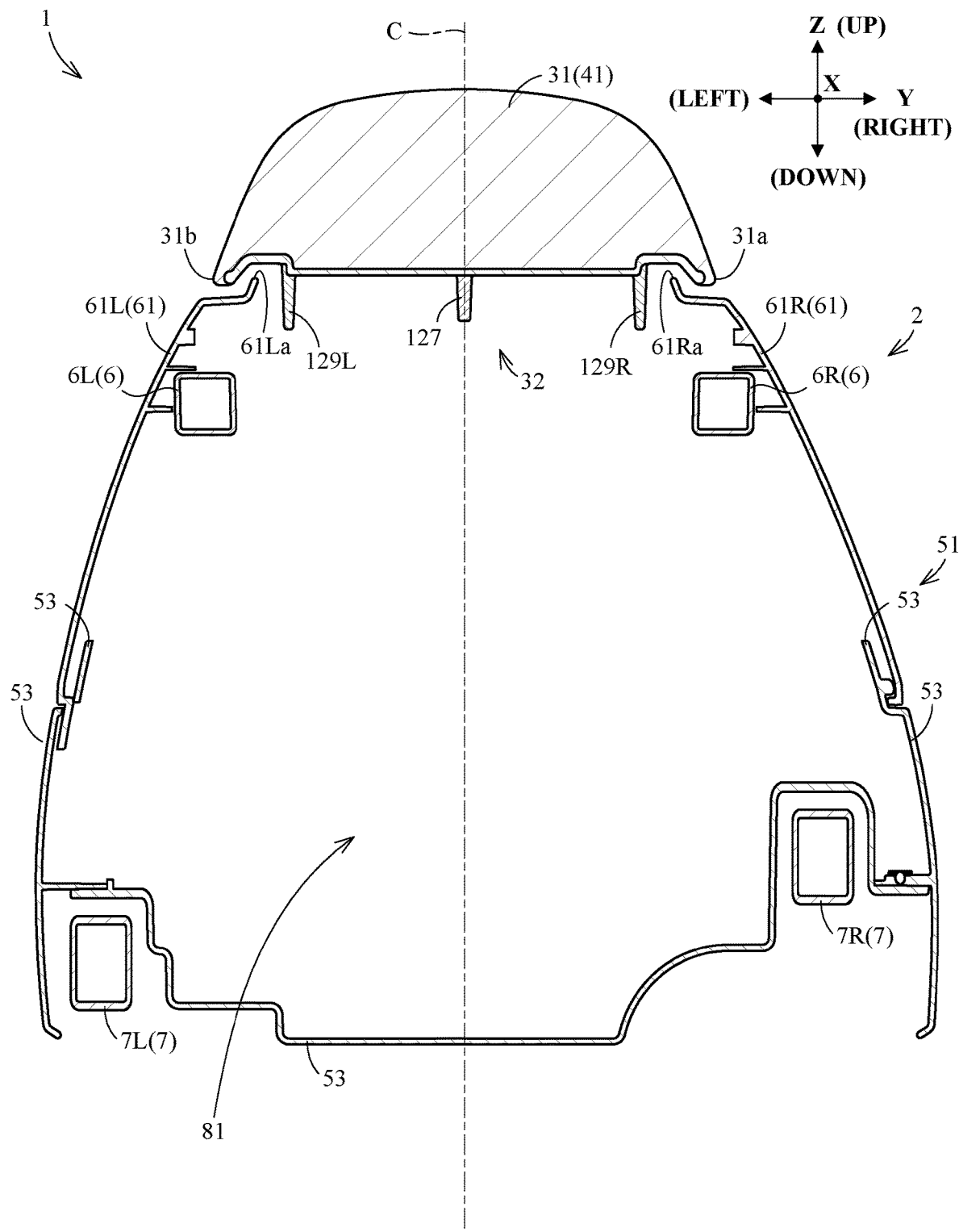
FIG. 31 is a sectional view taken on line XXXI-XXXI of FIG. 9.
Figure 32:
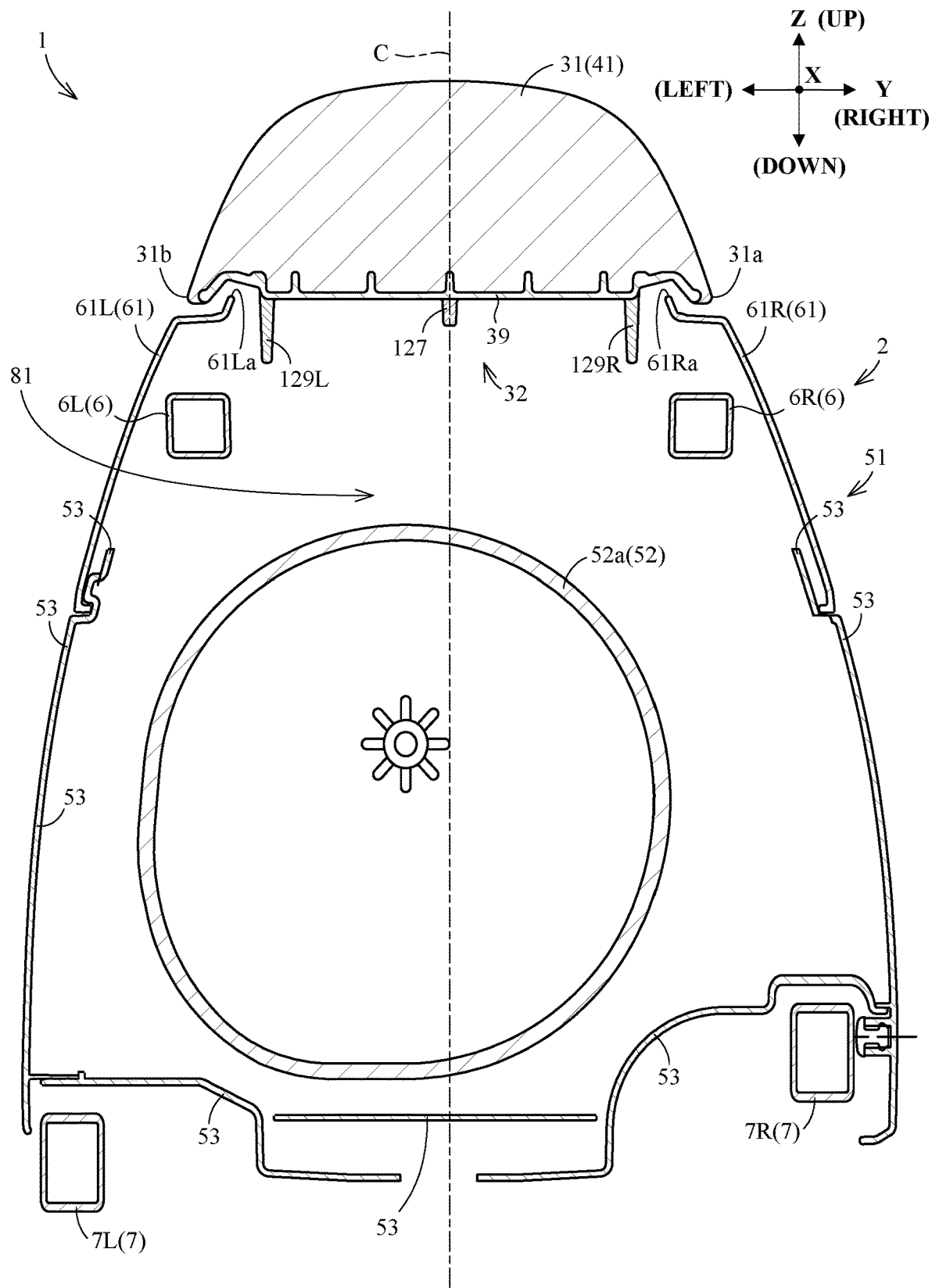
FIG. 32 is a sectional view taken on line XXXII-XXXII of FIG. 9.

FIG. 31 is a sectional view taken on line XXXI-XXXI of FIG. 9. FIG. 32 is a sectional view taken on line XXXII-XXXII of FIG. 9. The section taken on the line XXXI-XXXI contains the right blocking wall 129R and the left blocking wall 129L and is perpendicular to the longitudinal direction X. The section taken on the line XXXII-XXXII also contains the right blocking wall 129R and the left blocking wall 129L and is perpendicular to the longitudinal direction X. In this specification, the section that contains the right blocking wall 129R and the left blocking wall 129L and is perpendicular to the longitudinal direction X is called a "second cross section".

In the second cross section, the second fin 127, the right blocking wall 129R, and the left blocking wall 129L extend downward from the base 32 of the seat 31. In the second cross section, the right blocking wall 129R is located leftward of the right seat frame 6R. The left blocking wall 129L is located rightward of the left seat frame 6L.

In the second cross section, the seat 31 includes a right edge 31a. In the second cross section, the right side cover 61R includes an upper edge 61Ra. In the second cross section, the right blocking wall 129R is located more leftward than the right edge 31a and the upper edge 61Ra. In the second cross section, the right blocking wall 129R extends from a position higher than the right edge 31a and the upper edge 61Ra to a position lower than the right edge 31a and the upper edge 61Ra.

In the second cross section, the seat 31 includes a left edge 31b. In the second cross section, the left side cover 61L includes an upper edge 61La. In the second cross section, the left blocking wall 129L is located more rightward than the left edge 31b and the upper edge 61La. In the second cross section, the left blocking wall 129L extends from a position higher than the left edge 31b and the upper edge 61La to a position lower than the left edge 31b and the upper edge 61La.

Reference is made to FIG. 2. FIG. 2 shows the left blocking wall 129L by dotted lines. The left blocking wall 129L overlaps at least part of a boundary K between the seat 31 and the left side cover 61L in the side view of the vehicle. Here, the boundary K extends in the substantially longitudinal direction X in the side view of the vehicle. The left blocking wall 129L extends from a position higher than the boundary K to a position lower than the boundary K in the side view of the vehicle. Specifically, the left blocking wall 129L includes an upper edge 129La and a lower edge 129Lb in the side view of the vehicle. The upper edge 129La is located at a position higher than the boundary K in the side view of the vehicle. The lower edge 129Lb is located at a position lower than the boundary K in the side view of the vehicle. The left blocking wall 129L extends from the upper edge 129La to the lower edge 129Lb in the side view of the vehicle.

The right blocking wall 129R overlaps at least part of a boundary between the seat 31 and the right side cover 61R in the side view of the vehicle, which illustration is omitted.

8. Advantageous Effects

The right seat frame 6R is located rightward of the vehicle center plane C. The left seat frame 6L is located leftward of the vehicle center plane C. The cross member 8 is located between the right seat frame 6R and the left seat frame 6L. The cross member 8 connects the right seat frame 6R with the left seat frame 6L. The cross member 8 is located more rearward than the air cleaner 51. Accordingly, the cross member 8 can reinforce the right seat frame 6R and the left seat frame 6L at an appropriate position. This can enhance rigidity of the body frame 2 conveniently.

The seat 31 is located above the right seat frame 6R, the left seat frame 6L, and the cross member 8. The right side cover 61R is located rightward of the right seat frame 6R. The left side cover 61L is located leftward of the left seat frame 6L. The rear fender 71 contains a part located below the right seat frame 6R, the left seat frame 6L, and the cross member 8. The intake passage 81 is formed below the seat 31, leftward of the right side cover 61R, rightward of the left side cover 61L, and above the rear fender 71. The right inlet port 83R and the left inlet port 83L are each located in the rear part of the intake passage 81. The right inlet port 83R and the left inlet port 83L each communicate the intake passage 81 and the outside of the straddled vehicle 1. The air cleaner 51 is located in the front part of the intake passage 81. Consequently, air flows through the right inlet port 83R and the left inlet port 83L, thereby flowing into the intake passage 81. In the intake passage 81, air flows from the right inlet port 83R and the left inlet port 83L to the air cleaner 51. That is, air flows forward in the intake passage 81.

The right inlet port 83R and the left inlet port 83L are each opened rearward. Consequently, air flows forward even when passing through the right inlet port 83R and the left inlet port 83L. Thus, air can reach the air cleaner 51 from outside of the straddled vehicle 1 without significantly changing a direction of airflow. This can allow air to be introduced from outside of the straddled vehicle 1 into the intake passage 81 smoothly, and also to flow smoothly within the intake passage 81.

The right inlet port 83R is located rightward of the vehicle center plane C. The left inlet port 83L is located leftward of the vehicle center plane C. Consequently, the right inlet port 83R and the left inlet port 83L enable efficient introduction of air into the intake passage 81.

The cross member 8 is located below the seat 31. The cross member 8 is located above part of the rear fender 71. Specifically, the cross member 8 is located above the front part of the rear fender 71. The cross member 8 is located between the right seat frame 6R and the left seat frame 6L. That is, the cross member 8 is located leftward of the right side cover 61R and rightward of the left side cover 61L. The cross member 8 is located more rearward than the air cleaner 51 and more forward than the right inlet port 83R and the left inlet port 83L. Accordingly, the cross member 8 is located inside of the intake passage 81. Here, the cross member 8 has the shape curved to be convex upward in the rear view of the vehicle. This can suppress obstruction to airflow in the intake passage 81 by the cross member 8. Moreover, the cross member 8 is located at a position not overlapping the right inlet port 83R or the left inlet port 83L in the rear view of the vehicle. This can further suppress obstruction to airflow in the intake passage 81 by the cross member 8.

The straddled vehicle 1 includes the fastening portion 93. The fastening portion 93 fastens the right side cover 61R to the rear fender 71. This can support the right side cover 61R conveniently. The fastening portion 93 is located at a position outside of the intake passage 81. Accordingly, the fastening portion 93 is not obstruction to the airflow in the intake passage 81.

The straddled vehicle 1 includes the fastening portion 91. The fastening portion 91 fastens the left side cover 61L to the rear fender 71. This can support the left side cover 61L conveniently. The fastening portion 91 is located at a position inside of the intake passage 81. However, the fastening portion 91 is located at a position not overlapping the right inlet port 83R or the left inlet port 83L in the rear view of the vehicle. Accordingly, the fastening portion 91 is unlikely to be obstruction to the airflow in the intake passage 81.

As described above, the cross member 8, the fastening portion 93, and the fastening portion 91 are unlikely to be the obstruction to the airflow in the intake passage 81. This achieves smooth airflow in the intake passage 81.

In summary, the straddled vehicle 1 according to this embodiment achieves enhanced rigidity of the body frame 2 as well as smooth airflow in the intake passage 81. Specifically, the cross member 8 can reinforce the right seat frame 6R and the left seat frame 6L conveniently without significantly obstructing the airflow in the intake passage 81. That is, both securing a flow path cross sectional area of the intake passage 81 and securing rigidity of the body frame 2 can be obtainable. In addition, the fastening portion 93 and the fastening portion 91 can support the right side cover 61R and the left side cover 61L conveniently without significantly obstructing the airflow in the intake passage 81.

The area of the cross member 8 in the rear view of the vehicle is smaller than the area of the cross member 8 in the plan view of the vehicle. This achieves a relatively enlarged flow path cross sectional area of the intake passage 81. This can further suppress obstruction to airflow in the intake passage 81 by the cross member 8.

An area of the cross member 8 in the plan view of the vehicle is larger than an area of the cross member 8 in the rear view of the vehicle. This can easily secure strength of the cross member 8. Accordingly, the cross member 8 can enhance rigidity of the body frame 2 easily.

The cross member 8 contacts the seat 31 at a position higher than the right seat frame 6R and the left seat frame 6L. Accordingly, a relatively large region formed below the cross member 8 is usable as the intake passage 81. This can further suppress obstruction to airflow in the intake passage 81 by the cross member 8.

If the cross member 8 does not contact the seat 31, the intake passage 81 is divided into a first space and a second space with the cross member 8. The first space is located below the seat 31 and above the cross member 8. The second space is located below the cross member 8 and above the rear fender 71. Accordingly, airflow within the intake passage 81 is separated into airflow flowing through the first space and airflow flowing through the second space with the cross member 8. Moreover, the first space and the second space are each relatively small. Consequently, if the cross member 8 does not contact the seat 31, air is hard to flow smoothly within the intake passage 81. In contrast to this, since the cross member 8 contacts the seat 31 in the straddled vehicle 1, a relatively large space is formable below the cross member 8. Consequently, air is likely to flow more smoothly within the intake passage 81 in the straddled vehicle 1 than the case where the cross member 8 does not contact the seat 31.

The cross member 8 has the right hole 15 and the left hole 17. The right hole 15 and the left hole 17 each extend in the longitudinal direction X. That is, inside of the intake passage 81, the right hole 15 and the left hole 17 each extend substantially parallel to the intake passage 81. This allows air to pass through the right hole 15 and the left hole 17. That is, the flow path cross sectional area of the intake passage 81 can be further enlarged. This can further suppress obstruction to airflow in the intake passage 81 by the cross member 8.

When seen from the axis A of the right hole 15, part of the right inlet port 83R overlaps part of the right hole 15. Thus, air having entered from the right inlet port 83R into the intake passage 81 can flow in the right hole 15 smoothly. In other words, air can pass through the right inlet port 83R and the right hole 15 successively without significantly changing in a direction of airflow. When seen from the axis A of the right hole 15, part of the left inlet port 83L overlaps part of the left hole 17. Thus, air having entered from the left inlet port 83L into the intake passage 81 can flow in the left hole 17 smoothly. In other words, air can pass through the left inlet port 83L and the left hole 17 successively without significantly changing a direction of airflow.

The cross member 8 includes the right part 11, the left part 12, and the upper part 13. The right part 11 is connected to the right seat frame 6R. The right part 11 extends upward from the right seat frame 6R. The left part 12 is connected to the left seat frame 6L. The left part 12 extends upward from the left seat frame 6L. The upper part 13 is located at a position higher than the right seat frame 6R and the left seat frame 6L. The upper part 13 extends in the transverse direction Y. The upper part 13 connects the right part 11 with the left part 12. Accordingly, the cross member 8 can easily have the shape curved to be convex upward in the rear view of the vehicle.

The cross member 8 includes the right reinforcement portion 14 and the left reinforcement portion 16. The right reinforcement portion 14 is located more leftward than the right part 11. The right reinforcement portion 14 connects the right seat frame 6R with the upper part 13. The left reinforcement portion 16 is located more rightward than the left part 12. The left reinforcement portion 16 connects the left seat frame 6L with the upper part 13. This can easily secure strength of the cross member 8.

The right hole 15 is formed with the right part 11, the upper part 13, and the right reinforcement portion 14. Thus, the right hole 15 can be formed without impairing strength of the cross member 8. The left hole 17 is formed with the left part 12, the upper part 13, and the left reinforcement portion 16. Thus, the left hole 17 can be formed without impairing strength of the cross member 8. Consequently, a flow path cross sectional area of the intake passage 81 can be enlarged while rigidity of the cross member 8 is secured.

The right reinforcement portion 14 is connected with the right part 11. The left reinforcement portion 16 is connected with the left part 12. Thus, more enhanced strength of the cross member 8 is obtainable.

The rear fender 71 includes the upper edge 71a in the first cross section. In the first cross section, the upper edge 71a is curved convexly upward. In the first cross section, the upper edge 71a includes the first portion 71a1. In the first cross section, the first portion 71a1 is located at a position higher than the lower edge 6Rb of the right seat frame 6R and the lower edge 6Lb of the left seat frame 6L. Thus, the part of the rear fender 71 below the cross member 8 is located at a relatively high position. Here, the cross member 8 has the shape curved to be convex upward in the rear view of the vehicle. This can conveniently prevent a distance between the cross member 8 and the rear fender 71 in the first cross section from being excessively small. That is, a flow path cross sectional area of the intake passage 81 can be prevented from being excessively small conveniently in the first cross section. Thus, air can flow smoothly in the intake passage 81 even when the part of the rear fender 71 below the cross member 8 is located at a relatively high position. In other words, the shape of the cross member 8 is more helpful for securing the flow path cross sectional area when the part of the rear fender 71 below the cross member 8 is located at a relatively high position.

The straddled vehicle 1 includes the right guide wall 121R. The right guide wall 121R is located inside of the intake passage 81. The right guide wall 121R is located rightward of the vehicle center plane C. At least part of the right guide wall 121R is located more leftward than the right inlet port 83R. Consequently, the right guide wall 121R enables convenient guiding of air having flowed from the right inlet port 83R into the intake passage 81.

The right guide wall 121R extends forward and leftward in the plan view of the vehicle. Thus, the right intake passage 81R expands toward the air cleaner 51. Consequently, the right guide wall 121R enables convenient guiding of air, having flowed from the right inlet port 83R into the intake passage 81, to the air cleaner 51.

Likewise, the straddled vehicle 1 includes the left guide wall 121L. The left guide wall 121L is located inside of the intake passage 81. The left guide wall 121L is located leftward of the vehicle center plane C. At least part of the left guide wall 121L is located more rightward than the left inlet port 83L. Consequently, the left guide wall 121L enables convenient guiding of air having flowed from the left inlet port 83L into the intake passage 81.

The left guide wall 121L extends forward and rightward in the plan view of the vehicle. Consequently, the left intake passage 81L expands toward the air cleaner 51. Consequently, the left guide wall 121L enables convenient guiding of air, having flowed from the left inlet port 83L into the intake passage 81, to the air cleaner 51.

The front part 124R of the right guide wall 121R is connected to the front part 124L of the left guide wall 121L. This achieves convenient prevention of air from stagnating around the front part 124R of the right guide wall 121R and the front part 124L of the left guide wall 121L. Consequently, air can flow smoothly also around the front part 124R of the right guide wall 121R and the front part 124L of the left guide wall 121L.

The right guide wall 121R includes the intermediate part 123R. The intermediate part 123R contacts the seat 31 and the rear fender 71. This achieves reduction in a gap between the right guide wall 121R and the seat 31 and a gap between the right guide wall 121R and the rear fender 71. Accordingly, air is hard to flow into the gap between the right guide wall 121R and the seat 31 or the gap between the right guide wall 121R and the rear fender 71. Consequently, the right guide wall 121R enables more convenient guiding of air having flowed from the right inlet port 83R into the intake passage 81.

The left guide wall 121L includes the intermediate part 123L. The intermediate part 123L contacts the seat 31 and the rear fender 71. This achieves reduction in a gap between the left guide wall 121L and the seat 31 and a small gap between the left guide wall 121L and the rear fender 71. Accordingly, air is hard to flow into the gap between the left guide wall 121L and the seat 31 or the gap between the left guide wall 121L and the rear fender 71. Consequently, the left guide wall 121L enables more convenient introduction of air having flowed from the left inlet port 83L into the intake passage 81.

The straddled vehicle 1 includes the position regulator 101. The position regulator 101 joins the seat 31 with the rear fender 71. The position regulator 101 regulates movement of the seat 31 relative to the rear fender 71. Accordingly, the seat 31 can be kept at a suitable position.

The right guide wall 121R is located rightward of the position regulator 101 in the plan view of the vehicle. The right guide wall 121R extends from a position rightward of the position regulator 101 to a position forward of the position regulator 101. Accordingly, the position regulator 101 is located at a position apart from the right intake passage 81R. Consequently, the position regulator 101 does not obstruct flow of air having flowed from the right inlet port 83R into the intake passage 81. This achieves smooth airflow in the right intake passage 81R.

Likewise, the left guide wall 121L is located leftward of the position regulator 101 in the plan view of the vehicle. The left guide wall 121L extends from a position leftward of the position regulator 101 to a position forward of the position regulator 101. Accordingly, the position regulator 101 is located at a position apart from the left intake passage 81L. Consequently, the position regulator 101 does not obstruct flow of air having flowed from the left inlet port 83L into the intake passage 81. This achieves smooth airflow in the left intake passage 81L.

The position regulator 101 is located at a position not overlapping the right inlet port 83R or the left inlet port 83L in the rear view of the vehicle. This can further suppress obstruction to airflow in the intake passage 81 by the position regulator 101.

The straddled vehicle 1 includes the first fin 126 and the second fin 127. The first fin 126 and the second fin 127 are each located inside of the intake passage 81. The first fin 126 and the second fin 127 are each located more forward than the right guide wall 121R and the left guide wall 121L. The first fin 126 and the second fin 127 are each located more leftward than the right inlet port 83R and more rightward than the left inlet port 83L. The first fin 126 and the second fin 127 each extend in a longitudinal direction X in the plan view of the vehicle. Accordingly, the first fin 126 and the second fin 127 each enable to conveniently adjust flow of air having flowed from the right inlet port 83R into the intake passage 81 as well as flow of air having flowed from the left inlet port 83L into the intake passage 81 to be directed toward the air cleaner 51.

The seat 31 includes the guide slope 39. The guide slope 39 contacts the upper part of the intake passage 81. The guide slope 39 is located more forward than the first fin 126 and the second fin 127. The guide slope 39 is located above the air cleaner 51. The guide slope 39 is inclined forward and downward. Accordingly, the guide slope 39 enables to conveniently adjust airflow in the intake passage 81 around the air cleaner 51 to be directed toward the air cleaner 51.

The straddled vehicle 1 includes the left blocking wall 129L. The left blocking wall 129L is located inside of the intake passage 81. The left blocking wall 129L is located leftward of the vehicle center plane C. The left blocking wall 129L is located more forward than the left inlet port 83L. The left blocking wall 129L overlaps part of the boundary K between the seat 31 and the left side cover 61L in the side view of the vehicle. Consequently, the left blocking wall 129L can conveniently block flow of air from a position more forward than the left inlet port 83L into the intake passage 81 through the gap between the seat 31 and the left side cover 61L. This suppresses reduction in the substantial distance of the intake passage 81. Reduction in the effective distance of the intake passage 81 is suppressed. As a result, performance of the engine 24 is conveniently maintainable.

Likewise, the straddled vehicle 1 includes the right blocking wall 129R. The right blocking wall 129R is located inside of the intake passage 81. The right blocking wall 129R is located rightward of the vehicle center plane C. The right blocking wall 129R is located more forward than the right inlet port 83R. The right blocking wall 129R overlaps at least part of the boundary between the right side cover 61R and the seat 31 in the side view of the vehicle. Consequently, the right blocking wall 129R can conveniently prevent flow of air from a position more forward than the right inlet port 83R into the intake passage 81 through the gap between the seat 31 and the right side cover 61R. This suppresses reduction in the substantial distance of the intake passage 81. Reduction in the effective distance of the intake passage 81 is suppressed. As a result, performance of the engine 24 is conveniently maintainable.

The right side cover 61R and the rear fender 71 each form part of the circumferential portion of the right inlet port 83R. That is, the right side cover 61R does not form the entire circumferential portion of the right inlet port 83R. For example, there is no need to form a through hole used for the right inlet port 83R in the right side cover 61R. The rear fender 71 also does not form the entire circumferential portion of the right inlet port 83R. Consequently, the right inlet port 83R can be formed with a relatively simple configuration. Moreover, the right inlet port 83R can be made large easily.

The seat 31 also forms part of the circumferential portion of the right inlet port 83R. Consequently, the right inlet port 83R can be formed with a much simpler configuration. Moreover, the right inlet port 83R can be made large more easily.

Likewise, the left side cover 61L and the rear fender 71 each form part of a circumferential portion of the left inlet port 83L. Consequently, the left inlet port 83L can be formed with a relatively simple configuration. Moreover, the left inlet port 83L can be made large easily.

The seat 31 also forms part of the circumferential portion of the left inlet port 83L. Consequently, the left inlet port 83L can be formed with a much simpler configuration. Moreover, the left inlet port 83L can be made large more easily.

The right seat frame 6R is located rightward of the vehicle center plane C. The left seat frame 6L is located leftward of the vehicle center plane C. The cross member 8 joins the right seat frame 6R with the left seat frame 6L. The seat 31 is located above the right seat frame 6R, the left seat frame 6L, and the cross member 8. The seat 31 includes the first load transmitting portion 33. The cross member 8 includes the load receiver 18. The load receiver 18 contacts the first load transmitting portion 33. The load receiver 18 receives a load of the seat 31 from the first load transmitting portion 33. Consequently, the cross member 8 can receive a load of the seat 31 conveniently.

The load receiver 18 is located below the first load transmitting portion 33. Consequently, the cross member 8 can conveniently restrict downward movement of the seat 31 relative to the cross member 8.

The seat 31 includes a horizontal position determining portion 37. The cross member 8 includes a horizontal position determining portion 19. The horizontal position determining portion 19 contacts the horizontal position determining portion 37. The horizontal position determining portion 19 restricts movement of the seat 31 in the substantially horizontal direction relative to the cross member 8. Consequently, the cross member 8 can position the seat 31 in the substantially horizontal direction.

The rear fender 71 contains a part located below the seat 31. The position regulator 101 joins the seat 31 with the rear fender 71. The position regulator 101 regulates upward movement of the seat 31 relative to the rear fender 71. Consequently, the position regulator 101 and the load receiver 18 of the cross member 8 can position the seat 31 in the up-down direction Z.

In summary, the cross member 8 receives a load of the seat 31. The cross member 8 positions the seat 31 in the substantially horizontal direction. The cross member 8 and the position regulator 101 position the seat 31 in the up-down direction Z. Accordingly, the cross member 8 and the position regulator 101 can conveniently position the seat 31. As a result, the cross member 8 and the position regulator 101 can suitably support the seat 31.

The cross member 8 receives a load of the seat 31, whereby the load of the seat 31 applied to the position regulator 101 can be reduced conveniently. In other words, the cross member 8 reduces the load that the position regulator 101 receives from the seat 31. Consequently, the function of the position regulator 101 can be limited to a function of regulating the movement of the seat 31 relative to the rear fender 71. In other words, the function of receiving the load of the seat 31 is omittable from the function of the position regulator 101. As a result, even if the position regulator 101 is relatively small, the position regulator 101 can exert the function of regulating the movement of the seat 31 relative to the rear fender 71 sufficiently. Thus, the position regulator 101 can be reduced in size easily. For example, the width LP of the position regulator 101 can be made smaller than the width LR of the right inlet port 83R. For example, the width LP of the position regulator 101 can be made smaller than the width LL of the left inlet port 83L. For example, the width LP of the position regulator 101 can be made smaller than the distance D between the right inlet port 83R and the left inlet port 83L.

As a result, the right inlet port 83R and the left inlet port 83L can be made large easily. For example, the width LR of the right inlet port 83R can be made larger than the width LP of the position regulator 101. For example, the width LR of the right inlet port 83R can be made larger than the distance D between the right inlet port 83R and the left inlet port 83L. For example, the width LL of the left inlet port 83L can be made larger than the width LP of the position regulator 101. For example, the width LL of the left inlet port 83L can be made larger than the distance D between the right inlet port 83R and the left inlet port 83L.

The position regulator 101 includes the elastic member 107, the coupling portion 109, and the fastening portion 111. The elastic member 107 is supported by the seat 31. The elastic member 107 is elastically deformable. The coupling portion 109 is supported by the elastic member 107. The fastening portion 111 fastens the coupling portion 109 and the rear fender 71. Accordingly, the elastic member 107 is elastically deformed, whereby the coupling portion 109 is movable relative to the elastic member 107. That is, the elastic member 107 is elastically deformed, whereby the coupling portion 109 is movable relative to the seat 31. Consequently, the elastic member 107 is elastically deformed, whereby the load applied to the fastening portion 111 can be reduced more largely. In other words, elastic deformation of the elastic member 107 further reduces the load that the fastening portion 111 receives. Thus, the fastening portion 111 can be reduced in size easily. For example, a nominal diameter of the fastening portion 111 can be reduced easily.

As described above, the cross member 8 and the elastic member 107 achieve effective reduction in load applied to the fastening portion 111.

The seat 31 includes the second load transmitting portion 34. The rear fender 71 includes the load receiver 77. The load receiver 77 contacts the second load transmitting portion 34. The load receiver 77 receives a load of the seat 31 from the second load transmitting portion 34. Accordingly, the load of the seat 31 applied to the position regulator 101 can be reduced more largely.

The first load transmitting portion 33 and the second load transmitting portion 34 are located around the position regulator 101 in the plan view of the vehicle. Accordingly, the load applied to the position regulator 101 can be reduced effectively.

The second load transmitting portion 34 is located adjacent to the fastening portion 111. Accordingly, the load applied to the fastening portion 111 can be reduced effectively.

The rear fender 71 contacts the intermediate part 123R of the right guide wall 121R and the intermediate part 123L of the left guide wall 121L. The rear fender 71 receives a load of the seat 31 via the intermediate parts 123R and 123L. Accordingly, the load of the seat 31 applied to the position regulator 101 can be reduced more largely.

The intermediate parts 123R and 123L are located adjacent to the holder 102 (fastening portion 103). Accordingly, the load applied to the holder 102 (fastening portion 103) can be reduced effectively.

Moreover, the right projection portion 125R and the left projection portion 125L restrict the movement of the intermediate part 123R and the intermediate part 123L in the transverse direction Y. Consequently, this can effectively prevent a part of the seat 31 near the holder 102 (fastening portion 103) from moving in the transverse direction Y relative to the rear fender 71. Accordingly, the load applied to the holder 102 (fastening portion 103) can be reduced more effectively. The intermediate part 123R, the intermediate part 123L, the right projection portion 125R, and the left projection portion 125L extend in the substantially longitudinal direction X. Consequently, the right projection portion 125R and the left projection portion 125L permit the movement of the intermediate part 123R and the intermediate part 123L in the longitudinal direction X. Thus, tolerance of the intermediate part 123R, the intermediate part 123L, the right projection portion 125R, and the left projection portion 125L in the longitudinal direction X can be absorbed easily. Specifically, even if at least one of the intermediate part 123R, the intermediate part 123L, the right projection portion 125R, and the left projection portion 125L contains a dimensional error in the longitudinal direction X, the intermediate part 123R, the intermediate part 123L, the right projection portion 125R, and the left projection portion 125L can be located suitably.

The seat 31 includes the third load transmitting portion 35. The right seat frame 6R and the left seat frame 6L contact the third load transmitting portion 35. The right seat frame 6R and the left seat frame 6L receive the load of the seat 31 from the third load transmitting portion 35. Accordingly, the load of the seat 31 applied to the position regulator 101 can be reduced more largely.

The third load transmitting portion 35 is located more forward than the first load transmitting portion 33 and the second load transmitting portion 34. Consequently, the seat 31 can transmit the load of the seat 31 in good balance. The cross member 8, the rear fender 71, the right seat frame 6R, and the left seat frame 6L can receive the load of the seat 31 in good balance.

The elastic member 107 is elastically deformed, whereby the coupling portion 109 is movable in the up-down direction Z relative to the seat 31. If the seat 31 is moved upward relative to the rear fender 71, the elastic member 107 is elastically deformed, whereby the coupling portion 109 is moved downward relative to the seat 31. Accordingly, the load applied to the fastening portion 111 can be suppressed effectively.

The position regulator 101 is located on the vehicle center plane C in the plan view of the vehicle. Accordingly, the position regulator 101 is located at an appropriate position. Consequently, the position regulator 101 can regulate the movement of the seat 31 relative to the rear fender 71c conveniently. As described above, the position regulator 101 is relatively small. Accordingly, even when the position regulator 101 is located on the vehicle center plane C, the position regulator 101 does not overlap the right inlet port 83R or the left inlet port 83L in the rear view of the vehicle. This can conveniently suppress obstruction to airflow in the intake passage 81 by the position regulator 101.

The position regulator 101 is located more rearward than the cross member 8. Accordingly, the position regulator 101 can effectively regulate the movement of the rear part of the seat 31 relative to the rear fender 71.

Air flows forward in the intake passage 81. The position regulator 101 is located at a position not overlapping the right inlet port 83R or the left inlet port 83L in the rear view of the vehicle and near the right inlet port 83R and the left inlet port 83L. This can further suppress obstruction to airflow in the intake passage 81 by the position regulator 101.

The elastic member 107, the coupling portion 109, and the fastening portion 111 are located below the seat 31. Thus, the elastic member 107, the coupling portion 109, and the fastening portion 111 are located at an appropriate position. Accordingly, the position regulator 101 can effectively regulate the upward movement of the seat 31.

The straddled vehicle 1 includes the stay 108. The stay 108 is supported by the elastic member 107. The stay 108 supports the coupling portion 109. Thus, the elastic member 107 can support the coupling portion 109 conveniently via the stay 108.

The stay 108 extends rearward from the elastic member 107. The coupling portion 109 and the fastening portion 111 are located more rearward than the elastic member 107. Accordingly, the elastic member 107 is elastically deformed, whereby the coupling portion 109 is movable easily in the up-down direction Z relative to the elastic member 107. That is, the elastic member 107 is elastically deformed, whereby the coupling portion 109 is movable easily in the up-down direction Z relative to the seat 31. In other words, a distance where the coupling portion 109 is moved in the up-down direction Z relative to the seat 31 is effectively enlarged when the elastic member 107 is elastically deformed. Consequently, the elastic member 107 is elastically deformed, whereby the load applied to the fastening portion 111 can be reduced conveniently.

The stay 108 extends rearward and upward from the elastic member 107. The coupling portion 109 is located more rearward and higher than the elastic member 107. Consequently, the elastic member 107 is elastically deformed, whereby the coupling portion 109 is movable easily downward relative to the seat 31. If the seat 31 is moved upward relative to the rear fender 71, the elastic member 107 is elastically deformed, whereby the coupling portion 109 is moved downward relative to the seat 31. Accordingly, the load applied to the fastening portion 111 can be suppressed effectively.

The straddled vehicle 1 includes the holder 102. The holder 102 is supported by the seat 31. The holder 102 holds the elastic member 107. Thus, the seat 31 can support the elastic member 107 conveniently via the holder 102. Moreover, the elastic member 107 is elastically deformed, whereby the load applied to holder 102 can be reduced conveniently.

The holder 102 includes a fastening portion 103. The elastic member 107 is elastically deformed, whereby the load applied to the fastening portion 103 can be reduced conveniently. Thus, the fastening portion 103 can be reduced in size easily. For example, a nominal diameter of the fastening portion 103 can be reduced easily.

The elastic member 107 has a tube shape. The elastic member 107 includes the through hole 107a. The holder 102 is inserted into the through hole 107a of the elastic member 107. Thus, the holder 102 can support the elastic member 107 conveniently.

The elastic member 107 includes the outer circumferential face 107b. The stay 108 is connected to the outer circumferential face 107b of the elastic member 107. Thus, the elastic member 107 can support the stay 108 conveniently. Moreover, the elastic member 107 is elastically deformed, whereby the stay 108 is easily movable relative to the elastic member 107.

The fastening portion 111 includes the nut 112 and the bolt 113. The nut 112 is fixed to the rear fender 71. The bolt 113 is coupled with the nut 112. The coupling portion 109 includes the seating portion 109a and the through hole 109b. The seating portion 109a has a plate shape. The through hole 109b is formed in the seating portion 109a. Thereby, the fastening portion 111 can conveniently fix the coupling portion 109 to the rear fender 71.

The bolt 113 includes the screw 113a, the shaft 113b, the head 113c, and the washer 113d. The screw 113a is coupled with the nut 112. The shaft 113b is connected to the screw 113a. The head 113c is connected to the shaft 113b. The washer 113d is attached to the shaft 113b. The washer 113d is movable between the screw 113a and the head 113c. The shaft 113b is inserted in the through hole 109b. The seating portion 109a is located between the head 113c and the washer 113d. When the screw 113a is joined with the nut 112, the head 113c presses the seating portion 109a and the washer 113d against the nut 112. Thus, the fastening portion 111 can fix the coupling portion 109 to the rear fender 71 more conveniently.

The screw 113a has the outer diameter larger than the through hole of the washer 113d. This can conveniently prevent removal of the washer 113d from the shaft 113b. That is, the washer 113d is constantly attached to the shaft 113b. Thereby, the bolt 113 is attachable and detachable to and from the nut 112 easily. As a result, the fastening portion 111 can attach and detach the coupling portion 109 to and from the rear fender 71 easily.

The seating portion 109a is located between the head 113c and the washer 113d. Consequently, the shaft 113b is not removed from the through hole 109b even when the bolt 113 moves in the direction of the axis of the bolt 113 in such a state where the shaft 113b is inserted into the through hole 109b of the coupling portion 109. Specifically, the shaft 113b is immovable from inside of the through hole 109b to outside of the through hole 109b even when the bolt 113 moves in the direction of the axis of the bolt 113. Consequently, the bolt 113 is undetachable from the coupling portion 109 even when the bolt 113 moves in the direction of the axis of the bolt 113. As a result, the fastening portion 111 can attach and detach the coupling portion 109 to and from the rear fender 71 easily.

The through hole 109b of the coupling portion 109 is a cutout hole. Accordingly, the shaft 113b is easily insertable into the through hole 109b of the coupling portion 109 while the washer 113d is attached to the shaft 113b. Moreover, the shaft 113b is easily detachable from the through hole 109b of the coupling portion 109 while the washer 113d is attached to the shaft 113b.

The through hole 109b of the coupling portion 109 is a long hole. Accordingly, the shaft 113b is insertable into the through hole 109b of the coupling portion 109 even when at least one of the seat 31, the rear fender 71, and the position regulator 101 contains a dimensional error. Consequently, the fastening portion 111 can fasten the coupling portion 109 to the rear fender 71 even when at least one of the seat 31, the rear fender 71, and the position regulator 101 contains a dimensional error.

The fastening portion 111 is located below the seat 31. The head 113c is located above the nut 112. The seat 31 includes the through hole 42. The through hole 42 is located above the head 113c. Consequently, the head 113c of the bolt 113 is easily accessible via the through hole 42 of the seat 31. Thereby, the bolt 113 is attachable and detachable to and from the nut 112 easily. As a result, the fastening portion 111 can attach and detach the coupling portion 109 to and from the rear fender 71 easily.

The through hole 42 of the seat 31 has the inner diameter larger than the outer diameter of the head 113c. Consequently, the head 113c is easily accessible.

At least part of the head 113c is located inside of the through hole 42 of the seat 31. Consequently, the head 113c is accessible more easily.

The through hole 42 of the seat 31 restricts an area where the head 113c is movable in the substantially horizontal direction. Specifically, the through hole 42 of the seat 31 restricts the area where the head 113c is movable in the substantially horizontal direction within the inside of the through hole 42 of the seat 31. Strictly speaking, when at least part of the head 113c is located inside of the through hole 42, the through hole 42 restricts the area where the head 113c is movable in the substantially horizontal direction within the inside of the through hole 42. Since the through hole 42 restricts the area where the head 113c is movable in the substantially horizontal direction, the through hole 42 restricts detachment of the shaft 113b from the through hole 109b of the coupling portion 109. This can conveniently prevent detachment of the bolt 113 from the coupling portion 109. As a result, the fastening portion 111 can attach and detach the coupling portion 109 to and from the rear fender 71 easily.

The bolt 113 includes a distal end 113e. The distal end 113e is connected to the screw 113a. The distal end 113e has the outer diameter smaller than the outer diameter of the screw 113a. The distal end 113e guides the screw 113a to the nut 112. Thus, the screw 113a is insertable into the nut 112 easily. Thereby, the bolt 113 is attachable and detachable to and from the nut 112 more easily. For example, the bolt 113 is attachable and detachable to and from the nut 112 easily even when the nut 112 is invisible.

This invention is not limited to the foregoing embodiment, but may be modified as follows:

(1) In this embodiment, the horizontal position determining portion 37 of the seat 31 includes the right position determining portion 37a, the left position determining portion 37b, the front position determining portion 37c, and the rear position determining portion 37d. The horizontal position determining portion 19 of the cross member 8 includes the right position determining portion 19a, the left position determining portion 19b, the front position determining portion 19c, and the rear position determining portion 19d. However, the invention is not limited to this. For example, one of the horizontal position determining portion 37 and the horizontal position determining portion 19 may include a shaft extending in the up-down direction Z and the other of the horizontal position determining portion 37 and the horizontal position determining portion 19 may be a tube having an inner circumferential face contacting an outer circumferential face of the shaft. Also in such a modification, the horizontal position determining portion 37 can conveniently restrict movement of the seat 31 in the substantially horizontal direction relative to the cross member 8.

(2) In this embodiment, the seat 31, the right side cover 61R, and the rear fender 71 each form part of the circumferential portion of the right inlet port 83R. However, the invention is not limited to this. For example, any two selected from the seat 31, the right side cover 61R, and the rear fender 71 may form part of the circumferential portion of the right inlet port 83R. That is, one selected from the seat 31, the right side cover 61R, and the rear fender 71 may not form part of the circumferential portion of the right inlet port 83R. For example, each of the right side cover 61R and the rear fender 71 may form part of the circumferential portion of the right inlet port 83R. In other words, the circumferential portion of the right inlet port 83R may be formed with only the right side cover 61R and the rear fender 71.

(3) In this embodiment described above, the seat 31, the left side cover 61L, and the rear fender 71 each form part of the circumferential portion of the left inlet port 83L. However, the invention is not limited to this. For example, any two selected from the seat 31, the left side cover 61L, and the rear fender 71 may form part of the circumferential portion of the left inlet port 83L. That is, one selected from the seat 31, the left side cover 61L, and the rear fender 71 may not form part of the circumferential portion of the left inlet port 83L. For example, each of the left side cover 61L and the rear fender 71 may form part of the circumferential portion of the left inlet port 83L. In other words, the circumferential portion of the left inlet port 83L may be formed with only the left side cover 61L and the rear fender 71.

(4) In this embodiment, the fastening portion 93 fastens the right side cover 61R to the rear fender 71. However, the invention is not limited to this. For example, the fastening portion 93 may fasten the right side cover 61R to the right seat frame 6R.

(5) In this embodiment, the fastening portion 91 fastens the left side cover 61L to the rear fender 71. However, the invention is not limited to this. For example, the fastening portion 91 may fasten the left side cover 61L to the left seat frame 6L.

(6) In this embodiment, the fastening portion 91 is located at a position not overlapping the right inlet port 83R or the left inlet port 83L in the rear view of the vehicle and outside of the intake passage 81. However, the invention is not limited to this. The fastening portion 91 may be located at least either a position not overlapping the right inlet port 83R or the left inlet port 83L in the rear view of the vehicle or at a position outside of the intake passage 81. For example, the fastening portion 91 may be located at a position not overlapping the right inlet port 83R or the left inlet port 83L in the rear view of the vehicle and inside of the intake passage 81. For example, the fastening portion 91 may be located at a position overlapping the right inlet port 83R and the left inlet port 83L in the rear view of the vehicle and outside of the intake passage 81.

(7) In this embodiment, the fastening portion 93 is located at a position not overlapping the right inlet port 83R or the left inlet port 83L in the rear view of the vehicle and inside of the intake passage 81. However, the invention is not limited to this. The fastening portion 93 may be located at least either a position not overlapping the right inlet port 83R or the left inlet port 83L in the rear view of the vehicle or at a position outside of the intake passage 81. For example, the fastening portion 93 may be located at a position not overlapping the right inlet port 83R and the left inlet port 83L in the rear view of the vehicle and outside of the intake passage 81. For example, the fastening portion 93 may be located at a position overlapping the right inlet port 83R and the left inlet port 83L in the rear view of the vehicle and outside of the intake passage 81.

(8) In this embodiment, the position regulator 101 joins the seat 31 with the rear fender 71. However, the invention is not limited to this. For example, the position regulator 101 may join the seat 31 with the body frame 2. The body frame 2 joined with the seat 31 by the position regulator 101 is at least one of the right seat frame 6R, the left seat frame 6L, and the cross member 8, for example. For example, the body frame 2 may include a frame member connected with at least one of the right seat frame 6R, the left seat frame 6L, and the cross member 8, and the position regulator 101 may join the frame member with the seat 31.

(9) In this embodiment, the position regulator 101 includes the coupling portion 109 and the fastening portion 111. However, the invention is not limited to this. For example, the position regulator 101 does not need to include any of the coupling portion 109 and the fastening portion 111. For example, the position regulator 101 may include a hook and a bar contacting the hook. For example, the seat 31 may include one of the hook and the bar, and the rear fender 71 or the body frame 2 may include the other of the hook and the bar. It is preferred that one of the hook and the bar is located below the other of the hook and the bar and one of the hook and the bar contacts the other of the hook and the bar. Also in such a modification, the position regulator 101 can conveniently regulate movement of the seat 31 relative to either the rear fender 71 or the body frame 2. Especially, the position regulator 101 can conveniently regulate upward movement of the seat 31 relative to either the rear fender 71 or the body frame 2.

(10) In this embodiment, the position regulator 101 includes the holder 102. However, the invention is not limited to this. For example, the holder 102 is omittable. For example, the seat 31 may directly support the elastic member 107.

(11) In this embodiment, the position regulator 101 includes the stay 108. However, the invention is not limited to this. For example, the stay 108 is omittable. For example, the elastic member 107 may directly support the coupling portion 109.

(12) In this embodiment, the elastic member 107 has a tube shape. However, the invention is not limited to this. For example, the elastic member 107 may have a plate shape. The elastic member 107 may have a shape extending in the longitudinal direction X.

(13) In this embodiment, a grommet or a bushing is exemplarily described as the elastic member 107. However, the invention is not limited to this. For example, the elastic member 107 may be a spring.

(14) In this embodiment, the long side direction of the through hole 109b of the coupling portion 109 is substantially parallel to the longitudinal direction X. However, the invention is not limited to this. The long side direction of the through hole 109b may be changed as appropriate to a direction except the longitudinal direction X.

(15) In this embodiment, the right guide wall 121R includes, in addition to the part located more leftward than the right inlet port 83R, the part located more rightward than the left end of the right inlet port 83R. However, the invention is not limited to this. For example, the entire of the right guide wall 121R may be located more leftward than the right inlet port 83R. For example, at least part of the right guide wall 121R may be located more leftward than the right inlet port 83R.

(16) In this embodiment, the left guide wall 121L includes, in addition to the part located more rightward than the left inlet port 83L, the part located more leftward than the right end of the left inlet port 83L. However, the invention is not limited to this. For example, the entire of the left guide wall 121L may be located more rightward than the left inlet port 83L. For example, at least part of the left guide wall 121L may be located more rightward than the left inlet port 83L.

(17) In this embodiment, part of the right guide wall 121R (e.g., the intermediate part 123R) contacts the seat 31 and the rear fender 71. However, the invention is not limited to this. For example, the entire of the right guide wall 121R may contact the seat 31 and the rear fender 71.

(18) In this embodiment, part of the left guide wall 121L (specifically, the intermediate part 123L) contacts the seat 31 and the rear fender 71. However, the invention is not limited to this. For example, the entire of the left guide wall 121L may contact the seat 31 and the rear fender 71.

(19) In this embodiment, the right guide wall 121R, the left guide wall 121L, the second fin 127, the right blocking wall 129R, and the left blocking wall 129L are attached to the seat 31. However, the invention is not limited to this. For example, at least one of the right guide wall 121R, the left guide wall 121L, the second fin 127, the right blocking wall 129R, and the left blocking wall 129L may be attached to either the rear fender 71 or the body frame 2.

(20) In this embodiment, the right projection portion 125R, the left projection portion 125L, and the first fin 126 are attached to the rear fender 71. However, the invention is not limited to this. For example, at least one of the right projection portion 125R, the left projection portion 125L, and the first fin 126 may be attached to either the seat 31 or the body frame 2.

(21) In this embodiment, the left blocking wall 129L overlaps part of the boundary K between the seat 31 and the left side cover 61L in the side view of the vehicle. However, the invention is not limited to this. For example, the left blocking wall 129L may overlap the entire of the boundary K in the side view of the vehicle. For example, the left blocking wall 129L may overlap at least part of the boundary K in the side view of the vehicle.

(22) In this embodiment, the right blocking wall 129R overlaps part of the boundary between the seat 31 and the right side cover 61R in the side view of the vehicle. However, the invention is not limited to this. For example, the right blocking wall 129R may overlap the entire of the boundary between the seat 31 and the right side cover 61R in the side view of the vehicle. For example, the right blocking wall 129R may overlap at least part of the boundary between the seat 31 and the right side cover 61R in the side view of the vehicle.

(23) In this embodiment, the straddled vehicle 1 has been illustrated as an example of off-road type vehicles. However, the invention is not limited to this. The straddled vehicle 1 may be changed to vehicles of other types, such as the street type, the sport type or a vehicle for irregular grounds (ALL-TERRAIN VEHICLE).

(24) In the foregoing embodiment, the number of front wheel 22 included in the straddled vehicle 1 is one. The invention is not limited to this. The number of front wheels 22 included in the straddled vehicle 1 may be two. In the foregoing embodiment, the number of rear wheel 28 included in the straddled vehicle 1 is one. The invention is not limited to this. The number of rear wheels 28 included in the straddled vehicle 1 may be two.

(25) In the foregoing embodiment, the straddled vehicle 1 includes the engine (internal combustion engine) 24 as a power source. However, the invention is not limited to this. For example, the straddled vehicle 1 may have an electric motor as another power source in addition to the engine 24. For example, the straddled vehicle 1 may have an electric motor as a power source instead of the engine 24.

(26) The foregoing embodiment and each of the modified embodiments described in paragraphs (1) to (25) above may be further varied as appropriate by replacing or combining their constructions with the constructions of the other modified embodiments.

The present invention may be embodied in other specific forms without departing from the spirit or essential attributes thereof and, accordingly, reference should be made to the appended claims, rather than to the foregoing specification, as indicating the scope of the invention.

The invention claimed is:

1. A straddled vehicle, comprising:
   a body frame including
      a right seat frame located rightward of a vehicle center plane with respect to a rear-to-front direction of the vehicle, the vehicle center plane passing through a center of the vehicle and being perpendicular to a transverse direction of the vehicle,
      a left seat frame located leftward of the vehicle center plane with respect to the rear-to-front direction of the vehicle, and
      a cross member located between the right seat frame and the left seat frame, and configured to connect the right seat frame with the left seat frame;
   a seat located above the right seat frame, the left seat frame, and the cross member;
   a right side cover located rightward of the right seat frame;
   a left side cover located leftward of the left seat frame;
   a rear fender, a part of which is located below the right seat frame, the left seat frame, and the cross member;
   an intake passage formed below the seat, leftward of the right side cover, rightward of the left side cover, and above the rear fender, the intake passage extending in a longitudinal direction of the vehicle;
   an air cleaner located in a front part of the intake passage;
   a left inlet port located in a rear part of the intake passage and leftward of the vehicle center plane, the left inlet port opening rearward, and communicating with the intake passage and an outside of the vehicle;
   a right inlet port located in the rear part of the intake passage and rightward of the vehicle center plane, the right inlet port opening rearward, and communicating with the intake passage and the outside of the vehicle;
a first fastening portion configured to fasten the right side cover to either the right seat frame or the rear fender; and
a second fastening portion configured to fasten the left side cover to either the left seat frame or the rear fender, wherein
the cross member is located more rearward than the air cleaner and more forward than the right inlet port and the left inlet port,
the cross member is convex upward in a rear view of the vehicle,
the cross member does not overlap the right inlet port or the left inlet port in the rear view of the vehicle,
the first fastening portion is located outside the intake passage, or is located inside the intake passage but does not overlap the right inlet port or the left inlet port in the rear view of the vehicle, and
the second fastening portion is located outside the intake passage, or is located inside the intake passage but does not overlap the right inlet port or the left inlet port in the rear view of the vehicle.

2. The straddled vehicle according to claim 1, wherein an area of the cross member in the rear view of the vehicle is smaller than an area of the cross member in a plan view of the vehicle.

3. The straddled vehicle according to claim 1, wherein the cross member contacts the seat at a position higher than the right seat frame and the left seat frame.

4. The straddled vehicle according to claim 1, wherein the cross member includes
a right hole extending in the longitudinal direction of the vehicle, and
a left hole extending in the longitudinal direction of the vehicle.

5. The straddled vehicle according to claim 4, wherein the cross member includes
a right part connected to the right seat frame and extending upward,
a left part connected to the left seat frame and extending upward,
an upper part extending from the right part to the left part at a position higher than the right seat frame and the left seat frame,
a right reinforcement portion located more leftward than the right part and configured to connect the right seat frame with the upper part, and
a left reinforcement portion located more rightward than the left part and configured to connect the left seat frame with the upper part, wherein
the right hole is formed by the right part, the upper part, and the right reinforcement portion, and
the left hole is formed by the left part, the upper part, and the left reinforcement portion.

6. The straddled vehicle according to claim 5, wherein the right reinforcement portion is further connected with the right part, and
the left reinforcement portion is further connected with the left part.

7. The straddled vehicle according to claim 1, wherein the rear fender has an upper edge that is convex upward in a first cross section, the first cross section passing through the cross member and being perpendicular to the longitudinal direction of the vehicle, and
a part of the upper edge of the rear fender is located at a position higher than a lower edge of the right seat frame and a lower edge of the left seat frame in the first cross section.

8. The straddled vehicle according to claim 1, further comprising:
a right guide wall located inside the intake passage and rightward of the vehicle center plane with respect to the rear-to-front direction of the vehicle, and
a left guide wall located inside the intake passage and leftward of the vehicle center plane with respect to the rear-to-front direction of the vehicle, wherein
at least a part of the right guide wall is located more leftward than the right inlet port,
the right guide wall extends forward and leftward in a plan view of the vehicle,
at least a part of the left guide wall is located more rightward than the left inlet port, and
the left guide wall extends forward and rightward in the plan view of the vehicle.

9. The straddled vehicle according to claim 8, wherein a front part of the right guide wall is connected to a front part of the left guide wall.

10. The straddled vehicle according to claim 8, wherein at least another part of the right guide wall contacts the seat and the rear fender, and
at least another part of the left guide wall contacts the seat and the rear fender.

11. The straddled vehicle according to claim 8, further comprising:
a position regulator configured to join the seat with either the body frame or the rear fender to regulate movement of the seat relative to the body frame or the rear fender, wherein
the position regulator is located leftward of the right guide wall in the plan view of the vehicle,
the right guide wall extends from a position rightward of the position regulator to a position forward of the position regulator,
the position regulator is located rightward of the left guide wall in the plan view of the vehicle, and
the left guide wall extends from a position leftward of the position regulator to a position forward of the position regulator.

12. The straddled vehicle according to claim 11, wherein the position regulator does not overlap the right inlet port or the left inlet port in the rear view of the vehicle.

13. The straddled vehicle according to claim 8, further comprising a fin located inside the intake passage, wherein
the fin is located more forward than the right guide wall and the left guide wall,
the fin is located more leftward than the right inlet port and more rightward than the left inlet port, and
the fin extends in the longitudinal direction of the vehicle in the plan view of the vehicle.

14. The straddled vehicle according to claim 13, wherein the seat includes a guide slope configured to contact an upper part of the intake passage, wherein
the guide slope is located more forward than the fin,
the guide slope is located above the air cleaner, and
the guide slope is inclined forward and downward.

15. The straddled vehicle according to claim 1, further comprising:
a right blocking wall located inside the intake passage and rightward of the vehicle center plane with respect to the rear-to-front direction of the vehicle, and a left blocking wall located inside the intake passage and leftward of the vehicle center plane with respect to the rear-to-front direction of the vehicle, wherein the right blocking wall is located more forward than the right inlet port, the right blocking wall overlaps at least a part of a boundary between the seat and the right side cover in a side view of the vehicle, the left blocking wall is located more forward than the left inlet port, and the left blocking wall overlaps at least a part of a boundary between the seat and the left side cover in the side view of the vehicle.

\* \* \* \* \*